US008009670B2

(12) United States Patent
Gobara et al.

(10) Patent No.: US 8,009,670 B2
(45) Date of Patent: Aug. 30, 2011

(54) COMMUNICATION SYSTEM, INFORMATION PROCESSOR, INTERVENING SERVER, IDENTIFICATION INFORMATION TRANSMITTING SERVER, COMMUNICATION METHOD AND PROGRAM

(75) Inventors: Kunio Gobara, Tokyo (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 800 days.

(21) Appl. No.: 11/718,612

(22) PCT Filed: Nov. 4, 2005

(86) PCT No.: PCT/JP2005/020270
§ 371 (c)(1),
(2), (4) Date: May 4, 2007

(87) PCT Pub. No.: WO2006/049236
PCT Pub. Date: May 11, 2006

(65) Prior Publication Data
US 2009/0073969 A1    Mar. 19, 2009

(30) Foreign Application Priority Data
Nov. 5, 2004   (JP) .............................. P. 2004-321658

(51) Int. Cl.
*H04L 12/28* (2006.01)
(52) U.S. Cl. ....................................... 370/389
(58) Field of Classification Search .................. 370/389, 370/352, 353, 354, 395.6, 395.2, 401
See application file for complete search history.

(56) References Cited

U.S. PATENT DOCUMENTS

| 2004/0151112 A1* | 8/2004 | Matsubara et al. ........... 370/217 |
| 2004/0264381 A1* | 12/2004 | Banerjee et al. .............. 370/252 |

FOREIGN PATENT DOCUMENTS

| JP | 7-105111 | 4/1995 |
| JP | 7-235939 | 9/1995 |
| JP | 2000-209268 | 7/2000 |
| JP | 2001-256157 | 9/2001 |
| JP | 2002-07238 | 1/2002 |
| WO | 2004/012086 A1 | 2/2004 |

OTHER PUBLICATIONS

Japanese Office Action.
International Search Report (PCT/JP2005/020270) dated Dec. 6, 2005.

* cited by examiner

*Primary Examiner* — Dang T Ton
*Assistant Examiner* — Nourali Mansoury
(74) *Attorney, Agent, or Firm* — Pearne & Gordon LLP

(57) ABSTRACT

A first information processing equipment transmits, to a mediating server, the first transmission information which is the information containing the relay server identification information for identifying the relay server employed in the data relay between information processing equipments, and executes the data relay with the second information processing equipment through the relay server identified by the relay server identification information. The mediating server receives the first transmission information and transmits, to a second information processing equipment, the second transmission information which is the information containing the relay server identification information contained in the first transmission information. The second information processing equipment receives the second transmission information and executes the data relay with the first information processing equipment through the relay server identified by the relay server identification information contained in the second transmission information.

13 Claims, 25 Drawing Sheets

| ACQUISITION NUMBER | DOMAIN INFORMATION | RELAY SERVER IDENTIFICATION INFORMATION |
|---|---|---|
| 2 | www.server.pana.net | 155.32.10.10 |
| | | 155.32.10.11 |
| | | 155.32.10.12 |
| 1 | www.server.matsu.com | 155.40.20.21 |
| | | 155.40.20.31 |
| ⋮ | ⋮ | ⋮ |

FIG. 15

| EQUIPMENT IDENTIFICATION | ADDRESS INFORMATION | |
|---|---|---|
| | IP ADDRESS | PORT NUMBER |
| AAA | 111. 222. 111. 1 | 22222 |
| BBB | 111. 222. 123. 1 | 12345 |
| ⋮ | ⋮ | ⋮ |

FIG. 16

| BURDEN INFOR- MATION | RELAY SERVER IDENTIFICATION INFORMATION |
|---|---|
| 50% | 155. 32. 10. 10 |
| 20% | 155. 32. 10. 11 |
| 40% | 155. 32. 10. 12 |

FIG. 40

| DATA RELAY IDENTIFICATION INFORMATION | RELAY SERVER IDENTIFICATION INFORMATION |
|---|---|
| BF873B46@192.168.0.10 | 155.32.10.11 |
| FA452C37@192.168.3.5 | 155.32.10.12 |
| ⋮ | ⋮ |

FIG. 41

| ACQUISITION NUMBER | DOMAIN INFORMATION | RELAY SERVER IDENTIFICATION INFORMATION | DATA RELAY IDENTIFICATION INFORMATION |
|---|---|---|---|
| 2 | www.server.pana.net | 155.32.10.10 | — |
| | | 155.32.10.11 | BF873B46@192.168.0.10 |
| | | 155.32.10.12 | FA452C37@192.168.3.5 |
| 1 | www.server.matsu.com | 155.40.20.21 | — |
| | | 155.40.20.31 | — |
| ⋮ | ⋮ | ⋮ | ⋮ |

COMMUNICATION SYSTEM, INFORMATION PROCESSOR, INTERVENING SERVER, IDENTIFICATION INFORMATION TRANSMITTING SERVER, COMMUNICATION METHOD AND PROGRAM

TECHNICAL FIELD

This invention relates to a communication system and others which execute communication through relay servers.

BACKGROUND ART

Traditionally, as seen from FIG. 42, where communication is executed between an information processing equipment A and an information processing equipment B, the communication is not executed directly but executed through a predetermined server. In this communication, if the information processing equipment A transmits information to the relay server, the relay server receives the information and transmits it to the information processing equipment B. When the information processing equipment B receives the information transmitted from the relay server, the information transmission from the information processing equipment A to the information processing equipment B is executed. Likewise, the information transmission from the information processing equipment B to the information processing equipment A is executed through the relay server.

Such communication using the relay server is adopted in the case where audio or video data are relayed from the one information processing equipment to the other information equipment. Further, such a communication format is the communication executed until Peer-to-Peer communication is started by e.g. the SIP (Session Initiation Protocol) or STUN (Simple Traversal of UDP Through NATs). It is also adopted in the communication in which the information necessary in the Peer-to-Peer communication is transmitted or received between the information processing equipments. This communication is described in J. Rosenberg, J. Weinberger, C. Huitema, R. Mahy, "STUN—Simple Traversal of User Datagram Protocol (UDP) Through Network Address Translators (NATs)" March, 2003, Networking Group Request for Comments: 3489 (retrieved on Oct. 7, 2004, Internet URL: http://www.ietf.org/rfc/rfc3489.txt).

However, such a communication format presents a problem that if many information processing equipments execute the communication through the relay server, the processing burden on the relay server becomes excessive On the other hand, if the data relay between the information processing equipments is executed through a plurality of relay servers in order to disperse the processing burden of the relay server, the equipment on the side of reception cannot know the relay server through which the data relay is executed and so cannot know the relay server to be accessed. Particularly, where the information processing equipment executes the communication through a communication processing equipment having a function of NAT (Network Address Translation) (e.g. device called a router), a packet is periodically transmitted to the relay server so that the information from the relay server can be received. Therefore, where the information processing equipment executes the communication through the communication processing equipment having the NAT function and the plurality of relay servers are employed in order to disperse the processing burden on the relay servers, the information processing equipment on the side of reception cannot know the relay server of the plurality of severs, through which the information is transmitted from the other information processing equipment and so cannot know the relay server to which the packet must be periodically transmitted.

Further, in order that information transmitted can be received through all the relay servers, the information processing equipment on the side of reception must transmits the packet to all the relay serves. Thus, the burden of packet transmission in the information processing equipment becomes excessive.

DISCLOSURE OF THE INVENTION

The communication system according to this invention is a communication system including first to N-th relay servers (N is a 2 or more integer) which are servers for data relay, a first information processing equipment, a second information processing equipment and a mediating server, wherein the first information processing equipment comprises: a storage unit for storing relay server identification information which is the information for identifying the relay server employed in the data relay between the first information processing equipment and the second information processing equipment, a first transmission information transmitting unit for transmitting, to the mediating server, the first transmission information which is the information containing the relay server identification information stored in the storage unit, and a first data communicating unit for executing the data relay with the second information processing equipment through the relay server identified by the relay server identification information stored in the storage unit; and the mediating server comprises: a first transmission information receiving unit for receiving the first transmission information, and a second transmission information transmitting unit for transmitting to the second information processing equipment the second transmission information which is the information containing the relay server identification information contained in the first transmission information received by the first transmission information receiving unit; and the second information processing equipment comprises: a second transmission information receiving unit for receiving the second transmission information, a second accumulating unit for accumulating the relay server identification information contained in the second transmission information, and a second data communicating unit for executing the data relay with the first information processing equipment through the relay server identified by the relay server identification information accumulated by the second accumulating unit.

In accordance with such a configuration, since the communication is executed through a plurality of relay servers, the processing burden for the relay servers can be dispersed as compared with the case of executing the communication using a single server. For this reason, the relay server having lower processing capability can be employed as the case of executing the communication using the single relay server. Further, since the relay server identification information indicative of the relay server executing the data relay is transmitted from the first information processing equipment to the second information processing equipment through the mediating server different from the relay servers, the second information processing equipment having received the relay server identification information can know the relay server to be employed in the data relay with the first information processing equipment.

Further, the other communication system according to this invention may be a communication system further comprising an identification information transmitting server, wherein the first information processing equipment further comprises a request information transmitting unit for transmitting, to the identification information transmitting server, request information which is the information requesting transmission of the relay server identification information, an identification information receiving unit for receiving the relay server identification information transmitted from the identification information transmitting server, and a first accumulating unit for accumulating the relay server identification information received by the identification information receiving unit in the storage unit; and the identification information transmitting server comprises: a request information receiving unit for receiving the request information, an identification information storage unit for storing the relay server identification information which is the information for identifying the first to N-th relay servers, an acquisition unit for acquiring any relay server identification information of the relay server identification information for the first to N-th relay servers stored in the identification information storage unit, and an identification information transmitting unit for transmitting the relay server identification information acquired by the acquisition unit when the request information is received by the request information receiving unit.

In accordance with such a configuration, the first information processing equipment can transmit the relay server identification information transmitted from the identification information transmitting server to the second information processing equipment through the mediating server and execute the data relay with the second information processing equipment through the relay server designated by the relay server identification information. Further, where the relay server employed in the data relay between the first information processing equipment and the second information processing equipment is changed (for example, the number of the relay servers is changed or the relay server identification information for the relay servers is changed), the relay server identification information held in the identification information transmitting server has only to be changed so that the change is easily reflected.

In a further communication system according to this invention, preferably, the request information contains domain information which is the information corresponding to the relay server information for the first to N-th relay servers; the identification information of the first to the N-th relay servers storage unit stores the relay server identification information correlated with the domain information; and the acquisition unit acquires a single item of two or more items of the relay server identification information corresponding to the domain information contained in the request information.

In accordance with such a configuration, for example, where there are a set (group) of first to third relay servers, and a set of fourth to sixth relay servers, the set of relay servers to be employed can be designated by the domain information. More concretely, for example, where the set of first to third relay servers are the relay servers for the data relay of audio and video data, and the set of fourth to sixth relay servers are the relay servers for control of establishing the communication of Peer-to-Peer, by changing the domain information contained in the request information according to the purpose of the data relay, the relay servers according to the purpose can be selected In a further communication system according to this invention, preferably, the first information processing equipment comprises: a plurality of items of identification information storage unit for storing the relay server identification information for the first to N-th relay servers, a storage unit for acquiring any single item of items of the relay server identification information stored in the plurality of items of identification information storage unit, and a first accumulating unit for accumulating the relay server identification information acquired by the acquisition unit in the storage unit.

In accordance with such a configuration, even where the communication system does not include the identification information transmitting server, the first information processing equipment can determine the relay server to be employed for the data relay The other communication system according to this invention is a communication system including first to N-th relay servers (N is a 2 or more integer) which are servers for data relay, a first information processing equipment, a second information processing equipment and a mediating server, wherein the first information processing equipment comprises: a first transmission information transmitting unit for transmitting, to the mediating server, the first transmission information which is the information containing a transmission request of the relay server identification information for identifying the relay server employed in the data relay between the first information processing equipment and the second information processing equipment, a third transmission information receiving unit for receiving the third transmission information which is the information containing the relay server identification information, transmitted from the mediating server, a first accumulating unit for accumulating the relay server identification information contained in the third transmission information, and a first data communicating unit for executing the data relay with the second information processing equipment through the relay server identified by the relay server identification information accumulated by the first accumulating unit; the mediating server comprises: a first transmission information receiving unit for receiving the first transmission information, a second transmission information receiving unit for transmitting if the first transmission information is received by the first transmission information receiving unit, to the second information processing equipment, the second transmission information which is the information containing the relay server identification information for identifying the relay server employed in the data relay between the first information processing equipment and the second information processing equipment, and a third transmission information receiving unit for transmitting if the first transmission information is received by the first transmission information receiving unit, to the first information processing equipment, the third transmission information which is the information containing the relay server identification information for identifying the relay server employed in the data relay between the first information processing equipment and the second information processing equipment; and the second information processing equipment comprises: a second transmission information receiving unit for receiving the second transmission information, a second accumulating unit for accumulating the relay server identification information contained in the second transmission information, and a second data communicating unit for executing the data relay with the first information processing equipment through the relay server identified by the relay server identification information accumulated by the second accumulating unit.

In accordance with such a configuration, since the communication is executed through a plurality of relay servers, the processing burden for the relay servers can be dispersed as compared with the case of executing the communication using a single server. For this reason, the relay server having lower processing capability can be employed as the case of executing the communication using the single relay server. Further, since the relay server identification information indicative of the relay server executing the data relay is transmitted from the mediating server to the first information processing equipment and the second information processing equipment, the first and second information processing equipments having received the relay server identification information can know the relay server to be employed in the data relay between the equipments.

In a further communication system according to this invention, preferably, an identification information transmitting server is further included; and the mediating server further comprises: a request information transmitting unit for transmitting, to the identification information transmitting server, request information which is the information requesting the transmission of the relay server identification information, and an identification information receiving unit for receiving the relay server identification information transmitted from the identification information transmitting server; and the identification information transmitting server comprises: a request information receiving unit for receiving the request information, an identification information storage unit for storing the relay server identification information which is the information for identifying the first to N-th relay servers, an acquisition unit for acquiring any relay server identification information of the relay server identification information for the first to N-th relay servers stored in the identification information storage unit, and an identification information transmitting unit for transmitting the relay server identification information acquired by the acquisition unit when the request information is received by the request information receiving unit; and wherein the second transmission information contains the relay server identification information received by the identification information receiving unit, and the third transmission information contains the relay server identification information received by the identification information receiving unit.

In accordance with such a configuration, the mediating server can transmit the relay server identification information transmitted from the identification information transmitting server to the first information processing equipment and second information processing equipment so that the data relay between the equipments is executed through the relay server designated by the relay server identification information thus transmitted. Further, where the relay server employed in the data relay between the first information processing equipment and the second information processing equipment is changed (for example, the number of the relay servers is changed or the relay server identification information for the relay servers is changed), the relay server identification information held in the identification information transmitting server has only to be changed so that the change is easily reflected.

In a further communication system according to this invention, preferably, the request information contains domain information which is the information corresponding to the relay server identification information for the first to N-th relay servers; the identification information storage unit stores the relay server identification information for the first to N-th relay servers so as to be correlated with the domain information; and the acquisition unit acquires a single item of two or more items of the relay server identification information corresponding to the domain information contained in the request information.

In accordance with such a configuration, the data relay between the information processing equipments can be executed through the relay sever identified by the relay server identification information acquired by the acquisition unit of the relay server identification information corresponding to the domain information contained in the request information transmitted from the mediating server to the identification information transmitting server.

In a further communication system according to this invention, preferably, the mediating server further comprises: a plurality of items of identification information storage unit for storing the relay server identification information for the first to N-th relay servers, an acquisition unit for acquiring any single item of items of the relay server identification information stored in the plurality of items of identification information storage unit; and the second transmission information contains the relay server identification information received by the acquisition unit, and the third transmission information contains the relay server identification information received by the acquisition unit.

In accordance with such a configuration, even where the communication system does not include the identification information transmitting server, the relay server to be employed in the data relay can be determined in the mediating server.

The communication system according to this invention is a communication system including first to N-th relay servers (N is a 2 or more integer) which are servers for data relay, a first information processing equipment, a second information processing equipment, a mediating server and an identification information transmitting server, wherein the first information processing equipment comprises: a first transmission information transmitting unit for transmitting, to the mediating server, the first transmission information which is the information containing data relay identification information for identifying the data relay, a first request information transmitting unit for transmitting, to the identification information transmitting server, the first request information which is the information containing the data relay identification information and requesting the transmission of relay server identification information for identifying the relay server employed in the data relay between the first information processing equipment and the second information processing equipment, an identification information receiving unit for receiving the relay server identification information transmitted from the identification information transmitting server, a first accumulating unit for accumulating the relay server identification information received by the identification information receiving unit, and a first data communicating unit for executing the data relay with the second information processing equipment through the relay server identified by the relay server identification information accumulated by the first accumulating unit; the mediating server comprises: a first transmission information receiving unit for receiving the first transmission information, and a second transmission information receiving unit for transmitting if the first transmission information is received by the first transmission information receiving unit, to the second information processing equipment, the second transmission information which is the information containing the data relay identification information contained in the first transmission information; the second information processing equipment comprises: a second transmission information receiving unit for receiving the second transmission information, a second request information transmitting unit for transmitting if the second transmission information is received by the second transmission receiving unit, to the identification information transmitting server, the second request information which is the information containing the data relay identification information contained in the second transmission information, an identification information receiving unit for receiving the relay server identification information transmitted from the identification information transmitting server, a second accumulating unit for accumulating the relay server identification information received by the identification information receiving unit, and a second data communicating unit for executing the data relay with the first information processing equipment through the relay server identified by the relay server identification information accumulated by the second accumulating unit; and the identification information transmitting server comprises: a request information receiving unit for receiving the first request information and the second request information, an identification information storage unit for storing the relay server identification information which is the information for identifying the first to N-th relay servers, a first acquisition unit for acquiring any relay server identification information of the relay server information for the first to N-th relay servers stored in the identification information storage unit, a first identification information transmitting unit for transmitting when the first request information is received by the request information receiving unit, to the first information processing equipment, the relay server identification information acquired by the first acquisition unit, a correlation information accumulating unit for accumulating when the first request information is received by the request information receiving unit, correlation information which correlates the data relay identification information contained in the first request information and the relay server identification information transmitted to the information processing equipment by the first identification information transmitting unit, a second acquisition unit for acquiring when the second request information is received by the request information receiving unit, the relay server identification information corresponding to the data relay identification information contained in the second request information, and a second identification information transmitting unit for transmitting the relay server identification information acquired by the second acquisition unit to the second information processing unit.

In accordance with such a configuration, since the communication is executed through a plurality of relay servers, the processing burden for the relay servers can be dispersed as compared with the case of executing the communication using a single server. For this reason, the relay server having lower processing capability can be employed as the case of executing the communication using the single relay server. The relay server identification information which the first and second information processing equipments receive from the identification information transmitting server, respectively, is the information of identifying the same relay server. Therefore, the relay server employed in the data relay between the first information processing equipment and the second information processing equipment can be specified.

In a further communication system according to this invention, preferably, the first request information contains domain information which is the information corresponding to the relay server information for the first to N-th relay servers; the identification information storage unit stores the relay server identification information for the first to N-th relay servers so as to be correlated with the domain information; and the first acquisition unit acquires a single item of two or more items of the relay server identification information corresponding to the domain information contained in the first request information In accordance with such a configuration, the set of relay servers to be employed can be specified by the domain information.

In a further communication system according to this invention, the first information processing equipment and/or the second information processing equipment may execute the communication through a communication processing equipment.

In accordance with such a configuration, also when the first information processing equipment and/or the second information processing equipment execute the communication through the communication processing equipment, they can appropriately execute the data relay through a certain relay server of a plurality of relay servers. For example, even where the second information processing equipment executes the communication through the communication processing equipment in which a port keeping time is set, the second information processing equipment can know through the mediating server the relay server employed in the data relay, it is not necessary to transmit the packet for keeping the port to the plurality of relay servers.

In accordance with the communication system and others according to this invention, since the communication is executed through a plurality of relay servers, the processing burden for the relay servers can be dispersed as compared with the case of executing the communication through a single server. Further, since the relay server identification information indicative of the relay server executing the data relay is transmitted from the first information processing equipment to the second information processing equipment through the mediating server different from the relay servers, the information processing equipment having received the relay server identification information can know the relay server to be employed in the data relay between the information processing equipments

BRIEF DESCRIPTION OF THE DRAWINGS

FIG. 15 is a view showing an example of the correlation between equipment identification information and address information in the first embodiment.

FIG. 16 is a view showing an example of the information stored in the identification information storage unit of the identification information transmitting server according to the first embodiment.

FIG. 40 is a view showing an example of the correlation information in the fifth embodiment.

FIG. 41 is a view showing an example of the relay server identification information and an example of the correlation information in the fifth embodiment.

Figure 1:
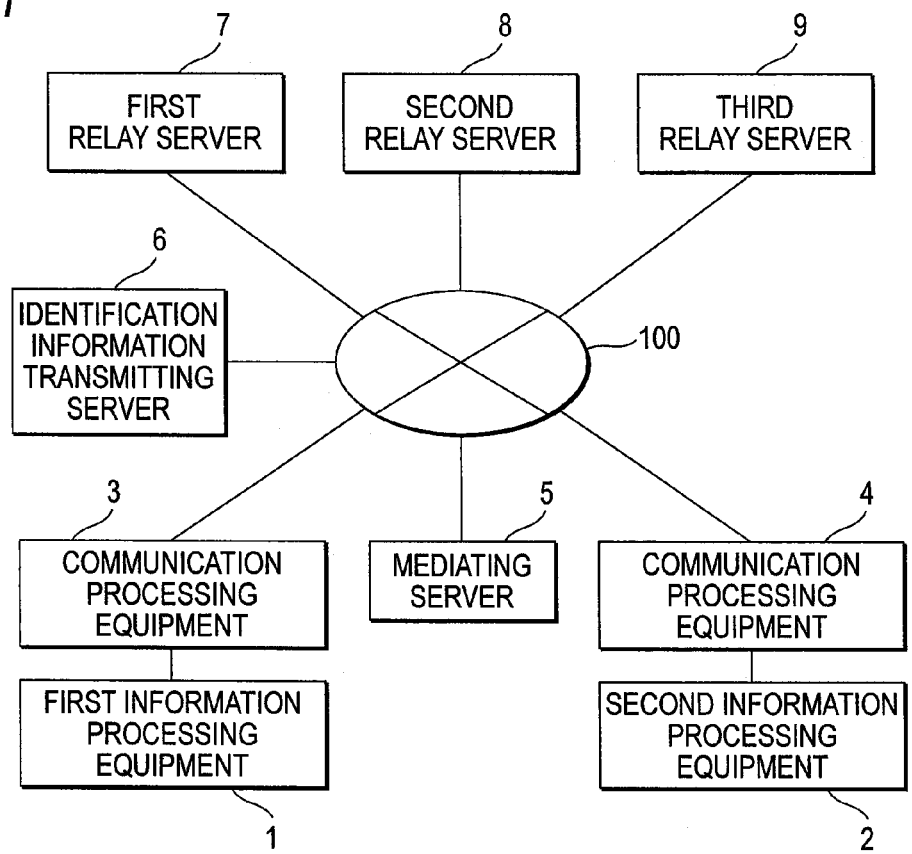
FIG. 1 is a view showing the configuration of a communication system according to the first embodiment of this invention.

DESCRIPTION OF REFERENCE NUMERALS AND SIGNS 1, 10, 30, 110 first information processing equipment
2, 120 second information processing equipment
3, 4 communication processing equipment
5, 40, 50 mediating server
6, 130 identification information transmitting server
7 first relay server
8 second relay server
9 third relay server
11 storage unit
12, 31, 111 first transmission information transmitting unit
13, 34, 115 first data communicating unit
14, 42 request information transmitting unit
15, 43, 113, 123 identification information receiving unit
16, 19, 33, 114 first accumulating unit
17, 54 plurality of items of identification information storage unit
18, 55, 63 acquisition unit
21, 121 second transmission information receiving unit
22, 124 second accumulating unit
23, 125 second data communicating unit
32 third transmission information receiving unit
41, 51, 53 first transmission information receiving unit
44, 52, 56 second transmission information transmitting unit
45, 57 third transmission information transmitting unit
61, 131 request information receiving unit
62, 132 identification information storage unit
64 identification information transmitting unit
71, 81, 91 data receiving unit
72, 82, 92 address information storage unit
73, 83, 93 data transmitting unit
112 first request information transmitting unit
122 second request information transmitting unit
133 first acquisition unit
134 first identification information transmitting unit
135 correlation information accumulating unit
136 second acquisition unit
137 second identification information transmitting unit

BEST MODE OF CARRYING OUT THE INVENTION

Embodiment 1

Now referring to the drawings, an explanation will be given of the communication system according to the first embodiment of this invention.

Figure 2:
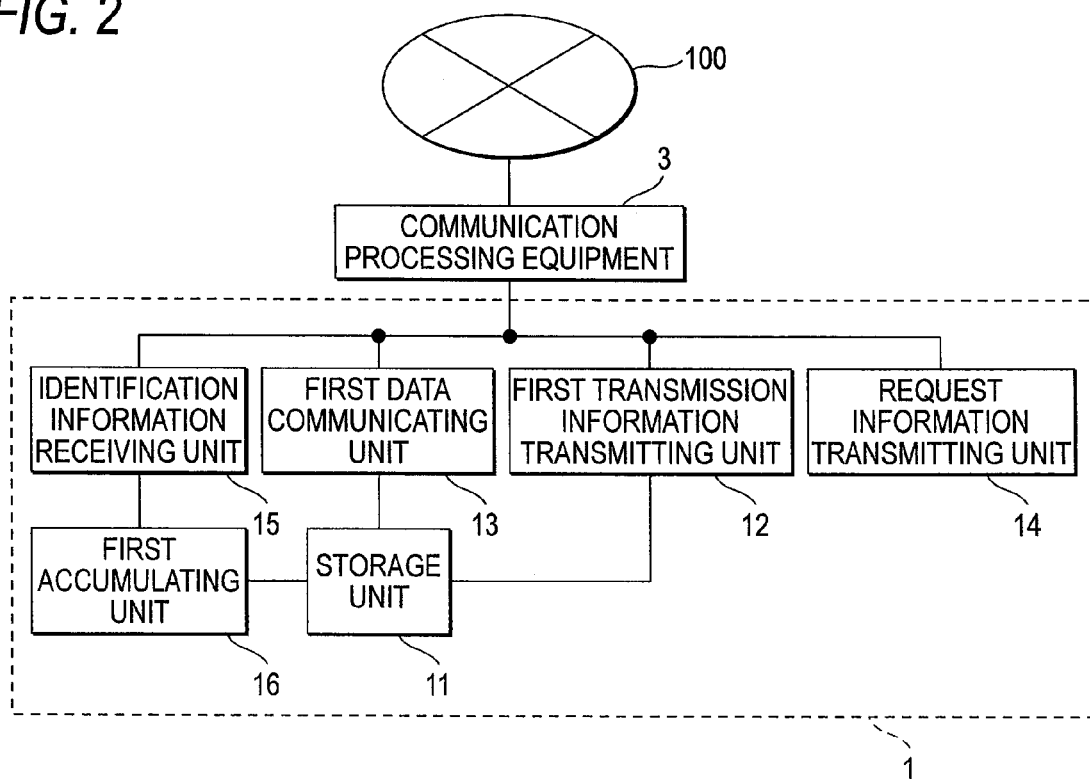
FIG. 2 is a block diagram showing the configuration of a first information processing equipment according to the first embodiment.

FIG. 1 is a view showing the configuration of the communicating system according to this embodiment. In FIG. 1, the communication system according to this embodiment includes a first information processing equipment 1, a second information processing equipment 2, communication processing equipments 3, 4, a mediating server 5, an identification information transmitting server 6, a first relay server 7, a second relay server 8 and a third relay server 9. The communication processing equipments 3, 4, mediating server 5, identification information transmitting server 6, first relay server 7, second relay server 8 and third relay server 9 are connected through a wired or wireless communication line 100. The communication line 100 is for example, an internet, intranet or a public telephone line network. Incidentally, although FIG. 1 illustrates the case where various equipments and servers are connected to a single communication line 100, these equipments and servers may be connected through a plurality of communication lines in a range where communication can be executed among the equipments and servers. Further, although FIG. 1 shows the case where three relay servers are provided, as long as two or more servers are provided, the number of relay servers is optional. For example, the communication system may be provided with two relay servers or four or more relay servers. Further, although FIG. 1 shows the case where the first information processing equipment 1 and second information processing equipment 2 each executes the communication through the corresponding single communication processing equipment 3, 4, the first information processing equipment 1 and second information processing equipment 2 may execute the communication through two or more communication processing equipments. In the following explanation, in the communication system of FIG. 1, the first information processing equipment 1 and second information processing equipment 2 execute the data relay through any of the first to third relay servers 7 to 9. However, between other information processing equipments, the data relay may be executed through any of the first to third relay servers 7 to 9. It is assumed that the data relay between these information processing equipments is executed in the same manner as between the first information processing equipment 1 and second information processing equipment 2. Now, the "data relay" refers to the transfer processing of information executed through the relay servers FIG. 2 is a block diagram showing the configuration of the first information processing equipment 1 according to this embodiment. In FIG. 2, the first information processing equipment 1 according to this embodiment includes a storage unit 11, a first transmission information transmitting unit 12, a first data communicating unit 13, a request information transmitting unit 14, an identification information receiving unit 15 and a first accumulating unit 16.

The storage unit 11 stores relay server identification information. Now, the "relay server identification information" refers to information for identifying the relay server employed in the data relay between the first information processing equipment 1 and second information processing equipment 2. Namely, from this relay server identification information, one of the three relay servers which executes the data relay can be known. The relay server identification information may any information as long as it can identify the relay servers. In this embodiment, it is assumed that the relay server identification information is an address of the relay server. The "data relay" refers to the communication in which two information processing equipments execute not directly (i.e. so-called by Peer-to-Peer) but through the relay server. The communication may be executed for transferring data from the one information processing equipment to the other information processing equipment as in the case where audio data and/or video data, program data, text data, etc are transmitted or received; or may be executed for transferring the data relative to control of communication between the information processing equipment as in the case where the data (e.g. the data indicative of the address or port number of the communication processing equipment employed for the Peer-to-Peer communication) employed to establish the Peer-to-Peer communication between the information processing equipments are transmitted or received. The storage unit 11 can be realized by a predetermined storage medium (e.g. semiconductor memory, magnetic disk or optical disk).

The first transmission information transmitting unit 12 transmits the first transmission information to the mediating server 5. Now, the first transmission information refers to the information containing the relay server identification information stored in the storage unit 11. The first transmission information may contain equipment identification information identifying the second information processing equipment 2 as well as the relay server identification information, or may contain only the relay server identification information. In this embodiment, the former case will be explained. Incidentally, the first transmission information transmitting unit 12 may include a transmitting device for transmission (e.g. modem or network card), or may not include it (In this case, the transmitting device not shown is located between the first transmission information transmitting unit 12 and the communication processing equipment 3). Further, the first transmission information transmitting unit 12 may be realized in hardware or may be realized in software such as a driver for driving the transmitting device.

The first data communicating unit 13 executes the data relay with the second information processing equipment 2. This data relay is executed through the relay server identified by the relay server identification information stored in the storage unit 11. The first data transmitting unit 13 may include a communicating device for communication (e.g. modem or network card), or may not include it (In this case, the communicating device not shown is located between the first data communicating unit 13 and the communication processing equipment 3). Further, the first data transmitting unit 13 may be realized in hardware or may be realized in software such as a driver for driving the communicating device.

The request information transmitting unit 14 transmits request information. Now, the "request information" refers to the information requesting the transmission of the relay server identification information. The request information transmitting unit 14 transmits the request information to the identification information transmitting server 6. The payload of a packet of the request information may or may not contain any information. Further, since the request information does not contain a request (command or instruction), but contains, for example, any information, the request information at issue may be determined as being the request information by the identification information transmitting server 6. The request information transmitting unit 14 may include a transmitting device for transmission (e.g. modem or network card), or may not include it (In this case, the transmitting device not shown is located between the request information transmitting unit 14 and the communication processing equipment 3). Further, the request information transmitting unit 14 may be realized in hardware or may be realized in software such as a driver for driving the transmitting device.

The identification information receiving unit 15 receives relay server identification information. This relay server identification information is transmitted from the identification information transmitting server 6. Incidentally, the identification information receiving unit 15 may include a receiving device for reception (e.g. modem or network card), or may not include it (In this case, the receiving device not shown is located between the identification information receiving unit 15 and the communication processing equipment 3). Further, the identification information receiving unit 15 may be realized in hardware or may be realized in software such as a driver for driving the receiving device.

The first accumulating unit 16 accumulates the relay server identification information received by the identification information receiving unit 15 in the storage unit Incidentally, where any two or more components of the first transmission information transmitting unit 12, first data communicating unit 13, request information transmitting unit 14 and identification information receiving unit 15 include devices relative to communication, they may be the same means or different means.

Figure 3:
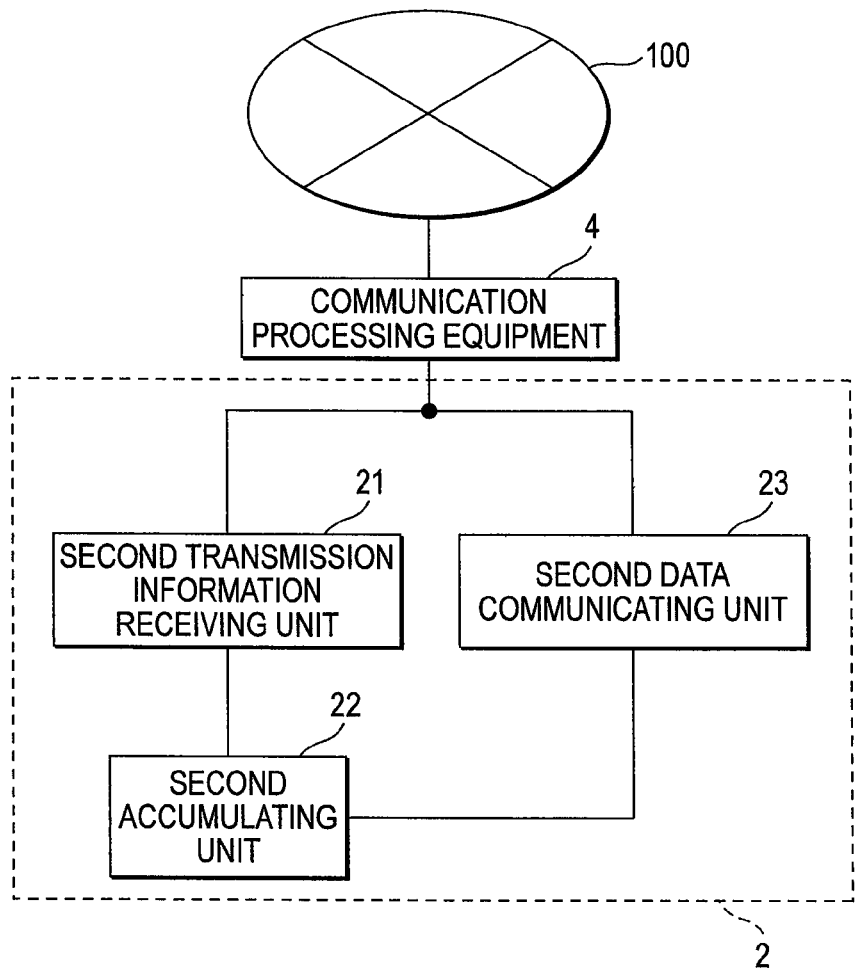
FIG. 3 is a block diagram showing a second information processing equipment according to the first embodiment.

FIG. 3 is a block diagram showing the configuration of the second information processing equipment 2 according to this embodiment. In FIG. 3, the second information processing equipment 2 according to this embodiment includes a second transmission information receiving unit 21, a second accumulating unit 22 and a second data communicating unit 23

The second transmission information receiving unit 21 receives the second transmission information. Now, the second transmission information is transmitted from the mediating server 5, and contains the relay server identification information contained in the first transmission information transmitted from the first information processing equipment 1 to the mediating server 5. Incidentally, the second transmission information receiving unit 21 may include a receiving device for reception (e.g. modem or network card), or may not include it (In this case, the receiving device not shown is located between the second transmission information receiving unit 21 and the communication processing equipment 4). Further, the second transmission information receiving unit 21 may be realized in hardware or may be realized in software such as a driver for driving the receiving device.

The second accumulating unit 22 accumulates, in a predetermined recording medium, the relay server identification information contained in the second transmission information received by the second transmission information receiving unit 21. This recording medium is for example, a semiconductor memory, an optical disk or magnetic disk, and may be included by the second accumulating unit 22 or located outside the second accumulating unit 22. Further, this recording medium may or may not temporarily store the relay identification information.

The second data communicating unit 23 executes the data relay with the first information processing equipment 1. This data relay is executed through the relay server identified by the relay server identification information accumulated by the second accumulating unit 22. Incidentally, the second data communicating unit 23 may include a communicating device for reception (e.g. modem or network card), or may not include it (In this case, the communicating device not shown is located between the second data communicating unit 23 and the communication processing equipment 4). Further, the second data communicating unit 23 may be realized in hardware or may be realized in software such as a driver for driving the receiving device.

Incidentally, where the second transmission receiving unit 21 and second data communicating unit 23 include devices relative to communication, they may be the same means or different means.

Further, since the second information processing equipment 2 executes the communication through the commutation processing equipment 4, as the case may be, the information transmitted from the mediating server 5 cannot be received. For example, if the communication processing equipment 4 is an equipment having an NAT function, where it receives the packet transmitted from an address X and a port number Y on the LAN side of the communication processing equipment 4 (the side of the second information processing equipment 2) and transmits the packet with an address A and a port number B on the WAN side (the communication line 100 side) of the communication processing equipment 4 converted from the address X and port number Y at a transmission source, the packet transmitted to the address A and port number B from the WAN side of the communication processing equipment 4 is transmitted with the address X and port number Y converted from the address A and port number B at a transmission destination. However, after a predetermined time elapses from when address conversion is finally done between the address A, port B and the address X, port Y, where the packet is transmitted from the WAN side of the communication processing equipment 4 to the address A, port B, the address conversion is not done. This predetermined time is referred to as a port keeping time. Therefore, in order that the second information processing equipment 2 can always receive the information transmitted from the mediating server 5 (this is hereinafter referred to as "keeping the port"), a mechanism (not shown) may be prepared which repeatedly transmits a repetitive packet to the relay server at every time periods shorter than the port keeping time.

The "repetitive packet" is a packet which the second information processing equipment 2 repetitively transmits. The "repetitively transmit" is to transmit repetitively any number of times. The period of transmission may be fixed (e.g. every five minutes) or not fixed (e.g. changes from four minutes to five minutes). Incidentally, the period of transmitting the repetitive packet is set to be shorter than the port keeping time of the communication processing equipment 4. The payload of the repetitive packet may or may not contain any information. The repetitive packet is a packet of e.g. UDP (User Datagram Protocol) or TCP (Transmission Control Protocol).

Further, like the second information processing equipment 2, the first information processing equipment 1 may also include the mechanism (not shown) which repeatedly transmits the repetitive packet to the mediating server 5 for keeping the port of the communication processing equipment 3 If the repetitive packet is transmitted from the first information processing equipment 1 to the mediating server 5, even where the port keeping time is set in the communication processing equipment 3, the first information processing equipment 1 can always receive the information transmitted from the mediating server 5. Incidentally, in the communication using the mediating server 5, if the first information processing equipment 1 is invariably a transmission source, the first information processing equipment 1 is not required to transmit the repetitive packet to the mediating server 5.

The communication processing equipment 3 executes the processing relative to the communication between the first information processing equipment 1 and the mediating server 5 and others. The communication processing equipment 3 may be an equipment having an NAT function of doing address conversion between a private address and a global address, an equipment having a Firewall function of packet filtering, or an equipment having both functions. Now, "packet filtering" refers to selecting a received packet on the basis of e.g. a received filter rule. The received filter rule includes e.g. an Address Sensitive filter of receiving the packet from only the address where the packet is transmitted from the port, a Port Sensitive filter of receiving the packet from only the port where the packet is transmitted from the port, and no (No) filter where no filter exists.

The communication processing equipment 4 executes the processing between the second information processing equipment 1 and mediating server 5 and others. The function of the communication processing equipment 4, which is the same as that of the communication processing equipment 3, will not be explained here.

Figure 4:
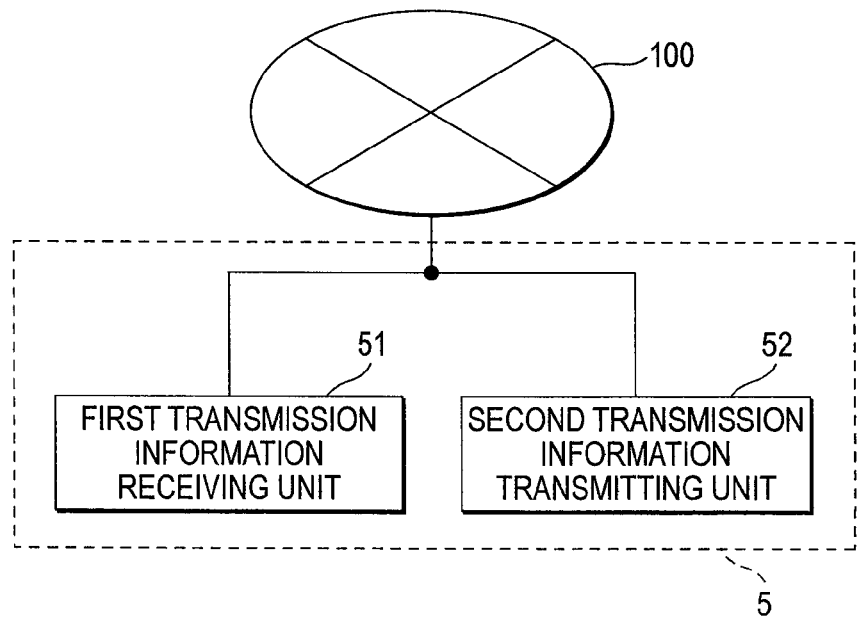
FIG. 4 is a block diagram showing the configuration of a mediating server according to the first embodiment.

FIG. 4 is a block diagram showing the configuration of the mediating server 5 according to this embodiment. In FIG. 4, the mediating server 5 according to this embodiment includes a first transmission information receiving unit 51 and a second transmission information transmitting unit 52. The mediating server 5 may be e.g. a server executing the processing using the SIP. The mediating server 5 transmits the relay server identification information transmitted from the first information processing equipment 1 to the second information processing equipment 2, and so the processing executed by the mediating server 5 is generally "righter" than the processing executed by the relay server.

The first transmission information receiving unit 51 receives the first transmission information transmitted from the first information processing equipment 1. Incidentally, the first transmission information receiving unit 51 may include a receiving device for reception (e.g. modem or network card), or may not include it (In this case, the receiving device not shown is located between the first transmission information receiving unit 51 and the communication line 100). Further, the first transmission information receiving unit 51 may be realized in hardware or may be realized in software such as a driver for driving the receiving device.

The second transmission information transmitting unit 52 transmits the second transmission information to the second information processing equipment 2. This second transmission information, as described above, is the information containing the relay server identification information contained in the first transmission information received by the first transmission information receiving unit 51. The second transmission information transmitting unit 52 may acquire the address of the second information processing equipment 2 using e.g. the equipment identification information identifying the second information processing equipment 2 contained in the first transmission information and transmit the second transmission information to the second information processing equipment 2. Otherwise, the second transmission information transmitting unit 52 may have e.g. a table for correlating the address of a transmission source of the first transmission information and the address of a transmission destination of the second transmission information; referring to the table, acquire the address of the transmission destination of the second transmission information corresponding to the address of the transmission source of the first transmission information, and transmit the second transmission information to the address of the transmission destination of the second transmission information. Now, it is assumed that the "transmitting the second transmission information to the second information processing equipment 2" includes the case of setting the transmission destination of the second transmission information at the address on the WAN side of the communication processing equipment 4. This is because if the communication processing equipment 4 has the NAT function, the address of the second information processing equipment 2 cannot be specified as the transmission destination of the second transmission information, but by specifying the address of the communication processing equipment 4, the address conversion is done in the communication processing equipment 4 so that the second transmission information is transmitted to the second information processing equipment 2. Incidentally, the second transmission information transmitting unit 52 may include a transmitting device for transmission (e.g. modem or network card), or may not include it (In this case, the transmitting device not shown is located between the second transmission information transmitting unit 52 and the communication line 100). Further, the second transmission information transmitting unit 52 may be realized in hardware or may be realized in software such as a driver for driving the transmitting device.

Incidentally, where the first transmission information receiving unit 51 and second transmission information receiving unit 52 include devices relative to communication, they may be the same means or different means.

In this embodiment, an explanation will be given of the case using a single mediating server 5, but the relay server identification information may be mediated by a plurality of mediating servers. The relay server identification information is mediated by the plurality of mediating servers in the case where like e.g. SIP proxy, the plurality of mediating servers execute the communication with one another so that the relay server identification information is mediated from the first information processing equipment 1 to the second information processing equipment 2. Incidentally, where the communication system is provided with a plurality of mediating servers, the plurality of mediating servers are collectively referred to as the mediating server 5. Thus, the mediating server 5 may include a plurality of servers.

Figure 5:
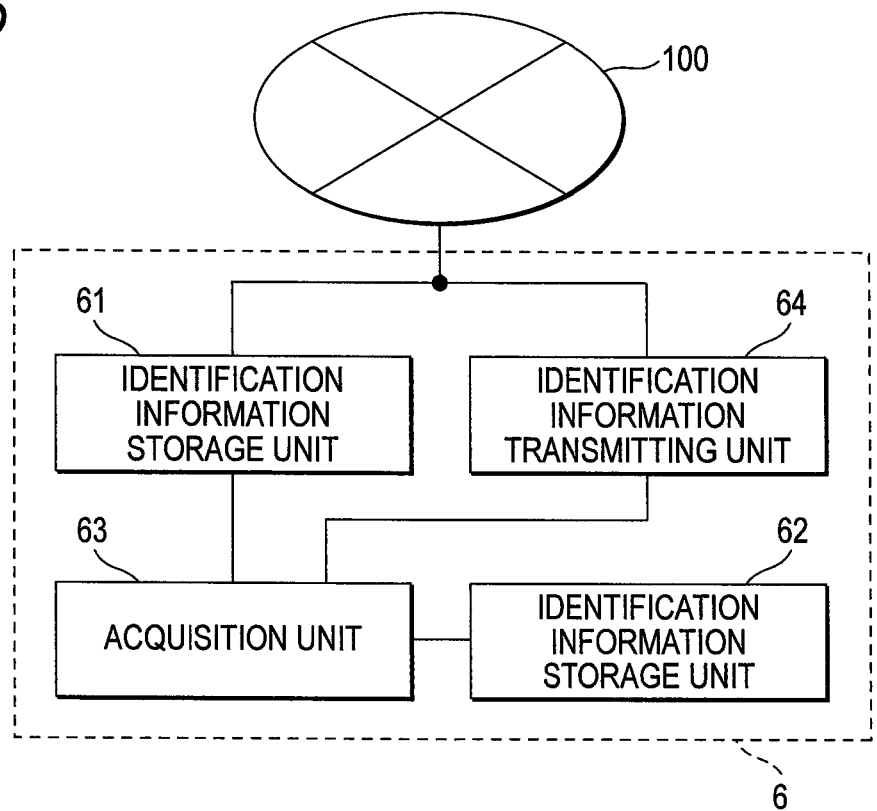
FIG. 5 is a block diagram showing the configuration of an identification information transmitting server according to the first embodiment.

FIG. 5 is a block diagram showing the configuration of the identification information transmitting server 6 according to this embodiment. In FIG. 5, the identification information transmitting server 6 according to this embodiment includes a request information receiving unit 61, an identification information storage unit 62, an acquisition unit 63 and an identification information transmitting unit 64.

The request information receiving unit 61 receives the request information transmitted from the first information processing equipment 1. Incidentally, the request information receiving unit 61 may include a receiving device for reception (e.g. modem or network card), or may not include it (In this case, the receiving device not shown is located between the request information receiving unit 61 and the communication line 100). Further, the request information receiving unit 61 may be realized in hardware or may be realized in software such as a driver for driving the receiving device.

The identification information storage unit 62 stores relay server identification information for the first to third relay servers 7 to 9. The identification information storage unit 62 can be realized by a predetermined storage medium (e.g. semiconductor memory, magnetic disk or optical disk).

The acquisition unit 63 acquires any relay server identification information of the relay server identification information for the first to third relay servers 7 to 9 stored in the identification information storage unit 62. The timing of acquiring the relay server identification information may be e.g. a timing when the request information receiving unit 61 receives the request information, a timing when the relay server identification information previously acquired is transmitted by the identification information transmitting unit 64 described later, or other timings. In this embodiment, it is assumed that the relay server identification information is acquired at the timing when the request information receiving unit 61 receives the request information. As the method for acquiring any one of two or more items of the relay server identification information by the acquisition unit 63, there are e.g. (1) a method of acquiring any one item of the relay server identification information at random; (2) a method of acquiring the relay server identification information in order for each acquisition; and (3) a method of acquiring the relay server identification information of the relay server not congested on the basis of the degree of congestion in the relay servers; and (4) a method of acquiring the relay server identification information of the relay server near to a district of the information processing equipment executing the data relay. Now, in the method of the above (4), as the method for acquiring the district of the information processing equipment having transmitted the request information, there is e.g. a method of accessing the server which manages the information indicative of the correlation between an IP address and the district where the equipment specified by the IP address is situated, thereby acquiring the district of the information processing equipment from the IP address of the information processing equipment (address of the transmission source of the request information). Incidentally, any item of the relay server identification information may be acquired from two or more items of the relay server identification information by the method other than the above (1) to (4).

Figure 6:
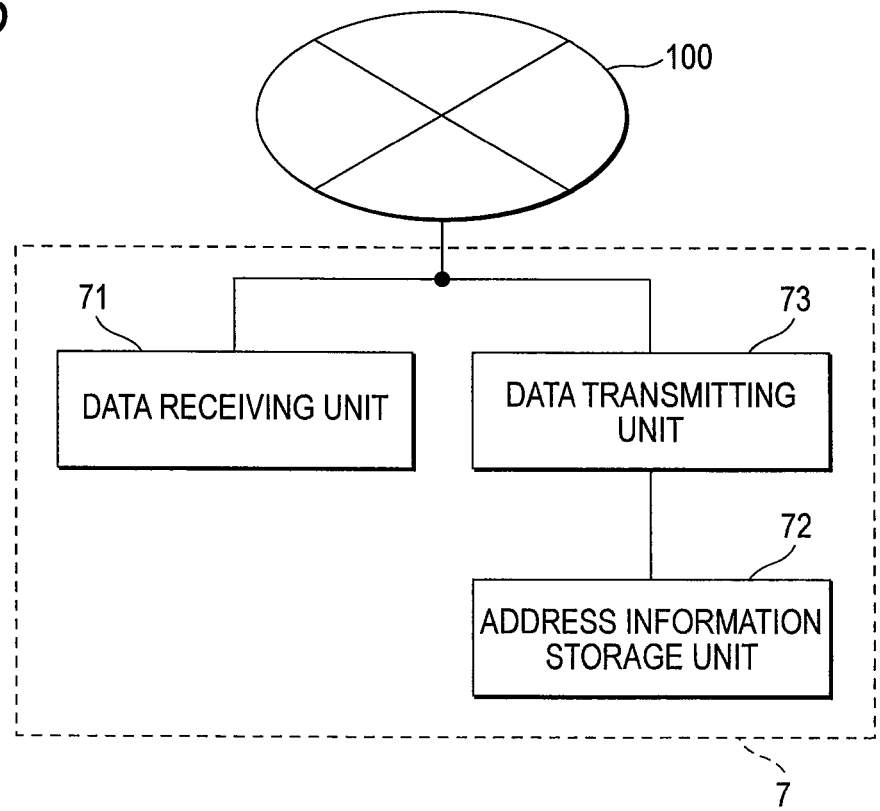
FIG. 6 is a block diagram of a first relay server according to the first embodiment.

The identification information transmitting unit 64 transmits the relay server identification information acquired by the acquisition unit 63 to the first processing equipment 1 which is the transmission source of the request information. The identification information transmitting unit 64 transmits the relay server identification information when the request information receiving unit 61 receives the request information. Now, it is assumed that the "transmitting the information to the first information processing equipment 1" includes the case of setting the transmission destination of the information at the address on the WAN side of the communication processing equipment 3. This is because if the communication processing equipment 3 has the NAT function, the address of the first information processing equipment 1 cannot be specified as the transmission destination of the information, but by specifying the address of the communication processing equipment 3, the address conversion is done in the communication processing equipment 3 so that the information is transmitted to the first information processing equipment 1. Further, it is assumed that the "transmitting the information to the second information processing equipment 2" includes the case of setting the transmission destination of the information at the address on the WAN side of the communication processing equipment 4. In the following description also, it is assumed that the "transmitting the information to the first information processing equipment 1" includes the case of setting the transmission destination of the information at the address on the WAN side of the communication processing equipment 3 and assumed that the "transmitting the information to the second information processing equipment 2" includes the case of setting the transmission destination of the information at the address on the WAN side of the communication processing equipment 4. Incidentally, the identification information transmitting unit 64 may include a transmitting device for transmission (e.g. modem or network card), or may not include it (In this case, the transmitting device not shown is located between the identification information transmitting unit 64 and the communication line 100). Further, the identification information transmitting unit 64 may be realized in hardware or may be realized in software such as a driver for driving the transmitting device Incidentally, where the request information receiving unit 61 and identification information transmitting unit 64 include devices relative to communication, they may be the same means or different means In the above explanation, the identification information transmitting server 6, when it receives the request information transmitted from the first information processing equipment 1, acquires the relay server identification information and transmits it. However, the identification information transmitting server 6, when it receives the request information transmitted from the other equipments or servers, may acquire the relay server identification information and transmits it to the equipment or server which is the transmission source of the request information FIG. 6 is a block diagram of the configuration of the first relay server 7 according to this embodiment. In FIG. 6, the first relay server 7 according to this embodiment includes a data receiving unit 71, an address information storage unit 72 and a data transmitting unit 73

The data receiving unit 71 receives the data transmitted from the information processing equipment serving as the transmission source in the data relay. Incidentally, the data receiving unit 71 may include a receiving device for reception (e.g. modem or network card), or may not include it (In this case, the receiving device not shown is located between the data receiving unit 71 and the communication line 100). Further, the data receiving unit 71 may be realized in hardware or may be realized in software such as a driver for driving the receiving device The address information storage unit 72 stores the information relative to the address of the information processing equipment executing the data relay. The address information storage unit 72 may store e.g. the addresses of two information processing equipments executing the data relay. The address information storage unit 72 can be realized by a predetermined storage medium (e.g. semiconductor memory, magnetic disk or optical disk).

The data transmitting unit 73 transmits the data received by the data receiving unit 71 to the information processing equipment serving as the transmission source in the data relay. For example, where the address information storage unit 72 stores the addresses of two information processing equipments executing the data relay, the data transmitting unit 73 reads out, from the address information storage unit 72, the address of the information processing equipment corresponding to the information processing equipment at the transmission source of the data received by the data receiving unit 71 and transmits the data received by the data receiving unit 71 to the address.

Incidentally, where the data receiving unit 71 and data transmitting unit 73 include devices relative to communication, they may be the same means or different means Further, the configuration of the first relay server 7 shown in FIG. 6 is exemplary. As long as the relay server can relay the data transmitted from a certain information processing equipment to the other information processing equipment, the configuration other than that shown in FIG. 6 may be also adopted. For example, if the data received by the data receiving unit 71 contains the address of a relay destination of the data, without using the address stored in the address information storage unit 72, the data relay may be done using the address contained in the data.

The configuration of each of the second and third relay servers 8, 9 is also the same as that of the first relay server 7.

Therefore, assuming that the second relay server 8 includes a data receiving unit 81, an address information storage unit 82 and a data transmitting unit 83, and the third relay server 9 includes a data receiving unit 91, an address information storage unit 92 and a data transmitting unit 93, the explanation for the relay servers 8, 9 will not be given.

Next, referring to the flowchart of FIG. 7, an explanation will be given of the operation of the first information processing equipment according to this embodiment.

(Step S101)

The first data communicating unit 13 determines if or not the present timing is a timing starting the data relay. If it is the timing of starting the data relay, the processing proceeds to step S102. If not, the processing of step S101 is repeated until the present timing becomes the timing of starting the data relay. Now, the timing of starting the data relay may be e.g. a timing of triggering a predetermined event (receiving an instruction of starting the data relay from a user or others), or may be other timings.

(Step S102)

The request information transmitting unit 14 transmits the request information to the identification information transmitting server 6.

(Step S103)

The identification information receiving unit 15 determines if or not the relay server identification information transmitted from the identification information transmitting server 6 has been received. If the relay server identification information has been received, the processing proceeds step S104. If not, the processing of step S103 is repeated until the relay server identification information is received. Incidentally, if the relay server identification information cannot be received indefinitely owing to e.g. shut-down of the identification information transmitting server 6, the identification information receiving unit 15 may determine time-out after a predetermined time (e.g. one minute) elapses from when the request information is transmitted, thus completing a series of processing operations.

(Step S104)

The first accumulating unit 16 accumulates the relay server identification information received by the identification information receiving unit 15 in the storage unit 11

(Step S105)

The first transmission information transmitting unit 12 transmits the first transmission information containing the relay server identification information accumulated in the storage unit 11 to the mediating server 5.

(Step S106)

The first data relay communicating unit 13 executes the data relay with the second information processing equipment 2 using the relay server identified from the relay server identification information stored in the storage unit 11. The processing of the data relay in step S106 may include the processing of repeatedly transmitting the repetitive packet for the port-keeping of the communication processing equipment 3 or may not include it. The transmission destination of this repetitive packet is e.g. the relay server identified from the relay server identification information stored in the storage unit 11. Further, the processing of the data relay is divided into the processing in which the first data communicating unit 13 is connected to the relay server identified by the relay server through e.g. TCP or UDP and the processing in which the second communicating unit 23 of the second information processing equipment 2 is likewise connected to the relay server at issue and thereafter the data relay is executed for the second data communicating unit 23 through the relay server. Upon completion of the data relay, the processing returns to step S101. Incidentally, after the first transmission information transmitting unit 12 transmits the first transmission information in step S105, when the first information processing equipment 1 receives through the mediating server 5 the information that the second information processing equipment 2 has become the state capable of executing the data relay, the first data communicating unit 13 may start the data relay.

Figure 7:
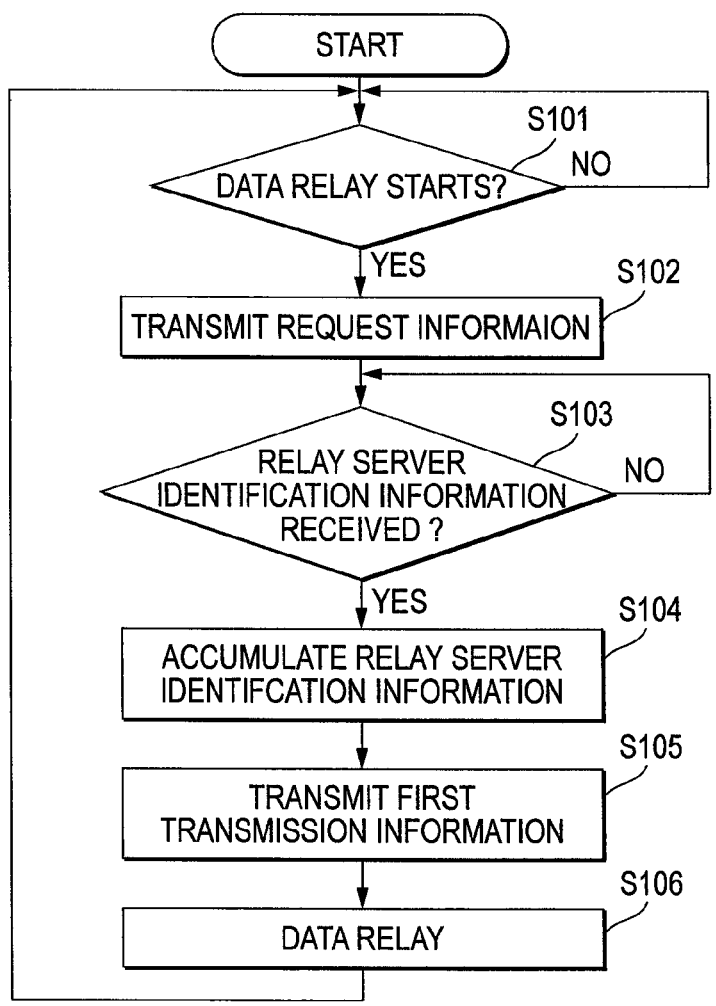
FIG. 7 is a flowchart showing the operation of the first information processing equipment according to the first embodiment.

Incidentally, in the flowchart of FIG. 7, the processing is ended by turn-off of a power source or interruption of processing completion.

Next, referring to the flowchart of FIG. 8, an explanation will be given of the operation of the second information processing equipment 2.

(Step S201)

The second transmission information receiving unit 21 determines if or not the second transmission information has been received. If the second transmission information has been received, the processing proceeds to step S202. If not, the processing of step S201 is repeated unit the second transmission information is received.

(Step S202)

The second accumulating unit 22 accumulates the relay server identification information contained in the second transmission information received by the second transmission information receiving unit 21.

(Step S203)

The second data relay communicating unit 23 executes the data relay with the first information processing equipment 1 using the relay server identified from the relay server identification information stored in the second accumulating unit 22. The processing of the data relay in step S203 may include the processing of repeatedly transmitting the repetitive packet for the port-keeping of the communication processing equipment 4 or may not include it. The transmission destination of this repetitive packet is e.g. the relay server identified from the relay server identification information accumulated in the second accumulating unit 22. Further, like the processing of step S106, the processing of this data relay is also divided into the processing in which the second data communicating unit 23 is connected to the relay server identified by the relay server through e.g. TCP or UDP and the processing in which the first communicating unit 13 of the first information processing equipment 1 is likewise connected to the relay server at issue and thereafter the data relay is executed for the first data communicating unit 13 through the relay server. Upon completion of the data relay, the processing returns to step S201.

Incidentally, before the data relay is executed in step S203 after the second transmission information has been received in step S201, the second information processing equipment 2 may transmit the fact that the data relay can be executed (e.g. the second transmission information has been received) to the first information processing equipment 1 via the mediating server 5.

Figure 8:
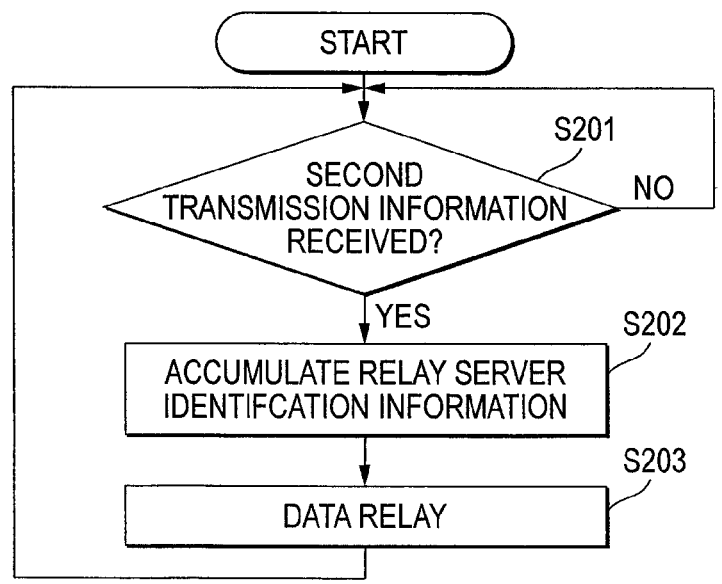
FIG. 8 is a flowchart showing the operation of the second information processing equipment according to the first embodiment.

Incidentally, in the flowchart of FIG. 8, the processing is ended by turn-off of a power source or interruption of processing completion.

Next, referring to the flowchart of FIG. 9, an explanation will be given of the operation of the mediating server 5 according to this embodiment.

(Step S301)

The first transmission information receiving unit 51 determines if or not the first transmission information has been received. If the first transmission information has been received, the processing proceeds to step S302. If not, the processing of step S301 is repeated until the first transmission information is received.
(Step S302)

The second transmission information transmitting unit 52 creates the second transmission information containing the relay server identification information contained in the first transmission information received by the first transmission information receiving unit 51 and transmits the second transmission information to the second information processing equipment 2. The processing returns to step S301.

Figure 9:
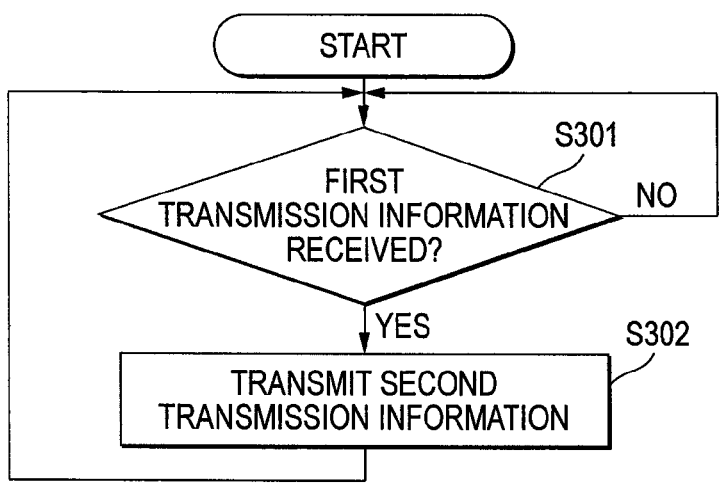
FIG. 9 is a flowchart showing the operation of the mediating server according to the first embodiment.

Incidentally, in the flowchart of FIG. 9, the processing is ended by turn-off of a power source or interruption of processing completion.

Next, referring to the flowchart of FIG. 10, an explanation will be given of the operation of the identification information transmitting server 6 according to this embodiment.
(Step S401)

The request information receiving unit 61 determines if or not the request information has been received. If the request information has been received, the processing proceeds step S402. If not, the processing of step S401 is repeated until the request information is received.
(Step S402)

The acquisition unit 63 acquires any item from a plurality of items of the relay server identification information stored in the identification information storage unit 62. The details of the operation of the acquisition unit 63 acquiring the relay server identification information will be described later.
(Step S403)

The identification information transmitting unit 64 transmits the relay server identification information acquired by the acquisition unit 63 to the first information processing equipment 1 which is the transmission source of the request information. The processing returns to step S401.

Figure 10:
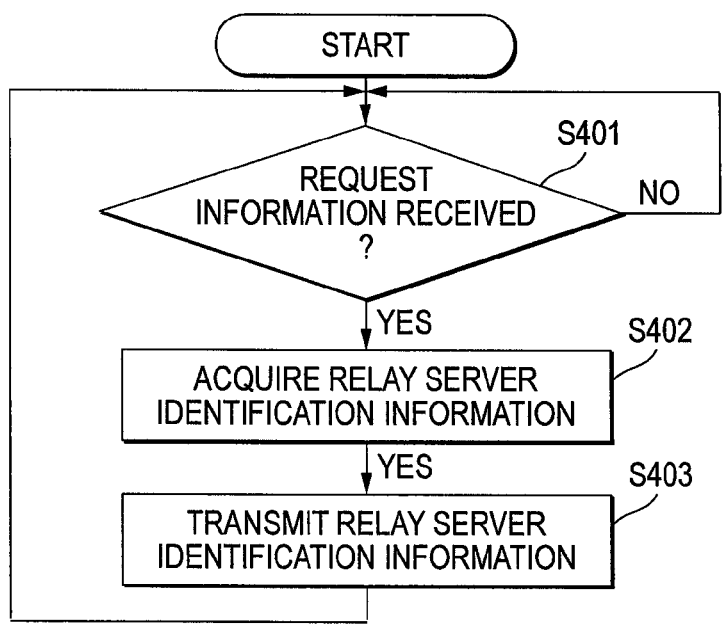
FIG. 10 is a flowchart showing the operation of the identification information transmitting server according to the first embodiment.

Incidentally, in the flowchart of FIG. 10, the processing is ended by turn-off of a power source or interruption of processing completion.

Next, referring to the flowchart of FIG. 11, an explanation will be given of the operation of the first relay server 7 according to this embodiment
(Step S501)

The data receiving unit 71 determines if or not the data for data relay has been received. If the data for data relay has been received, the processing proceeds to step S502. If not, the processing of step S501 is repeated until the data for data relay is received.
(Step S502)

The data transmission unit 73 acquires, from the address information storage unit 72, the address information of the transmission destination (relay destination) of the data received in step S501.
(Step S503)

The data transmitting unit 73 transmits the data using the address information acquired in step S502 to the transmission destination. The processing returns to step S501.

Figure 11:
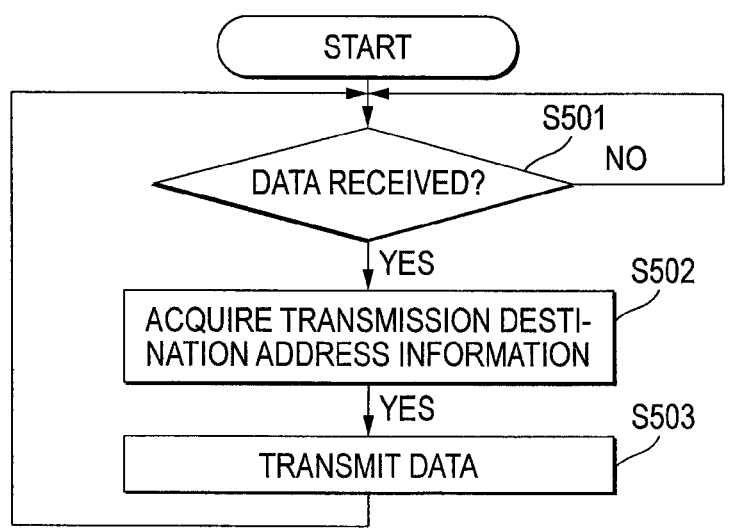
FIG. 11 is a flowchart showing the operation of the relay server according to the first embodiment.

Incidentally, in the flowchart of FIG. 11, the processing is ended by turn-off of a power source or interruption of processing completion.

Further, where the data relay is executed after the address and port number of each of the first information processing equipment 1 and second information processing equipment 2 have been registered in the relay server, registering processing of the address and others of the first information processing equipment 1 and others may be done in the first relay server 7.

The operation of the second relay server 8 and the third relay server 9 is the same as that of the first relay server 7.

Next, using concrete examples, an explanation will be given of the communication system according to this embodiment. In these concrete examples, it is assumed that the mediating server 5 is a server of the SIP. Further, it is assumed that the relay server identification information is an IP address of the relay server. Further, in the first concrete example, it is assumed that the request information contains domain information. Now, the domain information contained in the request information is the information corresponding to the relay server identification information for the first to third relay servers 7 to 9. In the second concrete example, it is assumed that the request information does not contain the domain information. The IP addresses of the information processing equipments are as follows.

First information processing equipment 1: 192.168.0.10
Second information processing equipment 2: 192.168.1.20
Communication processing equipment 3 (WAN side): 111.222.111.1
Communication processing equipment 4 (WAN side): 111.222.123.1
Mediating server 5: 200.100.10.10
Identification information server 6: 202.123.10.10
First relay server 7: 155.32.10.10
Second relay server 8: 155.32.10.11
Third relay server 9: 155.32.10.12

Concrete Example 1

The domain information contained in the request information is the information corresponding to the relay server identification information for a plurality of relay servers selectively employed for load dispersion in the data relay. In the case of the communication system shown in FIG. 1, the domain information is the information corresponding to the relay server identification information for the first to third relay servers 7 to 9. The domain information may be e.g. "server.pana.net" or www.server.pana.net called FQDN (Fully Qualified Domain Name).

Figures 12, 13:
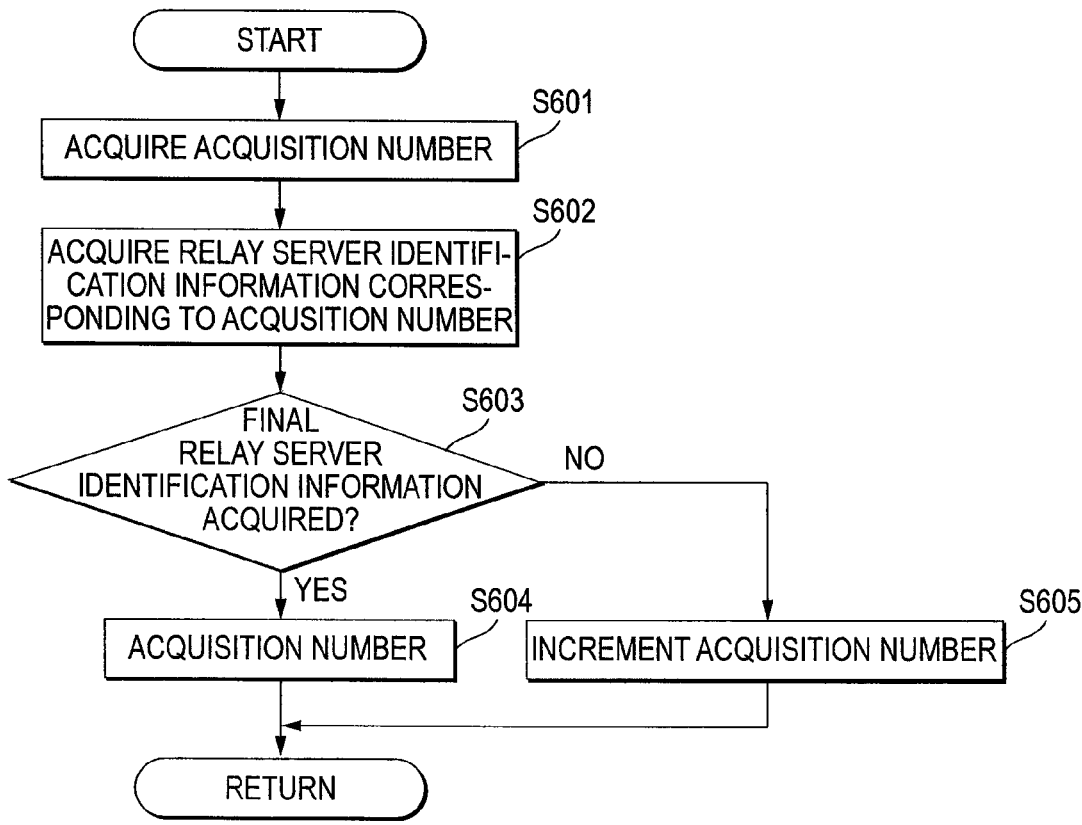
FIG. 12 is a view showing an example of the information stored in an identification information storage unit of the identification information transmitting server according to the first embodiment.
FIG. 13 is a flowchart showing an example of the operation of the identification information transmitting server according to the first embodiment.

It is assumed that the identification information storage unit 62 of the identification information transmitting server 6 stores two or more items of the relay server identification information correlated with one item of the domain information. FIG. 12 is a table showing an example of the information stored in the identification information storage unit 62. In FIG. 12, two or more items of relay server information are stored to be correlated with one item of domain information. The acquisition number correlated with the domain information is the information indicative of the relay server identification information of the order corresponding to the domain number when the request information containing certain domain information is received. This information is updated when the relay server identification information is acquired. The acquisition unit 63 acquires one item of the two or more items of the relay server identification information corresponding to the domain information contained in the request information. The identification information transmitting server 6 may be e.g. a DNS (Domain Name System) server or a server different therefrom.

FIG. 13 is a flowchart showing the details of the processing of step S402 in this concrete example. The flowchart of FIG. 13 is explained here.
(Step S601)

The acquisition unit 63 acquires, from the identification information storage unit 62, the acquisition number corresponding to the domain information contained in the request information received by the request information receiving unit 61.
(Step S602)
The acquisition unit 63 acquires the relay server identification information corresponding to the acquisition number thus acquired of the two or more items of the relay server identification information corresponding to the domain information contained in the request information received by the request information receiving unit 61.
(Step S603)
The acquisition unit 63 determines if the relay server identification information thus acquired is final relay server identification information. If it is the final relay server identification information, the processing proceeds to step S604. If not, the processing proceeds to step S605
(Step S604)
The acquisition unit 63 updates the acquisition number corresponding to the domain information contained in the request information received by the request information receiving unit 61 to "1". The processing proceeds to step S403 in the flowchart of FIG. 10.
(Step S605)
The acquisition unit 63 increments the acquisition number corresponding to the domain information contained in the request information received by the request information receiving unit 61 by "1 (one)". The processing proceeds step S403 in the flowchart of FIG. 10.

Figure 14:
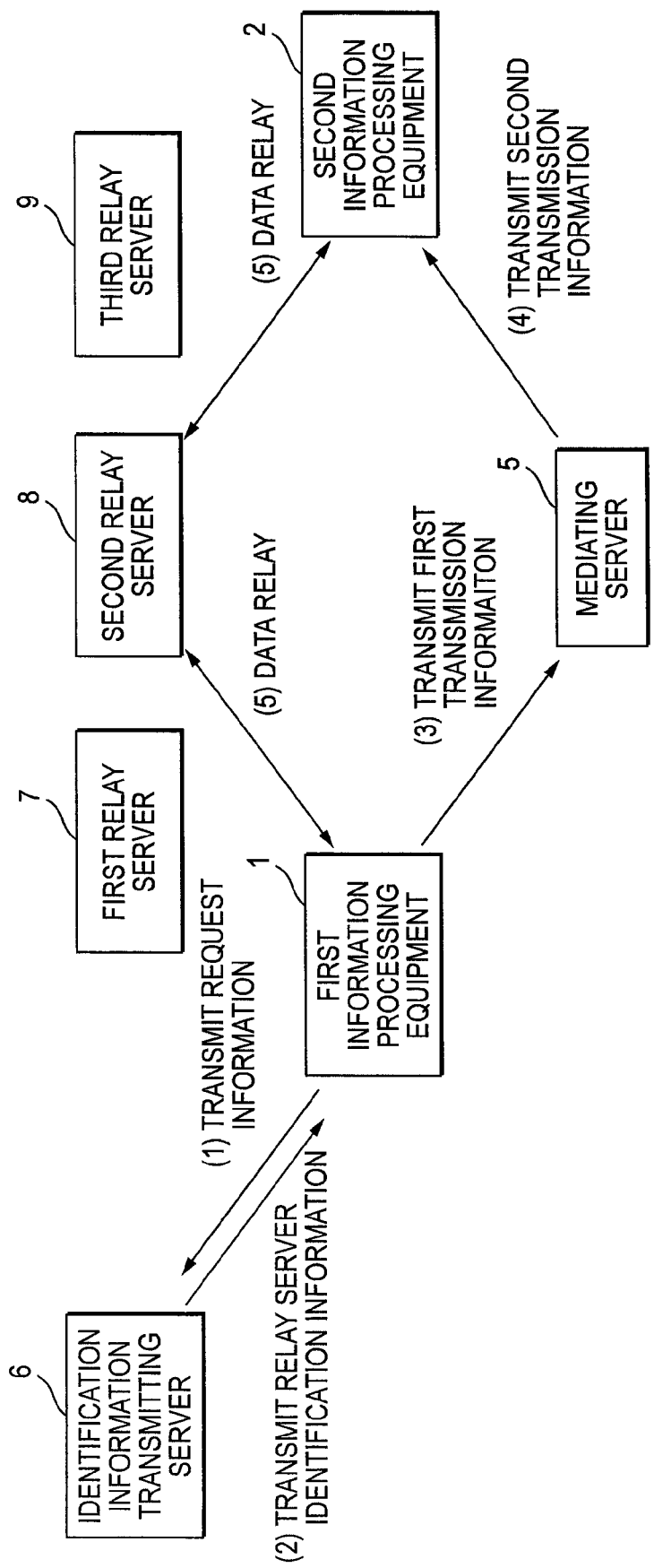
FIG. 14 is a view for explaining the transmission/reception of information between the equipments and servers in the first embodiment.

FIG. 14 is a view for explaining the transmission/reception of information among the information processing equipments and servers. Referring to FIG. 14, an explanation will be given of the first concrete example. Incidentally, in FIG. 14, although the communication processing equipments 3, 4 are not shown, it should be noted that the first information processing equipment 1 and second information processing equipment 2 execute the communication through the communication processing equipments 3, 4, respectively.

First, the first information processing equipment 1 and second information processing equipment 2 register, in the mediating server 5, the IP address and port number to be correlated with the equipment identification information which is the information for identifying the device, respectively. Incidentally, in the strict sense, the registered IP address and port number are the IP address and port number of the communication processing equipment 3, 4. FIG. 15 is a view showing an example of the correlation between the address information (IP address, port number) registered in the mediating server 5 and the equipment identification information. In FIG. 15, equipment identification information AAA is the equipment identification information of the first information processing equipment 1, and equipment identification information BBB is the equipment identification information of the second information processing equipment 2. It is assumed that the information indicative of the correlation between the equipment identification information and address information shown in FIG. 15 is held in the second transmission information transmitting unit 52 of the mediating server 5. Incidentally, it is assumed that the first information processing equipment 1 and second information processing equipment 2 repeatedly transmit the repetitive packet to the mediating server 5 so that they can always receive the information transmitted from the mediating server 5 in order to execute the communication through the communication processing devices 3, 4.

Now, the first data communicating unit 13 of the first information processing equipment 1 determines to start the data relay and sends an instruction to the request information transmitting unit 14 to transmit the request information (step S101). Then, in accordance with the instruction, the request information transmitting unit 14 transmits the request information containing previously set domain information "www.server.pana.net" to the IP address "202.123.10.10" of the identification information transmitting server 6 which is previously set in the request information transmitting unit 14 (step S102).

The request information is converted address-converted by the communication processing equipment 3 and transmitted to the identification information transmitting server 6. The request information receiving unit 61 of the identification information transmitting server 6 receives the request information (step S401). The acquisition unit 63, referring to information stored in the identification information storage unit 62 (information shown in FIG. 12), acquires the acquisition number "2" corresponding to the domain information "www.server.pana.net" contained in the request information received by the request information receiving unit 61 (step S601), and acquires the second relay server identification information "155.32.10.11" corresponding to the domain information "www.server.pana.net" (step S602). The relay server identification information thus acquired is the second item of the three items of the relay server identification information and is not the final item of the relay server identification information. So, the acquisition unit 63 increments the acquisition number by "1" to be updated to "3" (steps S603, S605). The identification information transmitting unit 64 transmits the relay server identification information "155.32.10.11" acquired by the acquisition unit 63 to the IP address "111.222.111.1" which is a transmission source of the request information. This IP address is the address of the transmission source contained in the header of the request information.

The relay server identification information transmitted from the identification information transmitting server 6 is address-converted by the communication processing equipment 3 and received by the identification information receiving unit 15 of the first information processing equipment 1 (step S103). This relay server identification information is accumulated in the storage unit 11 by the first accumulating unit 16 (step S104). Thereafter, the first transmission information transmitting unit 12 transmits, to the mediating server 5, the first transmission information which is a calling control message of the SIP containing the relay server identification information "155.32.10.11" stored in the storage unit 11 in the calling ID of the SIP and containing the equipment identification information BBB of the second information processing equipment 2 (step S105).

Concretely, in order to embed the relay server identification information "155.32.10.11" in the calling ID of the calling control message of the SIP, first, the relay server identification information "155.32.10.11" is converted from binary data into text data. The ASCII of the relay server identification information "155.32.10.11 by BASE 64 provides "myAKCw". The calling ID with the relay server identification information embedded is "EF873B46myAKCw@192.168.0.10". The part of 192.168.0.10 in the calling ID is the IP address of the calling equipment, i.e. first information processing equipment 1. The character string "EF873B46 before myAKCw is a random number.

The first transmission information is address-converted by the communication processing equipment 3 and received by the first transmission information receiving unit 51 of the mediating server 5 (step S301). The second transmission information transmitting unit 52, referring to the information shown in FIG. 15, acquires the address information corresponding to the equipment identification information "BBB" contained in the first transmission information, and transmits the second transmission information to the IP address "111.222.123.1" and the port number "12345" represented by the address information acquired (step S302). This second transmission information is a calling control message of the SIP like the first transmission information. Namely, in this concrete example, in the packet of the first transmission information and the packet of the second transmission information, the information of the payload is the same calling control message.

The second transmission information is address-converted by the communication processing equipment 4 and received by the second transmission receiving unit 21 of the second information processing equipment 2 (step S201). The relay server identification information "myAKCw" contained in the calling ID of the second transmission information is converted from text data into binary data so that the relay server identification information "155.32.10.11" is accumulated by the second accumulating unit 22 (step S202).

Thereafter, the first data communicating unit 13 accesses the second relay server 8 represented by the relay server identification information "155.32.10.11" stored in the storage unit 11. The second data communicating unit 23 accesses the second relay server 8 represented by the relay server identification information "155.32.10.11" accumulated by the accumulating unit 22. In this way, between the first information processing equipment 1 and the second information processing equipment 2, the data relay is executed through the second relay server 8 (steps S106, S203, S501 to S503).

In the data relay through the second relay server 8, first, the fact that the first information processing equipment 1 and second information processing equipment 2 are to execute the data relay is registered in the address information storage unit 82. Concretely, registered are the address and port number of the first information processing equipment 1 side (in the strict sense, communication processing equipment 3) and the address and port number of the second information processing equipment 2 side (in the strict sense, communication processing equipment 4). If the transmission source of the packet received is the address, port number of the first information processing equipment 1 side, the second relay server 8 transmits the packet to the second information processing equipment 2; and if the transmission source of the packet received is the address, port number of the second information processing equipment 2 side, the second relay server 8 transmits the packet to the first information processing equipment 1. Incidentally, this processing in the relay server is exemplary. For example, if the data transmitted from the first information processing equipment 1 contains the address and port number of the second information processing equipment 2 which is a destination of the data relay, the data relay may be executed using this address and others.

Additionally, in this concrete example, where the first information processing equipment 1 transmits the relay server identification information to the second information processing equipment 2 through the mediating server 5, the relay server identification information is converted in to the text by BASE 64. However, this processing is exemplary. For example, if the relay server identification information is the IP address of IPv4, by dividing the IP address into 8 parts by 4 bits and allotting any character string of 0 to F of hexadecimal to each division part, the relay server identification information (IP address) may be converted into the character string of 8 byte to be embedded in the calling ID. Otherwise, the relay server identification information (IP address), as it is, may be embedded into the calling ID. As a method for embedding the relay server identification as it is in the calling ID, for example, if the calling ID is "EF873B46@192.168.0.10", the relay server identification information "155.32.10.11", as it is, may be embedded so as to provide the calling ID EF873B46.155.32.10.11@192.168.0.10. Otherwise, the relay server identification may be embedded as a 12-digits number so as to the call ID EF873B46155032010011@192.168.0.10. In the former case, the relay server identification information is represented by the four numbers "155.32.10.11" between the periods before "@"; and in the latter case, the relay server identification information is represented by the 12-digits number "155032010011" before "@".

Concrete Example 2

In this concrete example, it is assumed that the request information does not contain the domain information. It is assumed that the relay server identification information stored in the identification information storage unit 62 of the identification information transmitting server 6 is shown in FIG. 16. In FIG. 16, only items of the relay server identification information corresponding to the first to third relay servers 7 to 9 are stored in the identification information storage unit 62, and these items of relay server identification information are correlated with items of load information, respectively. Namely, it is assumed that the identification information transmitting server 6 is dedicated to the first to third relay servers 7 to 9. Now, the load information is information indicative of the load (or congestion degree) of processing in the relay server identified by the relay server identification information, which is represented by 0% to 100%. The larger the value, the larger is the load (or congested). It is assumed that the load information is updated by a load updating unit not shown in the identification information transmitting server 6. It is assumed that the load updating unit receives from the first to third relay servers 7 to 9, for example, the information indicative of load in the first to third relay servers 7 to 9 and updates the load information on the basis of the information received. It is assumed that the acquisition unit 63 acquires the relay server identification information with the smallest value of the load designated by the load information when it acquires the relay server identification information from the identification information storage unit 62. Incidentally, in this concrete example, the processing other than the transmission of the request information from the first information processing equipment 1 to the identification information transmitting server 6 and acquisition of the relay server identification information in the identification information transmitting server 6, which is the same as in the first concrete example, will not be explained here.

If the first data communication unit 13 of the first information processing equipment 1 determines that the present timing is a timing of starting the data relay (step S101), the request information transmitting unit 14 transmits the request information to the IP address "202.123.10.10" of the identification information transmitting server 6 (step S102). It is assumed that this request information contains the information indicative of the request information.

The request information is address-converted by the communication processing equipment 3 and transmitted to the identification information transmitting server 6. The request information receiving unit 61 of the identification information transmitting server 6 receives the request information (step S401). The acquisition unit 63, referring to the information stored in the identification information storage unit 62 shown in FIG. 16, acquires the relay server identification information "155.32.10.11" corresponding to the load information "20%" with the smallest value (step S402). This relay server information acquired is transmitted to the first information processing equipment 1 (step S403). The subsequent processing, which is the same as in the first concrete example, will not explained.

As described above, in the communication system according to this embodiment, the data relay is executed using a plurality of relay servers. For this reason, unlike the case where the data relay is executed using a single relay server, it is possible to prevent the load of data relay from being concentrated to the single relay server and disperse the load. As a result, if the plurality of relay servers are used, the throughput of each relay server is not required to be higher than the case using the single relay server.

Further, which of the plurality of relay server is employed in the data relay can be transmitted from the first information processing equipment 1 to the second information processing equipment 2 through the mediating server 5. Therefore, if the second information processing equipment 2 accesses the relay server designated by the relay server identification information transmitted from the first information processing equipment 1, through the relay server, the data relay can be executed between the first information processing equipment 1 and the second information processing equipment 2. In this way, which relay server is employed in the data relay is transmitted through the mediating server 5. So, the second information processing equipment 2 is not required to transmit the repetitive packet to the first to third relay servers 7 to 9, thereby preventing the processing burden of the second information processing equipment 2 from increasing even if the plurality of relay servers are employed.

Further, a set (group) of the relay servers can be specified by the domain information. For example, it is assumed that the communication system includes the set of the first to third relay servers 7 to 9 shown in FIG. 1 executing the data relay of audio and video data and a set of fourth to sixth relay servers for establishing the communication of Peer-to-Peer not shown in FIG. 1; the domain information "www.music.pana.net" corresponds to the set of first to third relay servers 7 to 9; and the domain information "www.p2p.pana.net" corresponds to the fourth to sixth relay servers. In such a case, with the domain information for both sets being held in the request information transmitting unit 14, by changing the domain information contained in the request information according to the purpose of the data relay to be executed, the relay server corresponding to the purpose may be selected. For example, where the data relay of audio data is executed, the request information transmitting unit 14 may transmit the request information containing the domain information "www.music.pana.net"; and where the control for establishing the communication of Peer-to-Peer is executed, the request information transmitting unit 14 may transmit the request information containing the domain information "www.p2p.pana.net".

Incidentally, in the concrete examples of this embodiment, the explanation has been given of the case where the payload of the packet of the first transmission information received by the mediating server 5 and the payload of the packet of the second transmission information transmitted by the mediating server 5 contain the same information. However, they may be different. For example, the first transmission information may contain the equipment identification information for identifying the second information processing equipment 2 whereas the second transmission information may not contain the equipment identification information.

Embodiment 2

Now referring to the drawings, an explanation will be given of the communication system according to the second embodiment of this invention. The communication system according to this embodiment does not include the identification information transmitting server, and which of the plurality of relay servers is employed in the data relay is determined in the first information processing equipment.

Figure 17:
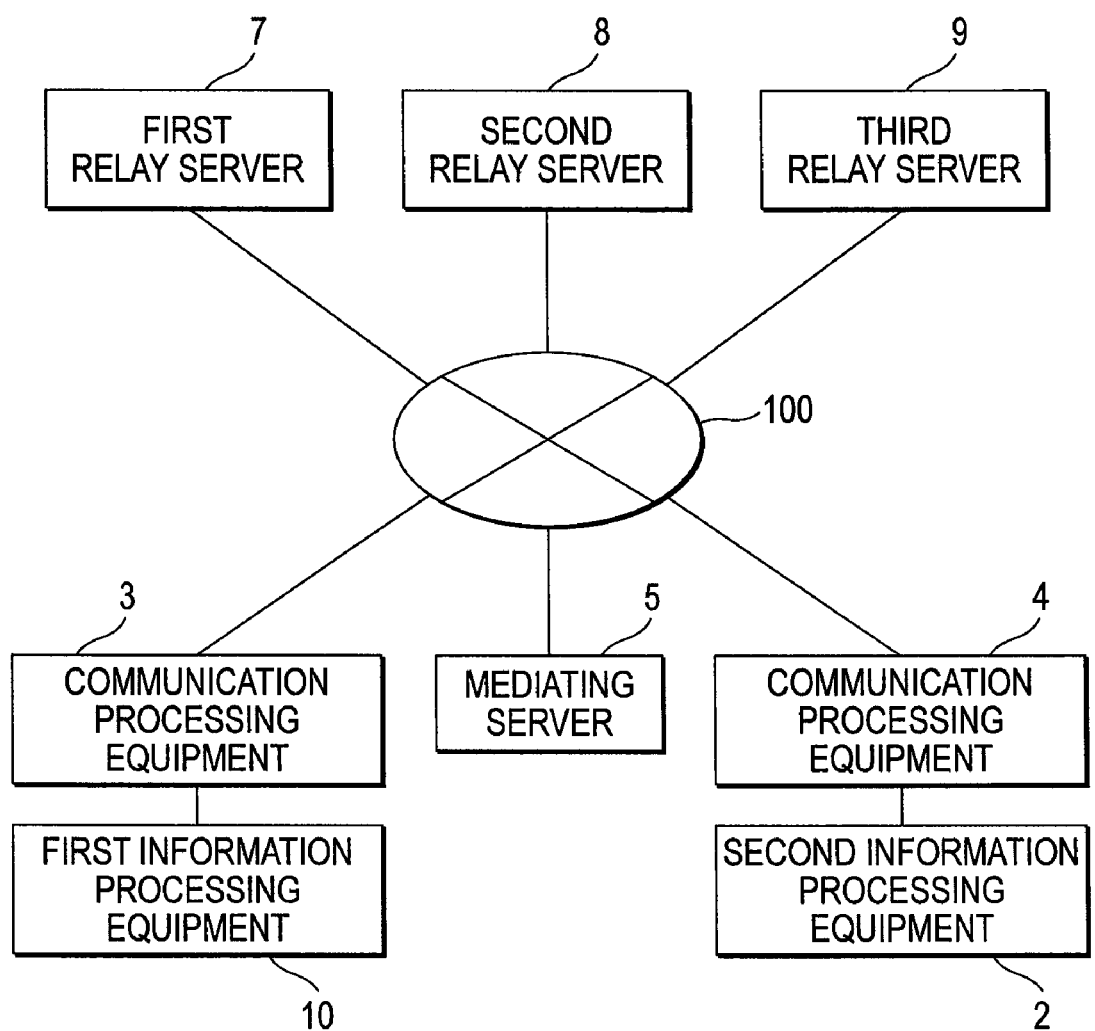
FIG. 17 is a view showing the configuration of a communication system according to the second embodiment of this invention.

FIG. 17 is a view showing the configuration of the communicating system according to this embodiment. In FIG. 17, the communication system according to this embodiment includes a first information processing equipment 10, a second information processing equipment 2, communication processing equipments 3, 4, a mediating server 5, a first relay server 7, a second relay server 8 and a third relay server 9. This embodiment is the same as the first embodiment except that the first information processing equipment 1 is replaced by the first information processing equipment 10. Therefore, the configuration and operation other than that of the first information processing equipment 10, which are the same as in the first embodiment, will not be explained.

Figure 18:
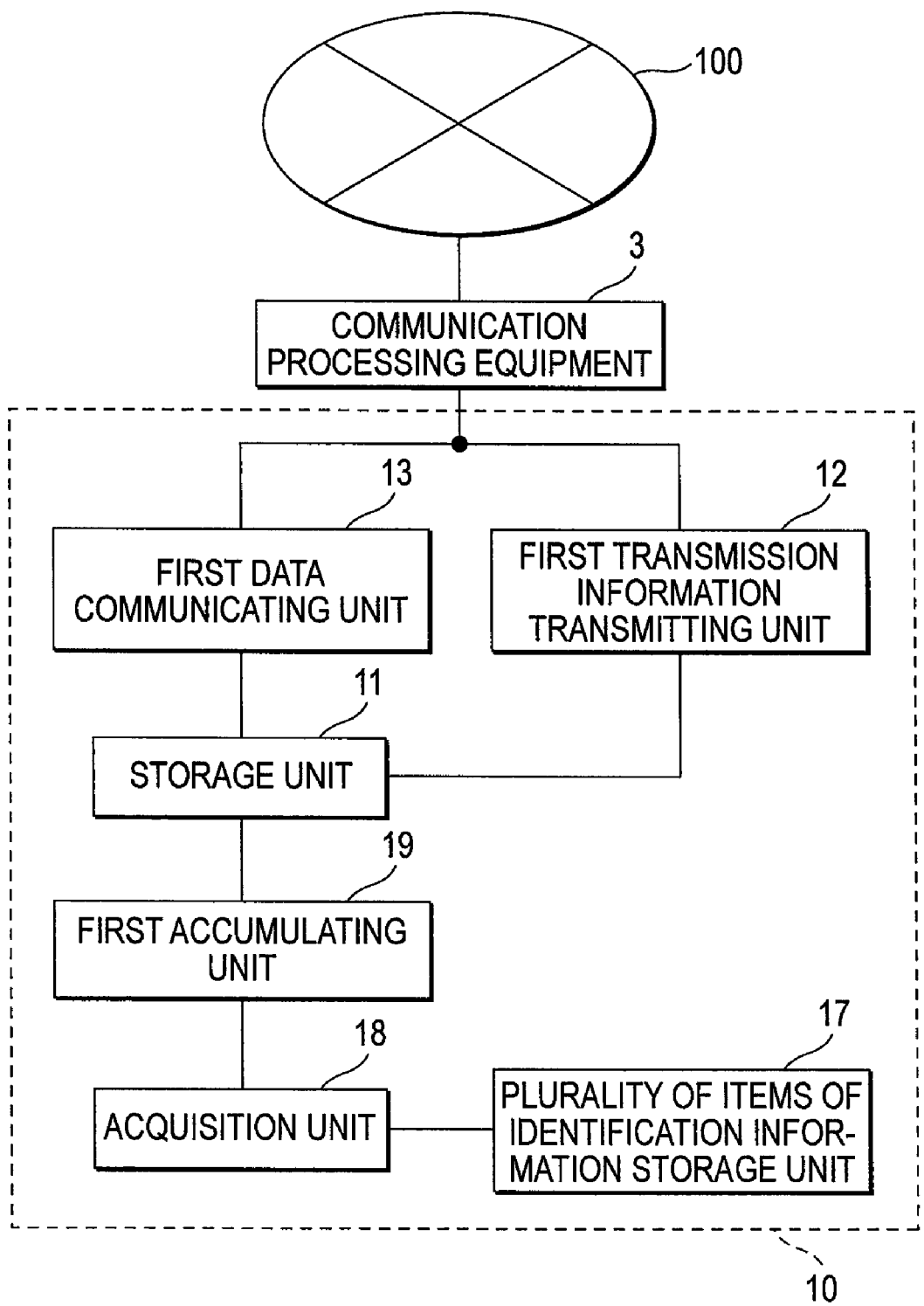
FIG. 18 is a block diagram showing the configuration of a first information processing equipment according to the second embodiment.

FIG. 18 is a block diagram showing the first information processing equipment 10 according to this embodiment. In FIG. 18, the first information processing equipment 10 according to this embodiment includes a storage unit 11, a first transmission information transmitting unit 12, a first data communicating unit 13, a plurality of items of identification information storage unit 17, an acquisition unit 18 and a first accumulating unit 19. Incidentally, the configuration and operation of the storage unit 11, first transmission information transmitting unit 12 and first data communicating unit 13, which are the same as in the first embodiment, will not be explained.

The plurality of items of identification information storage unit 17 stores two or more items of identification information. The two or more items of identification information are the relay server identification information for identifying the relay server selectable as the relay server employed in the data relay executed between the first information processing equipment 10 and the second information processing equipment 2. In this embodiment, the plurality of items of identification information storage unit 17 stores the relay server identification information for the first to third relay servers 7 to 9. The plurality of items of identification information storage unit 17 can be realized by a predetermined storage medium (e.g. semiconductor memory, magnetic disk or optical disk).

The acquisition unit 18 acquires any item of the two or more items of relay server identification information stored in the plurality of items of identification information storage unit 17. The method for acquiring any item of the two or more items of relay server identification information by the acquisition unit 18, which is the same as the method of acquiring the relay server identification information by the acquisition unit 63 in the first embodiment, will not be explained here.

The first accumulating unit 19 accumulates the relay server identification information acquired by the acquisition unit 18 in the storage unit 11. Incidentally, where the first accumulating unit 19 accumulates the relay server identification information in the storage unit 11, the relay server identification information may be accumulated by overwriting the relay server identification information previously accumulated and stored in the storage unit 11. Otherwise, the relay server identification information may be accumulated separately from the relay server identification information stored and a predetermined flag may be set for only the relay server identification finally accumulated so that the first data communication unit 13 can use the relay server identification information accumulated latest.

Figure 19:
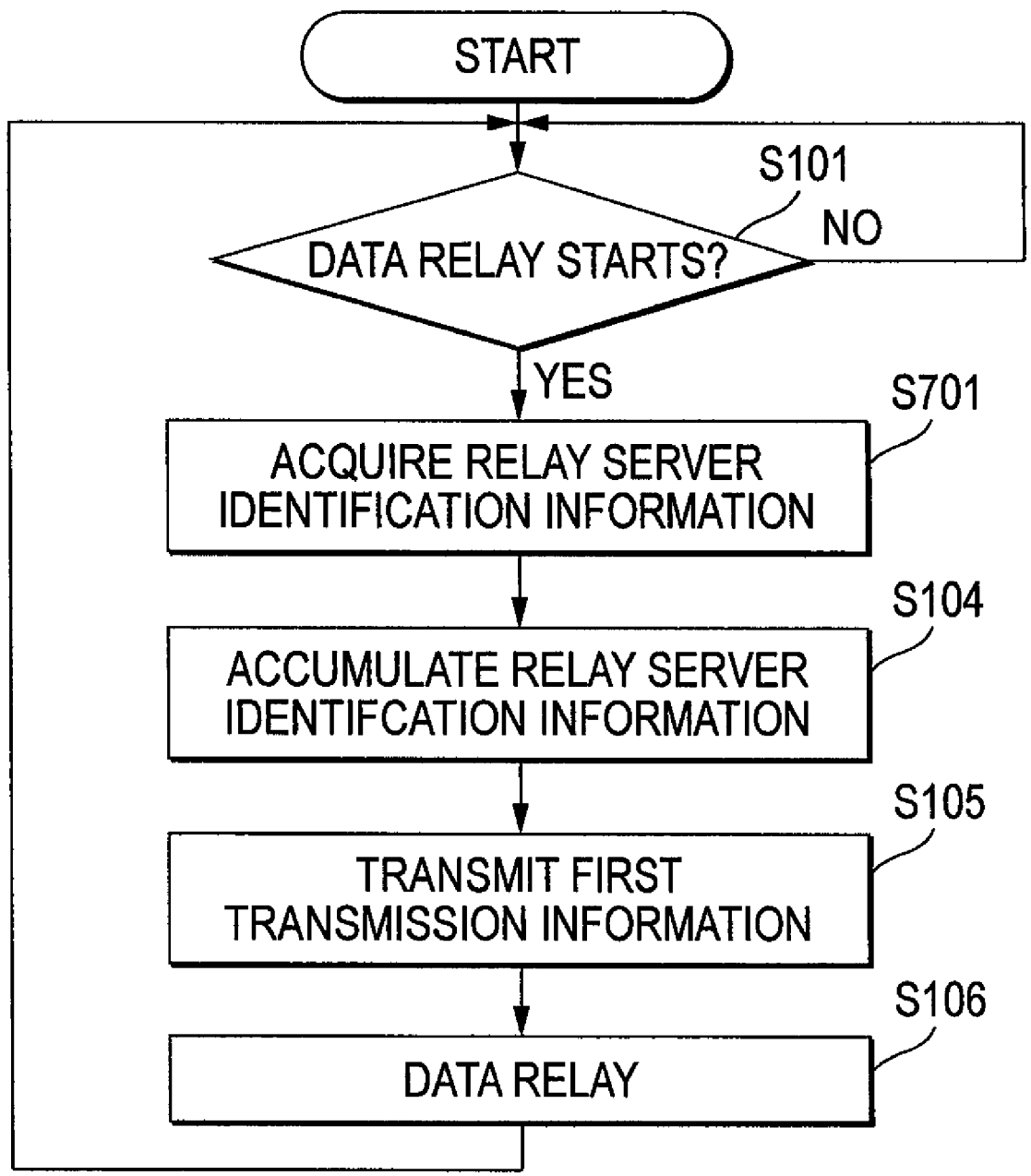
FIG. 19 is a flowchart showing the operation of the first information processing equipment according to the second embodiment.

Next, referring to the flowchart of FIG. 19, an explanation will be given of the operation of the first information processing equipment 10 according to this embodiment. Incidentally, in the flowchart shown in FIG. 19, the processing other than step S701, which is the same as that in the flowchart shown in FIG. 7 according to the first embodiment, will not be explained. Incidentally, the relay server identification information to be accumulated in step S104 is acquired by the acquisition unit 18 and accumulated by the first accumulating unit 19.

(Step S701)

The acquisition unit 18 acquires any item from the plurality of items of the relay server identification information stored in the plurality of items of identification information storage unit 17.

Figure 20:
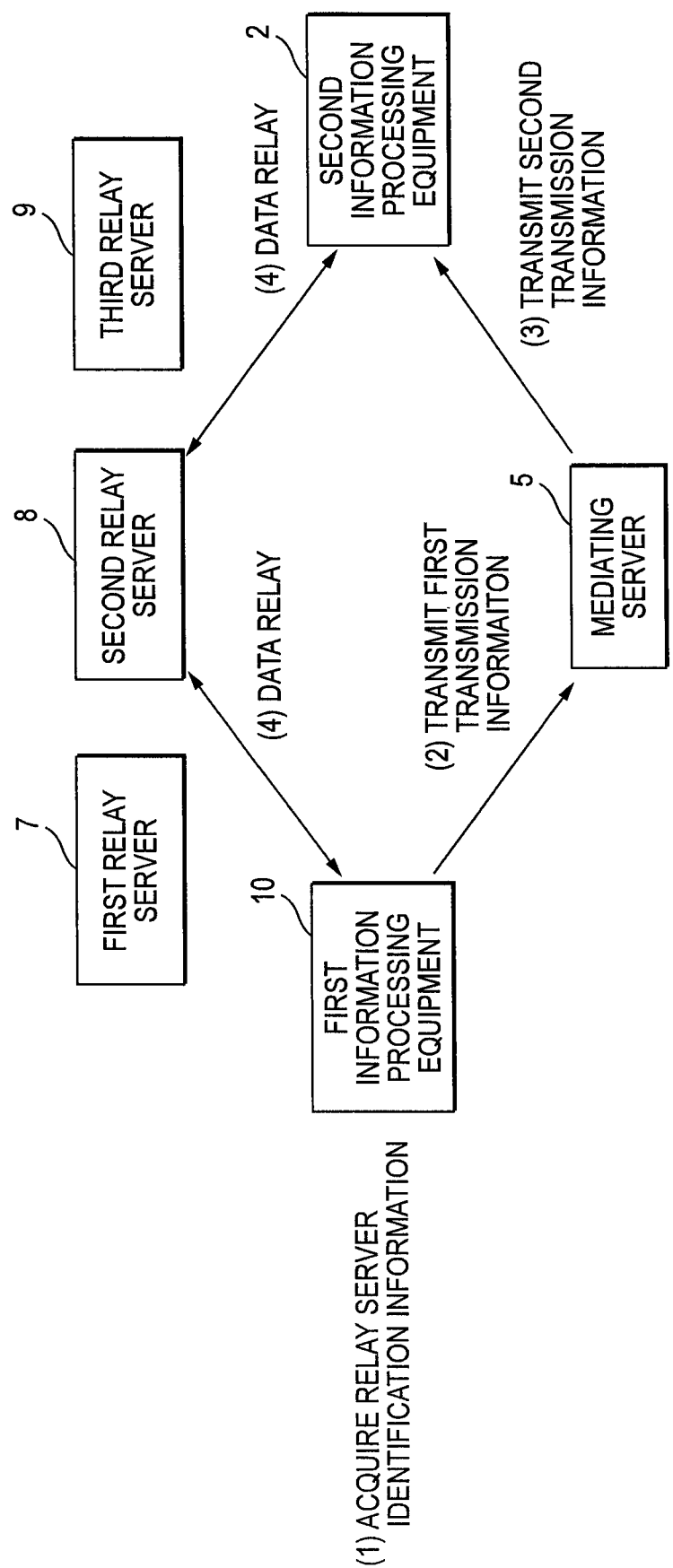
FIG. 20 is a view showing an example of the information stored in an identification information storage unit of the identification information transmitting server according to the second embodiment.
Figure 21:
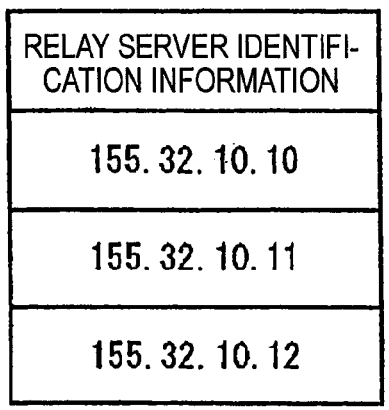
FIG. 21 is a view showing an example of the relay server information stored in a plurality of identification information storage units of the first information processing equipment according to the second embodiment.

Next, using a concrete example, an explanation will be given of the operation of the communication system according to this embodiment. FIG. 20 is a view for explaining the transmission/reception of information among the information processing equipments and servers. Incidentally, in FIG. 20, although the communication processing equipments 3, 4 are not shown, the communication in the first information processing equipment 10 and others is executed through the communication processing equipments 3, 4. In FIG. 20, the processing other than the acquisition of the relay server identification information in the first information processing equipment 10, which is the same as that in the concrete examples in the first embodiment, will not be explained. Further, it is assumed that the addresses of the equipments and servers are the same as those in the concrete examples in the first embodiment and the plurality of items of identification information storage unit 17 stores the relay server identification information shown in FIG. 21.

Now, the first data communicating unit 13 of the first information processing equipment 10 determines to start the data relay and sends an instruction of acquiring the relay server identification information to the acquisition unit 18 (step S101). Then, the acquisition unit 18 acquires a single item from the plurality of items of identification information storage unit 17. Now, it is assumed that the relay server identification information "155.32.10.11" has been acquired (step S701). The relay server identification information thus acquired is accumulated in the storage unit 11 by the first accumulating unit 19 (step S104). The subsequent processing to the data relay through the second relay server 8, which is the same as in the first embodiment, will not be explained.

As understood from the description hitherto made, in accordance with the communication system according to this embodiment, in the first information processing equipment 10, the relay server identification information can be acquired, and using the relay server identified by the relay server identification information thus acquired, the data relay can be executed between the first information processing equipment 10 and the second information processing equipment 2. Thus, the same effect as in the communication system according to the first embodiment can be obtained.

Incidentally, in this embodiment, the explanation has been given of the case where in the first information processing equipment 10, the relay server identification information is acquired at the timing of starting the data relay. However, the timing of acquiring the relay server identification information is not limited to the timing of starting the data relay. For example, the acquisition unit 18 may acquire the relay server identification information at the timing when the first information processing equipment 10 is actuated, and the relay server identification information may be employed until the first information processing equipment 10 will shut down. Otherwise, the acquisition unit 18 may acquire the relay server identification information periodically (for example, every 10 hours).

Further, in the first and second embodiments, the explanation has been given of the case where the first information processing equipment receives or acquires the relay server identification information which will be accumulated in the storage unit 11. However, in the first information processing equipment 1, the relay server identification information may be previously stored in the storage unit 11. For example, in the process of manufacturing and assembling the first information processing equipment, the storage unit 11 which previously stores the relay server identification information may be built in the first information processing equipment. For example, where 300 (three hundreds) first information processing equipments are manufactured, in first 100 first information processing equipments, the storage unit 11 stores the relay server identification information of the first relay server 7, in next 100 first information processing equipments, the storage unit 11 stores the relay server identification information of the second relay server 8, and in further 100 first information processing equipments, the storage unit 11 stores the relay server identification information of the third relay server 9. In such a manner, the load in the relay servers can be dispersed. Further, the relay server identification information may be manually accumulated in the storage unit 11 in such a manner that a user accesses the first information processing equipment through a PC (Personal Computer). In this way, the first information processing equipment may not include the request information transmitting unit 14, identification information receiving unit 15, first accumulating unit 16, plurality of items of identification information storage unit 17, acquisition unit 18 and first accumulating unit 19.

Embodiment 3

Figure 22:
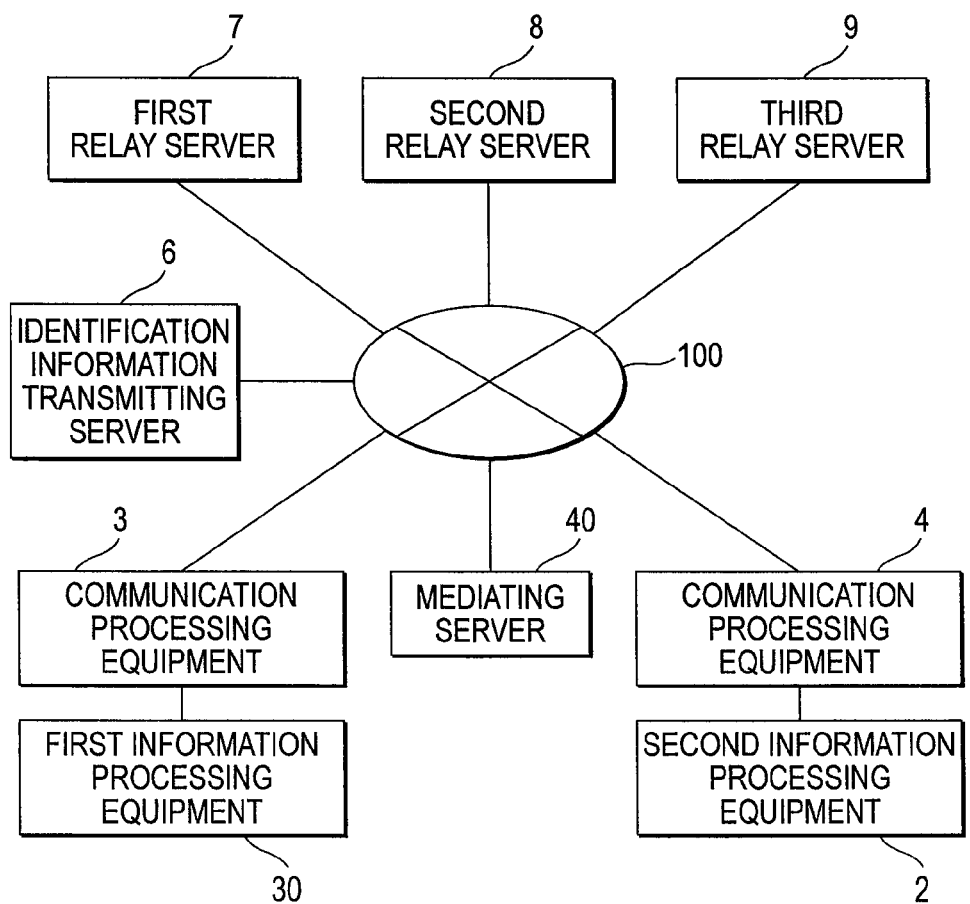
FIG. 22 is a view showing the configuration of a communication system according to the third embodiment of this invention.

Now referring to the drawings, an explanation will be given of the communication system according to the third embodiment. In the communication system according to this embodiment, the first transmission information transmitted to the mediating server from the first information processing equipment does not contain the relay server identification information for identifying the relay server employed in the data relay whereas the information transmitted from the mediating server to the first and second information processing equipments contains the relay server identification information for identifying the relay server employed in the data relay FIG. 22 is a view showing the configuration of the communication system according to this embodiment. In FIG. 22, the communication system according to this embodiment includes a first information processing equipment 30, a second information processing equipment 2, communication processing equipments 3, 4, a mediating server 40, an identification information processing server 6, a first relay server 7, a second relay server 8 and a third relay server 9. The configuration of this embodiment is the same as that of the first embodiment except that the first information processing equipment 1 is replaced by the first information processing equipment 30 and the mediating server 5 is replaced by the mediating server 40. The configuration and operation of the components other than the first information processing equipment 30 and mediating server 40, which are the same as in the first embodiment, will not be explained here.

Figure 23:
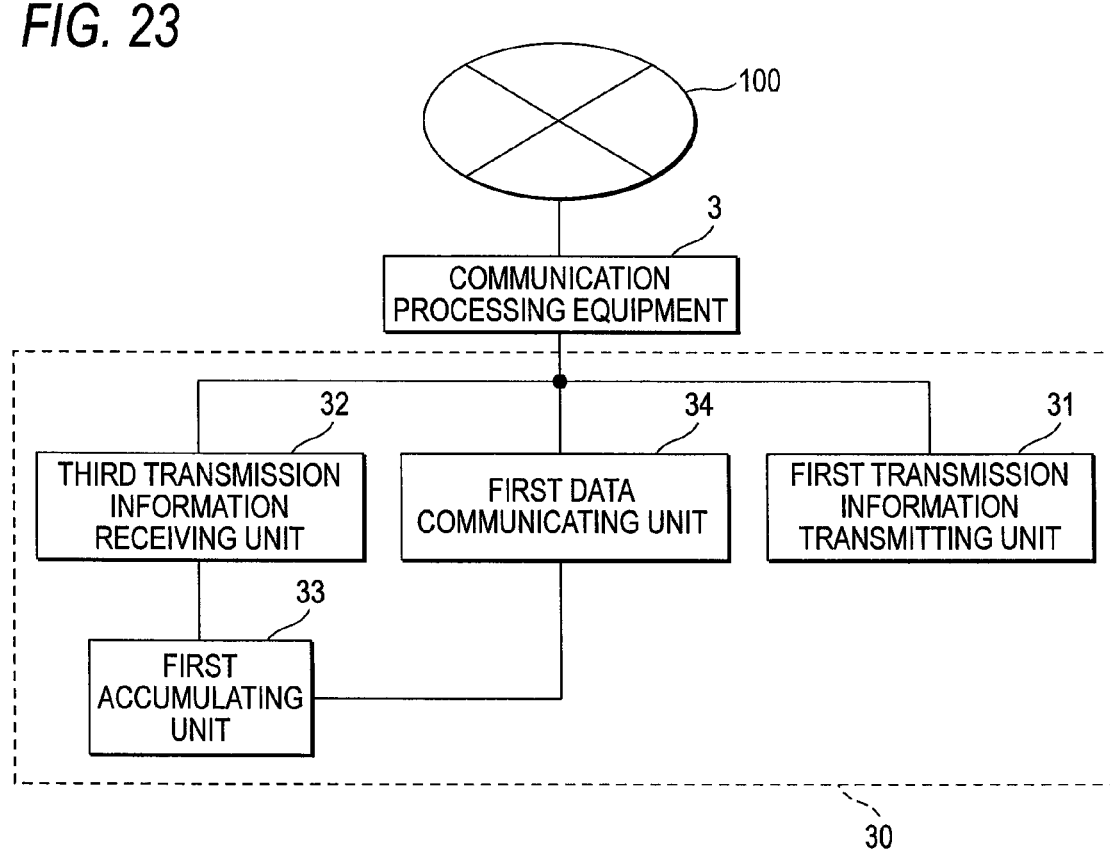
FIG. 23 is a block diagram of the configuration of a first information processing equipment according to the third embodiment.

FIG. 23 is a block diagram showing the configuration of the first information processing equipment 30 according to this embodiment. In FIG. 23, the first information processing equipment 30 according to this embodiment includes a first transmission information transmitting unit 31, a third transmission information receiving unit 32, a first accumulating unit 33 and a first data communicating unit 34.

The first transmission information transmitting unit 31 transmits the first transmission information to the mediating server 40. Now, unlike the first transmission information in the first embodiment, this first transmission information does not contain the relay server identification information. This first transmission information contains a transmission request of the relay server identification information which is the information for identifying the relay server employed in the data relay between the first information processing equipment 30 and the second information processing equipment 2. The configuration of the first transmission information transmitting equipment 31, which is the same as that of the first transmission information transmitting unit 12 in the first embodiment except the contents of the first transmission information, will not be explained here.

The third transmission information receiving unit 32 receives the third transmission information. Now, the third transmission information is the information transmitted from the mediating server 40 and containing the relay server identification information. From the third transmission information, the first information processing equipment 30 can know the relay server to be employed in the data relay with the second information processing equipment 2. Incidentally, the third transmission information transmitting unit 32 may include a transmitting device for transmission (e.g. modem or network card), or may not include it (In this case, the transmitting device not shown is located between the third transmission information transmitting unit 32 and the communication processing equipment 3). Further, the third transmission information transmitting unit 32 may be realized in hardware or may be realized in software such as a driver for driving the transmitting device.

The first accumulating unit 33 accumulates, in a predetermined recording medium, the relay server identification information contained in the third transmission information received by the third transmission information receiving unit 32. This recording medium is e.g. a semiconductor memory, magnetic disk or optical disk. The recording medium may be included in the first accumulating unit 33 or may be located outside the first accumulating unit 33. Further, the recording medium may temporarily store the relay server identification information or may not so.

The first data communicating unit 34 executes the data relay with the second information processing equipment 2 through the relay server identified by the relay server identification information accumulated by the first accumulating unit 33. The first data communicating unit 34 will not be explained since it is the same as the first data communicating unit 13 in the first embodiment except that the data relay with the second information processing equipment 2 is executed through the relay server identified by the relay server identification information accumulated by the first accumulating unit 33 in place of the relay server identification information stored in the storage unit 11.

Incidentally, where any two or more components of the first transmission information transmitting unit 31, third transmission information receiving unit 32 and first data communicating unit 34 include devices relative to communication, they may be the same means or different means.

Figure 24:
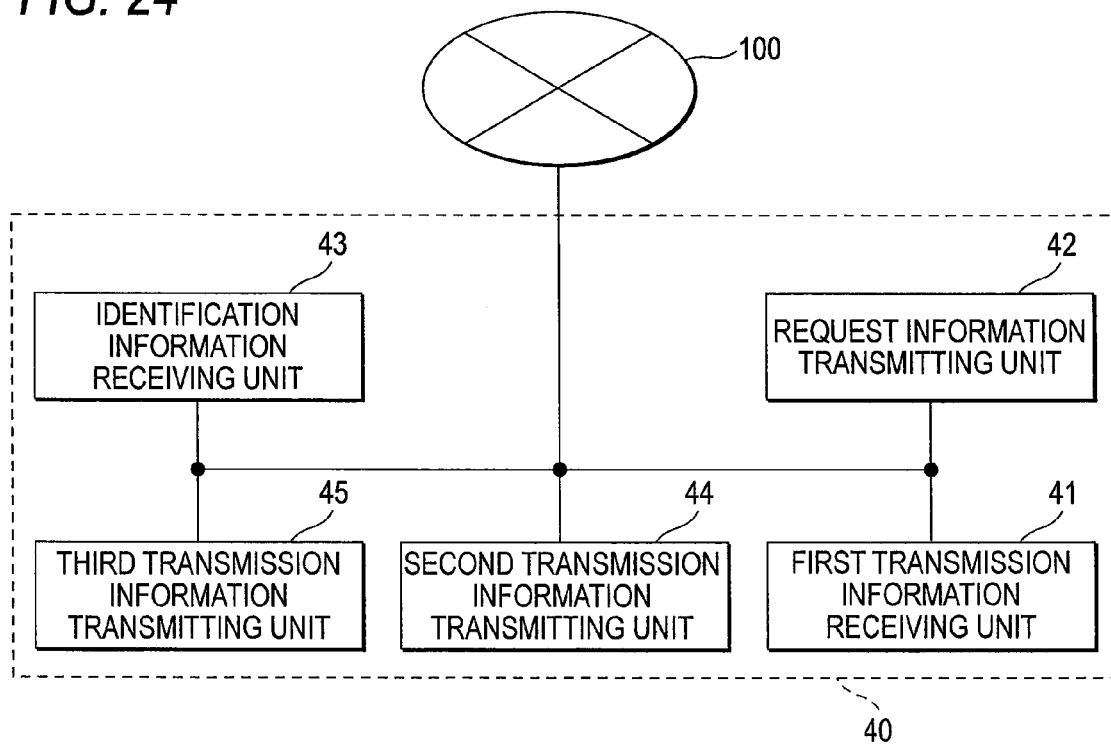
FIG. 24 is a block diagram showing the configuration of a mediating server according to the third embodiment.

FIG. 24 is a block diagram showing the configuration of the mediating server 40 according to this embodiment. In FIG. 24, the mediating server 40 according to this embodiment includes a first transmission information receiving unit 41, a request information transmitting unit 42, an identification information receiving unit 43, a second transmission information transmitting unit 44 and a third transmission information receiving unit 45.

The first transmission information receiving unit 41 receives the first transmission information. The first transmission information is transmitted from the first information processing equipment 30. Incidentally, the first transmission information receiving unit 41 may include a receiving device for reception (e.g. modem or network card), or may not include it (In this case, the receiving device not shown is located between the first transmission information receiving unit 41 and the communication line 100). Further, the first transmission information receiving unit 41 may be realized in hardware or may be realized in software such as a driver for driving the receiving device.

The request information transmitting unit 42 transmits request information. Now, the request information is the information for requesting the transmission of the relay server identification information. The request information transmitting unit 42 transmits the request information to the identification information transmitting server 6. The payload of a packet of the request information may or may not contain any information. Further, since the request information does not contain a request (command or instruction), but contains, for example, any information, the request information at issue may be determined as being the request information by the identification information transmitting server 6. The request information transmitting unit 42 may include a transmitting device for transmission (e.g. modem or network card), or may not include it (In this case, the transmitting device not shown is located between the request information transmitting unit 42 and the communication line 100). Further, the request information transmitting unit 42 may be realized in hardware or may be realized in software such as a driver for driving the transmitting device.

The identification information receiving unit 43 receives the relay server identification information. This relay server identification information is transmitted from the identification information transmitting server 6. Incidentally, the identification information receiving unit 43 may include a receiving device for reception (e.g. modem or network card), or may not include it (In this case, the receiving device not shown is located between the identification information receiving unit 43 and the communication line 100). Further, the identification information receiving unit 43 may be realized in hardware or may be realized in software such as a driver for driving the receiving device.

The second transmission information transmitting unit 44 transmits the second transmission information to the second information processing equipment 2. Now, the second transmission information is the information containing the relay server identification information for identifying the relay server employed in the data relay between the first information processing equipment 30 and the second information processing equipment 2. The second transmission information contains the relay server identification information received by the identification information receiving unit 43. The transmission of the second transmission information is executed when the first transmission information receiving unit 41 receives the first transmission information. Incidentally, the second transmission information transmitting unit 44 may include a transmitting device for transmission (e.g.

modem or network card), or may not include it (In this case, the transmitting device not shown is located between the second transmission information transmitting unit 44 and the communication line 100). Further, the second transmission information transmitting unit 44 may be realized in hardware or may be realized in software such as a driver for driving the transmitting device.

The third transmission information transmitting unit 45 transmits the third transmission information to the first information processing equipment 30. Now, the third transmission information is the information containing the relay server identification information for identifying the relay server employed in the data relay between the first information processing equipment 30 and the second information processing equipment 2. The third transmission information contains the relay server identification information received by the identification information receiving unit 43. The transmission of the third transmission information is executed when the first transmission information receiving unit 41 receives the first transmission information. Incidentally, the third transmission information transmitting unit 45 may include a transmitting device for transmission (e.g. modem or network card), or may not include it (In this case, the transmitting device not shown is located between the third transmission information transmitting unit 45 and the communication line 100). Further, the third transmission information transmitting unit 45 may be realized in hardware or may be realized in software such as a driver for driving the transmitting device.

Incidentally, where any two or more components of the first transmission information receiving unit 41, request information transmitting unit 42, identification information receiving unit 43, second transmission information transmitting unit 44 and third transmission information transmitting unit 45 include devices relative to communication, they may be the same means or different means.

Next, referring to the flowchart of FIG. 25, an explanation will be given of the operation of the first information processing equipment 30 according to this embodiment.

(Step S801)

The first data communication unit 34 determines if the present timing is a timing of starting the data relay. If it is the timing of starting the data relay, the processing proceeds to step S802. If not, the processing of step S801 is repeated until the processing of step S801 is repeated until the present timing becomes the timing of starting the data relay. Now, the timing of starting the data relay may be e.g. a timing of triggering a predetermined event (receiving an instruction of starting the data relay from a user or others), or may be other timings.

(Step S802)

The first transmission information transmitting unit 31 transmits the first transmission information to the mediating server 40.

(Step S803)

The third transmission information receiving unit 32 determines if or not the third transmission information transmitted from the mediating server 40 has been received. If the third transmission information has been received, the processing proceeds to step S804. If not, the processing of S803 is repeated until the third transmission information is received. If the third transmission information cannot be received indefinitely owing to e.g. shut-down of the mediating server 40, the third transmission information receiving unit 32 may determine time-out after a predetermined time (e.g. one minute) elapses from when the first transmission information is transmitted, thus completing a series of processing operations.

(Step S804)

The first accumulating unit 33 accumulates the relay server identification information contained in the third transmission information received by the third transmission information receiving unit 32.

(Step S805)

The first data communicating unit 34 executes the data relay with the second information processing equipment 2 using the relay server identified from the relay server identification information accumulated by the first accumulating unit 33. The processing of the data relay in step S805 may include the processing of repeatedly transmitting the repetitive packet for the port-keeping of the communication processing equipment 3 or may not include it. The transmission destination of this repetitive packet is e.g. the relay server identified from the relay server identification information accumulated in the first accumulating unit 33. Upon completion of the data relay, the processing returns to step S801. Incidentally, after the third transmission information has been received in step S803, when the first information processing equipment 30 receives the information that the second information processing equipment 2 has become the state capable of executing the data relay, the first data communicating unit 34 may start the data relay.

Figure 25:
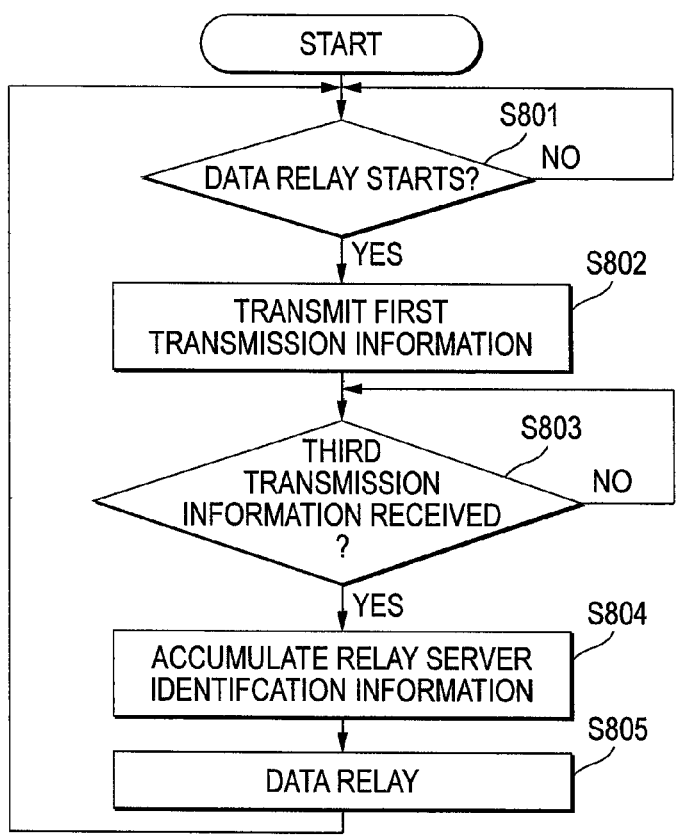
FIG. 25 is a flowchart showing the operation of the first information processing equipment according to the third embodiment.

Incidentally, in the flowchart of FIG. 25, the processing is ended by turn-off of a power source or interruption of processing completion.

Next, referring to the flowchart of FIG. 26, an explanation will be given of the operation of the mediating server 40 according to this embodiment.

(Step S901)

The first transmission information receiving unit 41 determines if or not the first transmission information has been received. If the first transmission information has been received, the processing proceeds to step S902. If not, the processing of step S901 is repeated until the first transmission information is received.

(Step S902)

The request information transmitting unit 42 transmits the request information to the identification information transmitting server 6.

(Step S903)

The identification information receiving unit 43 determines if or not the relay server identification information transmitted from the identification information transmitting server 6 has been received. If the relay server identification information has been received, the processing proceeds to step S904. If not, the processing of step S903 is repeated until the relay server identification information is received. Incidentally, if the relay server identification information cannot be received indefinitely owing to e.g. shut-down of the identification information transmitting server 6, the identification information receiving unit 43 may determine time-out after a predetermined time (e.g. one minute) elapses from when the request information is transmitted, thus completing a series of processing operations.

(Step S904)

The second transmission information transmitting unit 44 creates the second transmission information containing the relay server identification information received by the identification information receiving unit 43 and transmits the second transmission information to the second information processing equipment 2.

(Step S905)

The third transmission information transmitting unit 45 creates the third transmission information containing the relay server identification information received by the identification information receiving unit 43 and transmits the third transmission information to the first information processing equipment 30. The processing returns to step S901.

Figure 26:
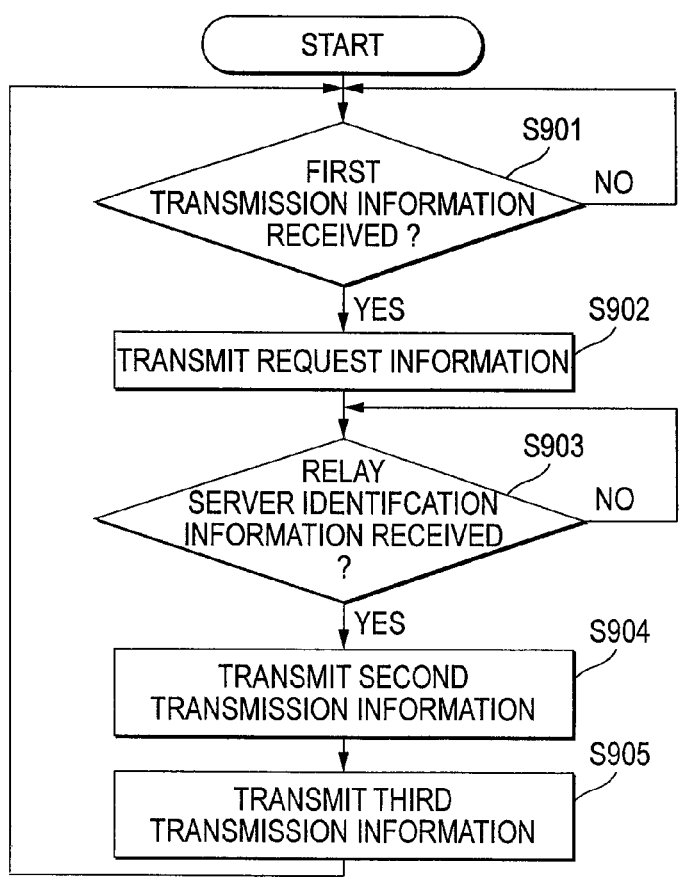
FIG. 26 is a flowchart showing the operation of the mediating server according to the third embodiment.

Incidentally, in the flowchart of FIG. 26, the processing is ended by turn-off of a power source or interruption of processing completion.

Next, using a concrete example, an explanation will be given of the communication system according to this embodiment. As regards the addresses of the first information processing equipment 30 and others, it is assumed that this concrete example is the same as that of the concrete examples in the first embodiment except that the first information processing equipment 1 is replaced by the first information processing equipment 30 and the mediating server 5 is replaced by the mediating server 40. Further, it is assumed that as in the first concrete example of the first embodiment, as shown in FIG. 12, the identification information transmitting server 6 stores two or more items of relay server information correlated with one item of domain information. Further, the mediating server 40 executes the processing using the SIP in the communication between the first information processing equipment 30 and the second information processing equipment 2.

Figure 27:
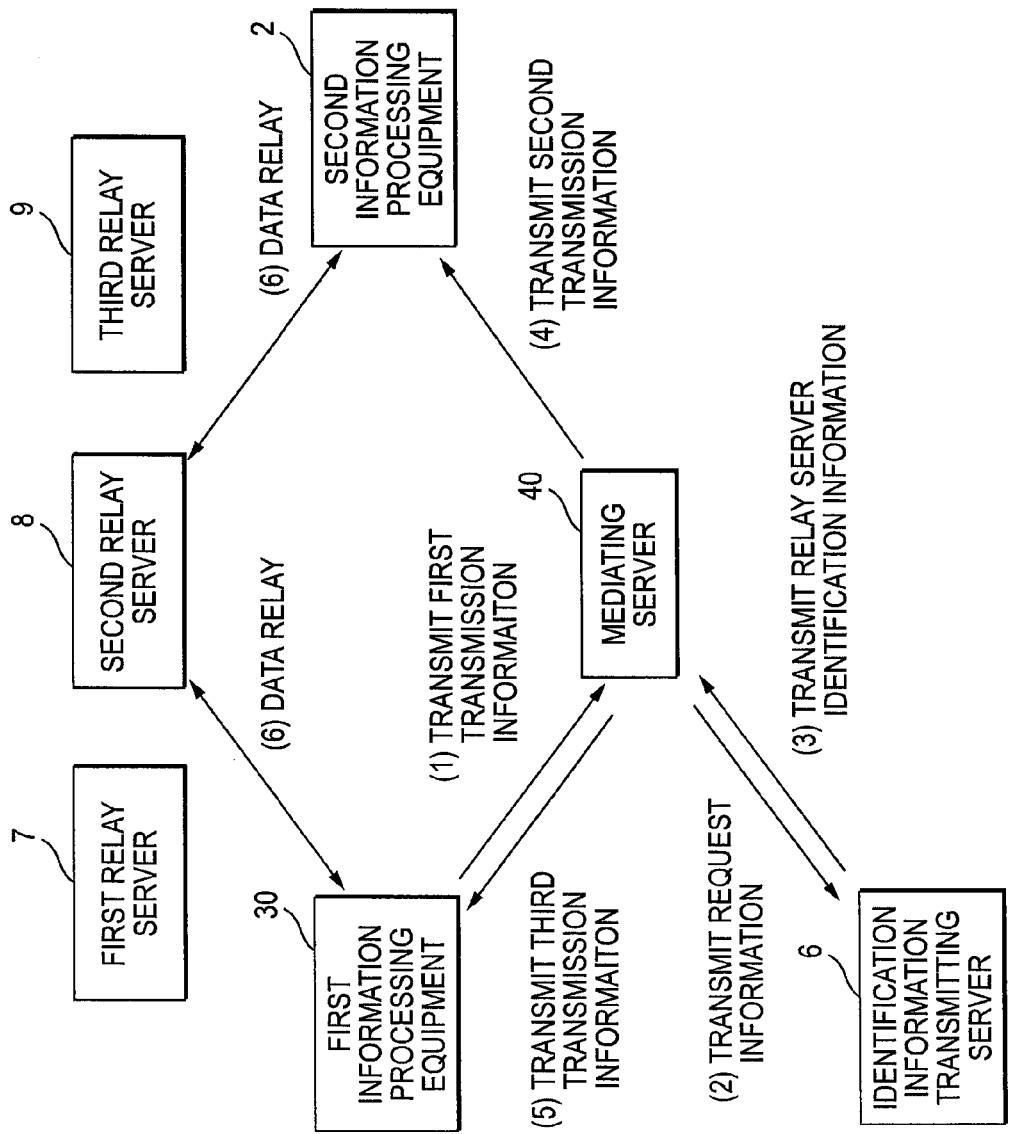
FIG. 27 is a view for explaining the transmission/reception of information between the equipments and servers in the third embodiment.

FIG. 27 is a view for explaining the transmission/reception of information between the information processing equipments and servers. Referring to FIG. 27, an explanation will be given of the concrete example. Incidentally, in FIG. 27, although the communication processing equipments 3, 4 are not shown, it should be noted that the first information processing equipment 30 and second information processing equipment 2 execute the communication through the communication processing equipments 3, 4, respectively.

First, the first information processing equipment 30 and second information processing equipment 2 register, in the mediating server 40, the IP address and port number to be correlated with the equipment identification information which is the information for identifying the equipments, respectively. This operation, which is the same as the first concrete example in the first embodiment, will not be explained. Now it is assumed that the equipment identification information and address information registered in the mediating server 40 are as shown in FIG. 15.

Now, the first data communicating unit 34 of the first information processing equipment 30 determines to start the data relay and sends an instruction to the first transmission information transmitting unit 31 to transmit the first transmission information (step S801). Then, the first transmission information transmitting unit 31 creates the first transmission information which is a calling control message containing the equipment identification information "BBB" of the second information processing equipment 2, and transmits the first transmission information to the IP address "200.100.10.10" of the mediating server 40 which is previously set (step S802).

If the first transmission information receiving unit 41 of the mediating server 40 receives the first transmission information (step S901), it sends an instruction to the request information transmitting unit 42 to transmit the request information. The request information transmitting unit 42 transmits the request information containing the domain information "www.server.pana.net" to the previously set IP address "202.123.10.10" of the identification information transmitting server 6 (step S902). It is assumed that the domain information is previously set in the request information transmitting unit 42. Incidentally, no explanation will be given of the processing to the transmission of the relay server identification information by the identification information transmitting server 6 after the request information is transmitted because it is the same as the first concrete example in the first embodiment except that the transmission destination of the relay server identification information is the mediating server 40. Incidentally, it is assumed that the relay server identification information "155.32.10.11" has been transmitted from the identification information transmitting server 6.

The relay server identification information transmitted from the identification information transmitting server 6 is received by the identification information receiving unit 43 of the mediating server 40, and sent to the second transmission information transmitting unit 44 and third transmission information transmitting unit 45 (step S903).

The second transmission information transmitting unit 44 adds the relay server identification information "155.32.10.11" received from the identification information receiving unit 43 to the first transmission information serving as the calling control message of the SIP received from the first information processing equipment 30, thereby creating the second transmission information serving as the calling control message to be transmitted to the second information processing equipment 2. The second transmission information transmitting unit 44, referring to the information shown in FIG. 15, acquires the address information corresponding to the equipment identification information "BBB" contained in the first transmission information and transmits the second transmission information to the second information processing equipment 2 (in the strict sense, communication processing equipment 4) designated by the address information (step S904). This second transmission information is received by the second transmission receiving unit 21 of the second information processing equipment 2 (step S201) and accumulated by the second accumulating unit 22 (step S202).

The third transmission information transmitting unit 45 transmits the relay server identification information "155.32.10.11" received from the identification information receiving unit 43 to the first information processing equipment 30 (in the strict sense, communication processing equipment 3) which is the transmission source of the first transmission information (step S905). The third transmission information is received by the third transmission information receiving unit 32 of the first information processing equipment 30 (step S803) and accumulated by the first accumulating unit 33 (step S804). Thereafter, like the first concrete example of the first embodiment, the data relay is executed between the first data communicating unit 34 of the first information processing equipment 30 and the second data communicating unit 23 of the second information processing equipment 2 through the second relay server 8 identified by the relay server identification information "155.32.10.11" (steps S805, S203).

As described above, in accordance with the communication system according to this embodiment, in such a manner that the mediating server 40 receives the relay server identification information from the identification information transmitting server 6 and the relay sever identification is transmitted to the first information processing equipment 30 and second information processing equipment 2, the data relay can be executed between the first information processing equipment 30 and the second information processing equipment 2 through the relay server identified by the relay server identification information.

Embodiment 4

Referring to the drawings, an explanation will be given of the communication system according to the fourth embodiment of this invention. In the communication system according to this embodiment, the identification information transmitting server is not provided, and the mediating server specifies the relay server to execute the data relay in the plurality of relay servers.

Figure 28:
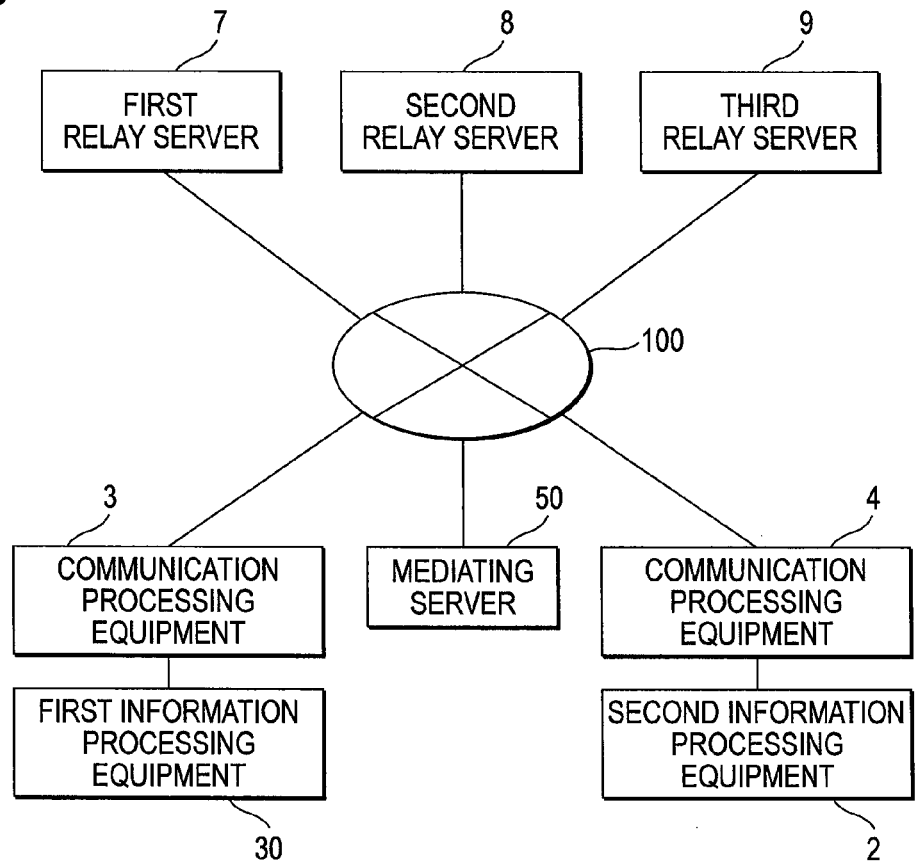
FIG. 28 is a view showing the configuration of a communication system according to the fourth embodiment of this invention.

FIG. 28 is a view showing the configuration of the communication system according to this embodiment. In FIG. 28, the communication system according to this embodiment includes a first information processing equipment 30, a second information processing equipment 2, communication processing equipments 3, 4, a mediating server 50, a first relay server 7, a second relay server 8 and a third relay server 9. Incidentally, the configuration of this embodiment is the same as that of the third embodiment except that the mediating server 40 is replaced by the mediating server 50. The configuration and operation of the components other than the mediating server 40, which are the same as those in the third embodiment, will not be explained.

Figure 29:
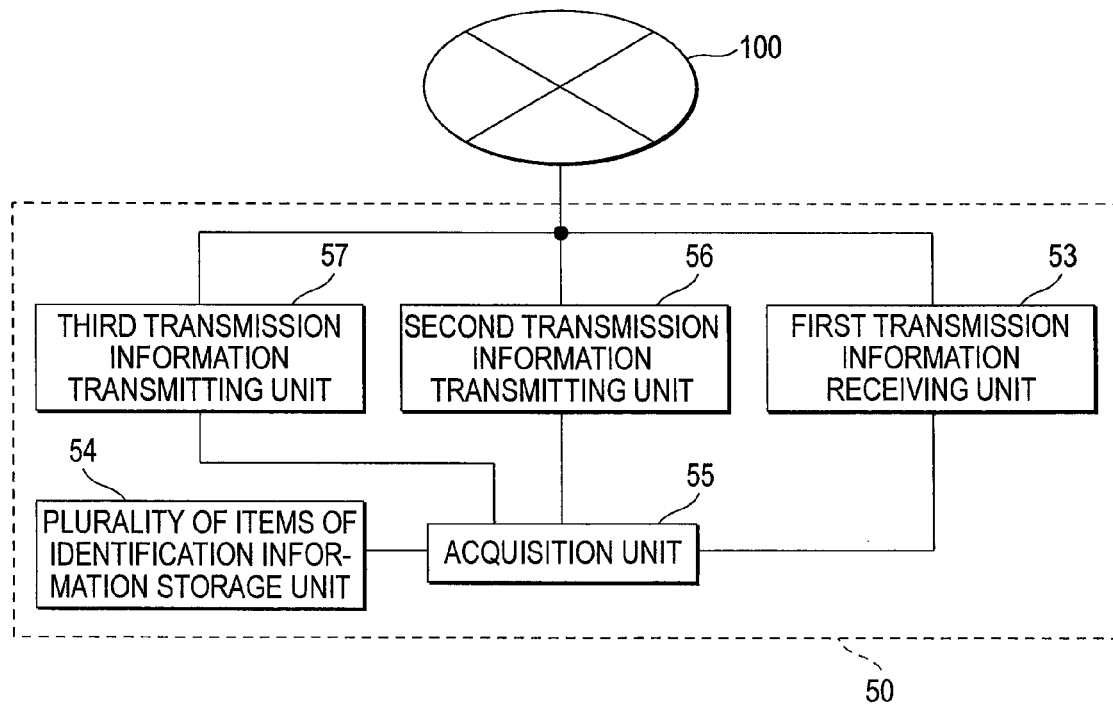
FIG. 29 is a block diagram showing the configuration of a mediating server according to the fourth embodiment.

FIG. 29 is a block diagram showing the configuration of the mediating server 50 according to this embodiment. In FIG. 29, the mediating server 50 according to this embodiment includes a first transmission information receiving unit 53, a plurality of items of identification information storage unit 54, an acquisition unit 55, a second transmission information transmitting unit 56 and a third transmission information transmitting unit 57.

Like the first transmission information receiving unit 41 in the third embodiment, the first transmission information receiving unit 53 receives the first transmission information transmitted from the first information processing equipment 30. Incidentally, the first transmission information receiving unit 53 will no be explained since its configuration is the same as the first transmission information receiving unit 41 in the third embodiment except the first information receiving unit 53 receives the first transmission information and so the acquisition unit 55 described later acquires the relay server identification information.

The plurality of items of identification information storage unit 54 stores two or more items of the relay server identification information. The two or more items of the relay server identification information are the relay server identification information for identifying the relay server selectable as the relay server employed in the data relay executed between the first information processing equipment 30 and the second information processing equipment 2. In this embodiment, the plurality of items of identification information storage unit 54 stores the relay server identification information for the first to third relay servers 7 to 9. The plurality of items of identification information storage unit 54 can be realized by a predetermined storage medium (e.g. semiconductor memory, magnetic disk or optical disk).

The acquisition unit 55 acquires any single item of the two or more items of the relay server identification information stored in the plurality of items of identification information storage unit 54. The method for acquiring any item of the two or more items of the relay server identification information by the acquisition unit 55, which is the same as the method of acquiring the relay server identification information by the acquisition unit 63 in the first embodiment, will not be explained here.

The second transmission information transmitting unit 56 transmits, to the second information processing equipment 2, the second transmission information containing the relay server identification information acquired by the acquisition unit 55. Incidentally, the second transmission information transmitting unit 56 will not be explained since its configuration is the same as the second transmission information transmitting unit 44 in the third embodiment except that the second transmission information containing the relay server identification information acquired by the acquisition unit 55 is transmitted in place of the second transmission information containing the relay server identification information received by the identification information receiving unit 43.

The third transmission information transmitting unit 57 transmits, to the first information processing equipment 30, the third transmission information containing the relay server identification information acquired by the acquisition unit 55. Incidentally, the third transmission information transmitting unit 57 will not be explained since its configuration is the same as the third transmission information transmitting unit 45 in the third embodiment except that the third transmission information containing the relay server identification information acquired by the acquisition unit 55 is transmitted in place of the third transmission information containing the relay server identification information received by the identification information receiving unit 43.

Incidentally, where any two or more components of the first transmission information receiving unit 53, second transmission information receiving unit 56 and third transmission information receiving unit 57 include devices relative to communication, they may be the same means or different means.

Figure 30:
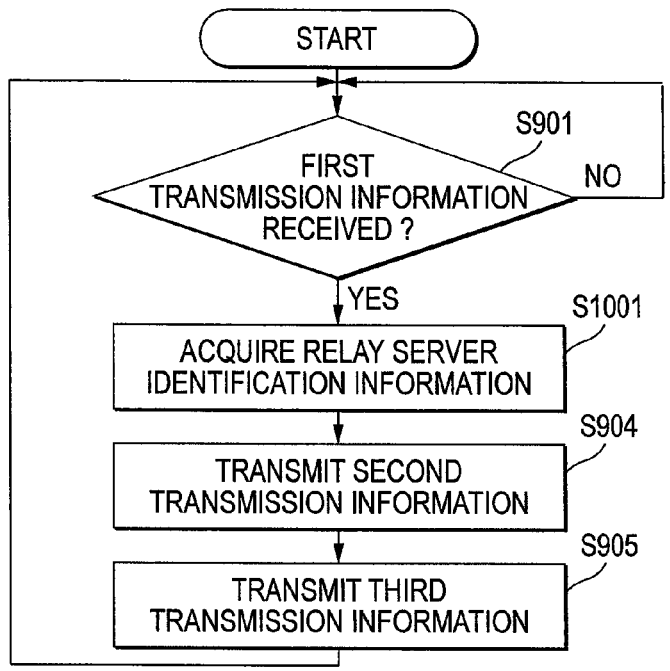
FIG. 30 is a flowchart showing the operation of the mediating server according to the fourth embodiment.

Next, referring to the flowchart of FIG. 30, an explanation will be given of the operation of the mediating server 50 according to this embodiment. Incidentally, the processing other than step S1001, which is the same as in the flowchart of FIG. 26 in the second embodiment except that the relay server identification information contained in the second transmission information and third transmission information is acquired by the acquisition unit 55, will not be explained.
(Step S1001)

The acquisition unit 55 acquires any item from the plurality of items of the relay server identification information stored in the plurality of items of identification information storage unit 54.

Figure 31:
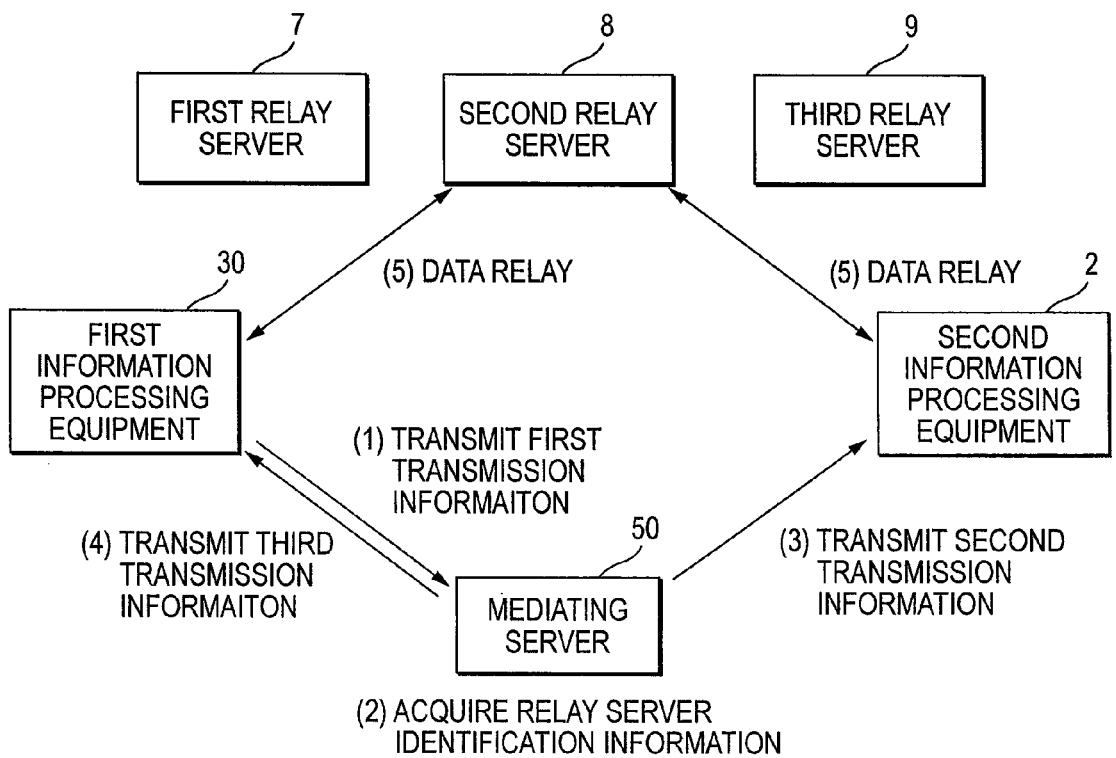
FIG. 31 is a view for explaining the transmission/reception of information between the equipments and servers in the fourth embodiment.

Next, using a concrete example, an explanation will be given of the operation of the communication system according to this embodiment. FIG. 31 is a view for explaining the transmission/reception of information among the information processing equipments and servers. Incidentally, in FIG. 31, although the communication processing equipments 3, 4 are not shown, the communication in the first information processing equipment 30 and others is executed through the communication processing equipments 3, 4. In FIG. 31, the processing other than the acquisition of the relay server identification information in the mediating server 50, which is the same as that in the concrete example in the third embodiment, will not be explained. Further, it is assumed that the addresses of the equipments and servers are the same as those in the concrete example in the first embodiment and the plurality of items of identification information storage unit 54 stores the relay server identification shown in FIG. 21.

Now, the first data communicating unit 34 of the first information processing equipment 30 determines to start the data relay and sends an instruction to the first transmission information transmitting unit 31 to transmit the first transmission information (step S801). Then, the first transmission information transmitting unit 31 creates the first transmission information which is a calling control message containing the equipment identification information "BBB" of the second information processing equipment 2, and transmits the first transmission information to the IP address "200.100.10.10" of the mediating server 40 which is previously set (step S802).

If the first transmission information receiving unit 53 of the mediating server 50 receives the first transmission information (step S901), it sends an instruction to the acquisition unit 55 to acquire the relay server identification information. The acquisition unit 55 acquires a single item of relay server identification information "155.32.10.11" at random from the plurality of the items of relay server identification information shown in FIG. 21 and stored in the plurality of items of identification information storage unit 54 (step S1001). The relay server identification information thus acquired is sent to the second transmission information transmitting unit 56 and third transmission information transmitting unit 57. Thereafter, like the concrete example of the third embodiment, the second transmission information and third transmission information are transmitted and the data relay is executed between the first information processing equipment 30 and the second information processing equipment 2 through the second relay server 8 identified by the relay server identification information "155.32.10.11".

As described above, in accordance with the communication system according to this embodiment, the relay server identification information can be acquired in the mediating server 50, and, the data relay can be executed between the first information processing equipment 30 and the second information processing equipment 2 through the relay server identified by the relay server identification information thus acquired. Thus, the same effect as in the third embodiment can be obtained.

Incidentally, in the third embodiment, the explanation has been given of the case where the relay server identification information is acquired from the identification information transmitting server 6 and in the fourth embodiment, the explanation has been given of the case where the relay server identification information is acquired from the plurality of items of identification information storage unit 54 in the mediating server 6. However, the mediating server may transmit the second transmission information and third transmission information each containing the relay server identification information specified by other methods. For example, the mediating server may include a storage unit storing the relay server identification information contained in the second transmission information and third transmission information and may transmit the second transmission information and third transmission information by reading the relay server identification information from the storage unit. In this case, a user may access the mediating server to change the relay server identification information stored in the storage unit periodically or non-periodically.

Embodiment 5

Referring to the drawings, an explanation will be given of the communication system according to the fifth embodiment of this invention. In the communication system according to this embodiment, the request information is transmitted to the identification information transmitting server from the first information processing equipment and the second information processing equipment, respectively. The first information processing equipment and second information processing equipment execute the data relay therebetween using the relay server identified from the relay server identification information transmitted from the identification information transmitting server.

Figure 32:
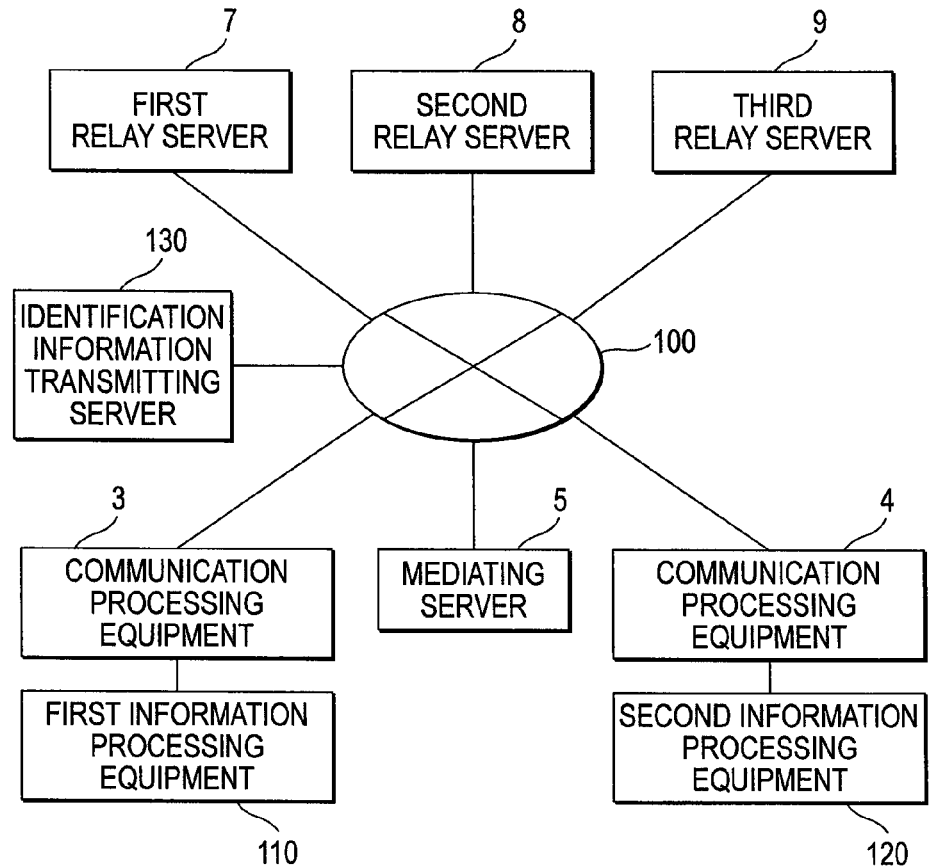
FIG. 32 is a view showing the configuration of a communication system according to the fifth embodiment of this invention.

FIG. 32 is a view showing the configuration of the communication system according to this embodiment. In FIG. 32, the communication system according to this embodiment includes a first information processing equipment 110, a second information processing equipment 120, communication processing equipments 3, 4, a mediating server 5, an identification information transmitting server 130, a first relay server 7, a second relay server 8 and a third relay server 9. An explanation will not given of the arrangement of the communication system according to this embodiment since it is the same as the first embodiment except that the first information processing equipment 110 is substituted for the first information processing equipment 1, the second information processing equipment 120 is substituted for the second information processing equipment 2, and the identification information transmitting server 130 is substituted for the identification information transmitting server 6.

Figure 33:
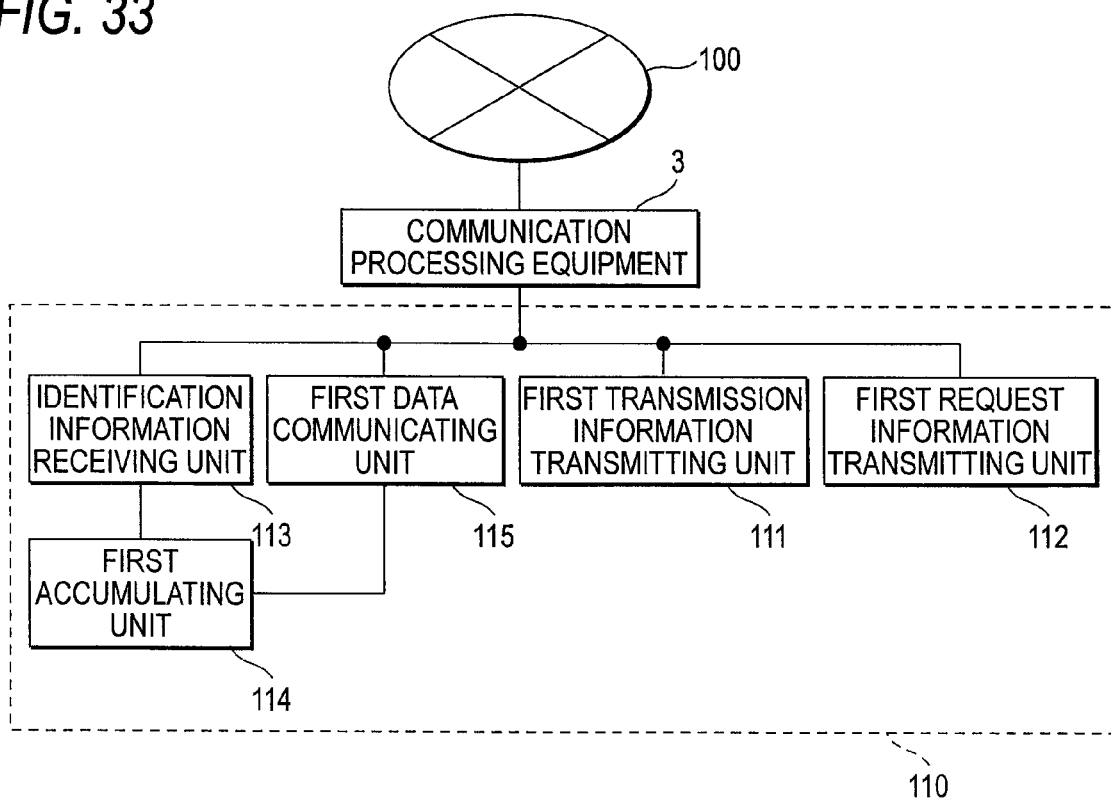
FIG. 33 is a block diagram of the configuration of a first information processing equipment according to the fifth embodiment.

FIG. 33 is a block diagram showing the configuration of the first information processing equipment 110 according to this embodiment. In FIG. 33, the first information processing equipment 110 according to this embodiment includes a first transmission information transmitting unit 111, a first request information transmitting unit 112, an identification information receiving unit 113, a first accumulating unit 114 and a first data communicating unit 115.

The first transmission information transmitting unit 111 transmits the first transmission information to the mediating server 5. Now, unlike this first transmission information in the first embodiment, the first transmission information is the information containing the data relay identification information. The data relay identification information is the information for identifying the data relay. As described later, this data relay identification information is employed for acquisition of the relay server identification information in the case where the second request information transmitted from the second information processing equipment 120 is received in the identification information transmitting server 130. The data relay identification information may be any information as long as it is the information capable of specifying the relay server identification information when the relay server identification information is acquired. The data relay identification information may be e.g. the equipment identification information of the first information processing equipment 110, a calling ID contained in the calling control message when the first transmission information and second transmission information are the calling control message of the SIP, or other information. Further, as long as the relay server identification information can be specified in the identification information transmitting server 130, the same data relay identification information may be employed for different data relays. The first transmission information may contain the equipment identification information for identifying the second information processing equipment 120 as well as the data relay identification information, or may contain only the data relay identification information. Since the configuration of the first transmission information transmitting equipment 111 is the same as that of the first transmission information transmitting unit 12 in the first embodiment except that the content of the first transmission information is different, explanation thereof is omitted.

The first request information transmitting unit 112 transmits the first request information to the identification information transmitting server 130. Now, the first request information is the information for requesting the transmission of the relay server identification information for identifying the relay server in the data relay between the first information processing equipment 110 and the second information processing equipment 120. The first request information is the information containing the data relay identification information. The first request information does not contain a request (command or instruction), but contains, for example, any information so that the first request information may be determined as being the request information by the identification information transmitting server 130. Incidentally, the configuration of the first request information transmitting unit 122 is the same as that for the request information transmitting unit 14 in the first embodiment except the above explanation, and so will not be explained.

The identification information receiving unit 113 receives the relay server identification information transmitted from the identification information transmitting server 130. The configuration of the identification information receiving unit 113, which is the same as that of the identification information receiving unit 15 in the first embodiment, will not be explained.

The first accumulating unit 114 accumulates the relay server identification information received by the identification information receiving unit 113 in a predetermined recording medium. This recording medium is for example, a semiconductor memory, an optical disk or magnetic disk, and may be included by the first accumulating unit 114 or located outside the first accumulating unit 114. Further, this recording medium may or may not temporarily store the relay identification information.

The first data communicating unit 115 executes the data relay with the second information processing equipment 120 through the relay server identified by the relay server identification information accumulated by the first accumulating unit 114. The configuration of the first data communicating unit 115 is the same as that of the first data communicating unit 13 in the first embodiment except that the first data communicating unit 115 executes the data relay with the second information processing equipment 120 through the relay server identified by the relay server identification information accumulated by the first accumulating unit 114 in place of the relay server identified by the relay server identification information stored in the storage unit 11, and so its explanation will not be given.

Figure 34:
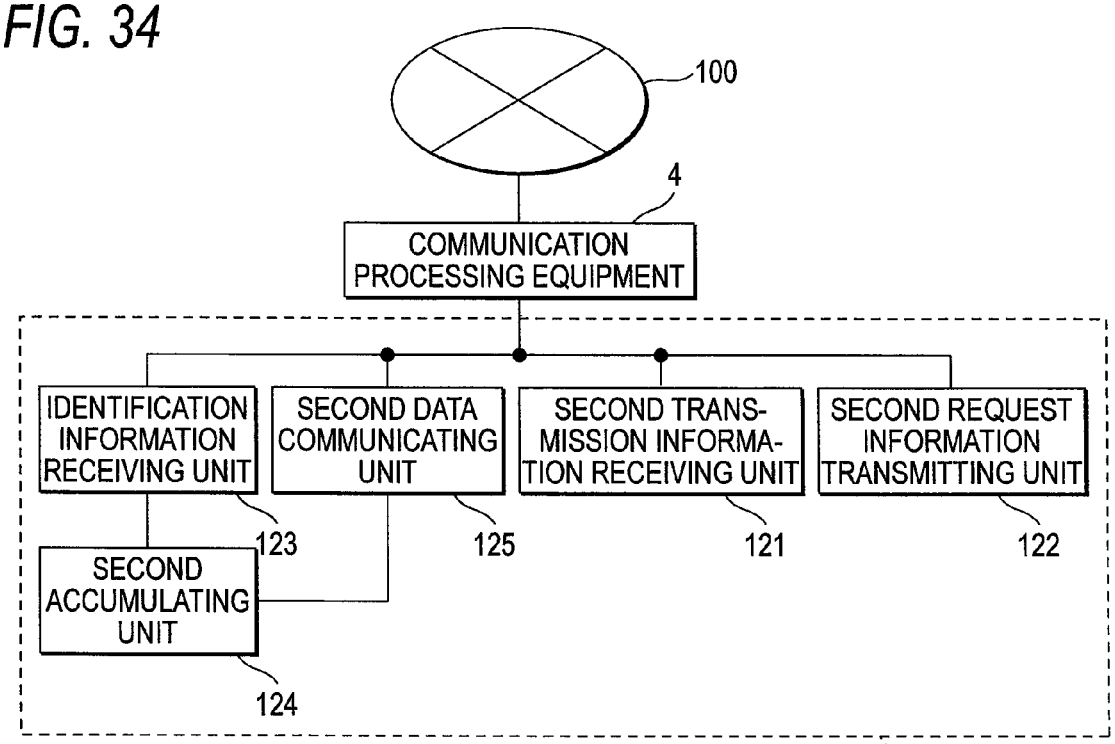
FIG. 34 is a block diagram showing the configuration of a second information processing equipment according to the fifth embodiment.

FIG. 34 is a block diagram showing the configuration of the second information processing equipment 120 according to this embodiment. In FIG. 34, the second information processing equipment 120 according to this embodiment includes a second transmission information receiving unit 121, a second request information transmitting unit 122, an identification information receiving unit 123, a second accumulating unit 124 and a second data communicating unit 125.

The second transmission information 121 receives the second transmission information. Now, the second transmission information is the information transmitted from the mediating server 5 and containing the data relay identification information contained in the first transmission information. The configuration of the second transmission information receiving unit 121, which is the same as that of the second transmission information receiving unit 21 in the first embodiment except the contents of the second transmission information, will not be explained.

The second request information transmitting unit 122 transmits the second request information to the identification information transmitting server 130 when the second transmission information receiving unit 121 receives the second transmission information. Now, the second request information is the information containing the data relay identification information contained in the second transmission information received by the second transmission information receiving unit 121. Further, since the second request information does not contain a request (command or instruction), but contains, for example, any information, the second request information may be determined as being the request information by the identification information transmitting server 130. The second request information transmitting unit 122 may include a transmitting device for transmission (e.g. modem or network card), or may not include it (In this case, the transmitting device not shown is located between the second request information transmitting unit 122 and the communication processing equipment 4). Further, the second request information transmitting unit 122 may be realized in hardware or may be realized in software such as a driver for driving the transmitting device.

The identification information receiving unit 123 receives relay server identification information. This relay server identification information is transmitted from the identification information transmitting server 130. Incidentally, the identification information receiving unit 123 may include a receiving device for reception (e.g. modem or network card), or may not include it (In this case, the receiving device not shown is located between the identification information receiving unit 123 and the communication processing equipment 4). Further, the identification information receiving unit 123 may be realized in hardware or may be realized in software such as a driver for driving the receiving device.

The second accumulating unit 124 accumulates the relay server identification information received by the identification information receiving unit 123 in a predetermined recording medium. This recording medium is for example, a semiconductor memory, an optical disk or magnetic disk, and may be included by the second accumulating unit 124 or located outside the first accumulating unit 124. Further, this recording medium may or may not temporarily store the relay identification information.

The second data communicating unit 125 executes the data relay with the first information processing equipment 110 through the relay server identified by the relay server identification information accumulated by the second accumulating unit 124. Incidentally, the configuration of the second data communicating unit 125, which is the same as that of the second data communicating unit 23 in the first embodiment except that the second storage unit 124 is substituted for the second storage unit 22, will not be explained.

Incidentally, the configuration of the mediating server 5, is the same as in the first embodiment except the contents of the first transmission information and second transmission information, will not be explained. Namely, the first transmission information receiving unit 51 receives the first transmission information. Further, when the first transmission information receiving unit 51 receives the first transmission information, the second transmission information transmitting unit 52 transmits, to the second information processing equipment 120, the second transmission information which is the information containing the data relay identification information contained in the first transmission information.

Figure 35:
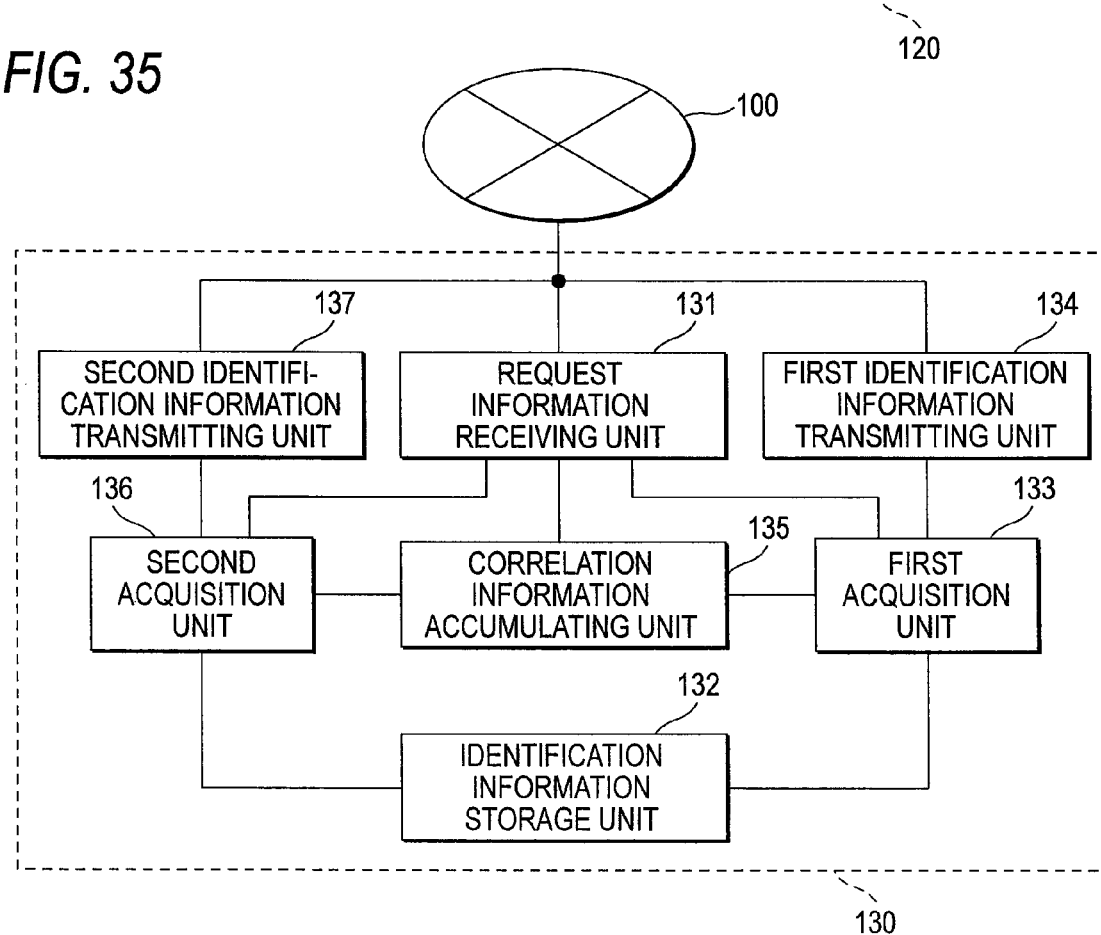
FIG. 35 is a block diagram showing the configuration of an identification information transmitting server according to the fifth embodiment.

FIG. 35 is a block diagram showing the configuration of the identification information transmitting server 130 according to this embodiment. In FIG. 35, the identification information transmitting server 130 according to this embodiment includes a request information receiving unit 131, an identification information storage unit 132, a first acquisition unit 133, a first identification information transmitting unit 134, a correlated information accumulating unit 135, a second acquisition unit 136 and a second identification information transmitting unit 137.

The request information receiving unit 131 receives the first request information transmitted from the first information processing equipment 110 and the second request information transmitted from the second information processing equipment 120. Incidentally, the request information receiving unit 131 may include a receiving device for reception (e.g. modem or network card), or may not include it (In this case, the receiving device not shown is located between the request information receiving unit 131 and the communication line 100). Further, the request information receiving unit 131 may be realized in hardware or may be realized in software such as a driver for driving the receiving device.

The identification information storage unit 132 stores relay server identification information which is the information for identifying the first to third relay servers 7 to 9. The identification information storage unit 132 may store relay server identification information other than that for the first to third relay servers 7 to 9. The identification information storage unit 132 can be realized by a predetermined storage medium (e.g. semiconductor memory, magnetic disk or optical disk).

The first acquisition unit 133 acquires any relay server identification information of the relay server identification information for the first to third relay serves stored in the identification information storage unit 132. The timing of acquiring the relay server identification information may be e.g. a timing when the request information receiving unit 131 receives the first request information, a timing when the relay server identification information previously acquired is transmitted by the first identification information transmitting unit 134 described later, or other timings. In this embodiment, it is assumed that the relay server identification information is acquired at the timing when the request information receiving unit 133 receives the first request information. Further, the method for acquiring the relay server identification information, which is the same as that of the acquisition unit 63, will not be explained.

The first identification information transmitting unit 134 transmits the relay server identification information acquired by the first acquisition unit 133 to the first information processing equipment 110. When the request information receiving unit 131 receives the first request information, the first identification information transmitting unit 134 transmits the relay server information. Incidentally, the first identification information transmitting unit 134 may include a transmitting device for transmission (e.g. modem or network card), or may not include it (In this case, the transmitting device not shown is located between the first identification information transmitting unit 134 and the communication line 100). Further, the first identification information transmitting unit 134 may be realized in hardware or may be realized in software such as a driver for driving the transmitting device.

The correlation information accumulating unit 135 accumulates the correlation information. The correlation information is accumulated when the request information receiving unit 131 receives the first request information and in response to the reception of the first request information, the first acquisition unit 133 acquires the relay server identification information (or when the relay server identification information acquired by the first acquisition unit 133 is transmitted by the first identification information transmitting unit 134). Now, the correlation information is the information which correlates the data relay identification information contained in the first request information and the relay server identification information transmitted by the first identification information transmitting unit 134 to the first information processing equipment 110. "To correlate the data relay identification information and the relay server identification information" means that the relay server identification information can be acquired from the data relay identification information. Therefore, the correlation information may contain both the data relay identification information and the relay server identification information, or may be the information which links the data relay identification information and the relay server identification information, but not contain the relay server identification information.

The second acquisition unit 136 acquires the relay server identification information correlated with the data relay identification information contained in the second request information. This acquisition is done using the correlation information accumulated in the correlation information accumulating unit 135. Further, when the request information acquisition unit 131 receives the second request information, the second acquisition unit 136 acquires its relay server identification information.

The second identification information transmitting unit 137 transmits the relay server identification information acquired by the second acquisition unit 136 to the second information processing equipment 120. Incidentally, the second identification information transmitting unit 137 may include a transmitting device for transmission (e.g. modem or network card), or may not include it (In this case, the transmitting device not shown is located between the second identification information transmitting unit 137 and the communication line 100). Further, the second identification information transmitting unit 137 may be realized in hardware or may be realized in software such as a driver for driving the transmitting device.

Incidentally, where any two or more components of the request information receiving unit 131, first identification information transmitting unit 134 and second identification information transmitting unit 137 include devices relative to communication, they may be the same means or different means.

Where the first acquisition unit 133 and second acquisition unit 136 are formed in hardware, they may be the same means.

Further, the identification information storage unit 132 and recording medium in which the correlation information accumulating unit 135 accumulates the correlation information may be the same recording medium or different recording media. In the former case, the region where the relay server identification information is stored is the identification information storage unit 132 whereas the region where the correlation information is stored is the region of the recording medium where the correlation information is accumulated by the correlation information accumulating unit 135.

Referring to the flowchart of FIG. 36, an explanation will be given of the operation of the first information processing equipment 110 according to this embodiment.

(Step S1101)

The first data communicating unit 115 determines if or not the present timing is a timing starting the data relay. If it is the timing of starting the data relay, the processing proceeds to step S1102. If not, the processing of step S1101 is repeated until the present timing becomes the timing of starting the data relay. Now, the timing of starting the data relay may be e.g. a timing of triggering a predetermined event (receiving an instruction of starting the data relay from a user or others), or may be other timings.

(Step S1102)

The first request information transmitting unit 112 transmits the first request information to the identification information transmitting server 130. Incidentally, the first request information contains the data relay identification information. The data relay identification information may be previously held in the first information processing equipment 110, or may be created in the first information processing equipment 110 immediately before the first request information is transmitted.

(Step S1103)

The first transmission information transmitting unit 111 transmits the first transmission information containing the data relay identification information to the mediating server 5. Incidentally, the data relay identification information contained in the first transmission information is the same as that contained in the first request information.

(Step S1104)

The identification information receiving unit 113 determines if or not the relay server identification information transmitted from the identification information transmitting server 130 has been received. If the relay server identification information has been received, the processing proceeds to step S1105. If not, the processing of step S1104 is repeated until the relay server identification information is received. Incidentally, if the relay server identification information cannot be received indefinitely owing to e.g. shut-down of the identification information transmitting server 130, the identification information receiving unit 113 may determine timeout after a predetermined time (e.g. one minute) elapses from when the request information is transmitted, thus completing a series of processing operations.

(Step S1105)

The first accumulating unit 114 accumulates the relay server identification information received by the identification information receiving unit 113.

(Step S1106)

The first data relay communicating unit 115 executes the data relay with the second information processing equipment 120 using the relay server identified from the relay server identification information accumulated by the first accumulating unit 114. The processing of the data relay in step S1106 may include the processing of repeatedly transmitting the repetitive packet for the port-keeping of the communication processing equipment 3 or may not include it. The transmission destination of this repetitive packet is e.g. the relay server identified from the relay server identification information accumulated by the first accumulating unit 114. Upon completion of the data relay, the processing returns to step S1101. Incidentally, after the first transmission information transmitting unit 111 transmits the first transmission information in step S1103, when the first information processing equipment 110 receives the information that the second information processing equipment 120 has become the state capable of executing the data relay, the first data communicating unit 115 may start the data relay.

Figure 36:
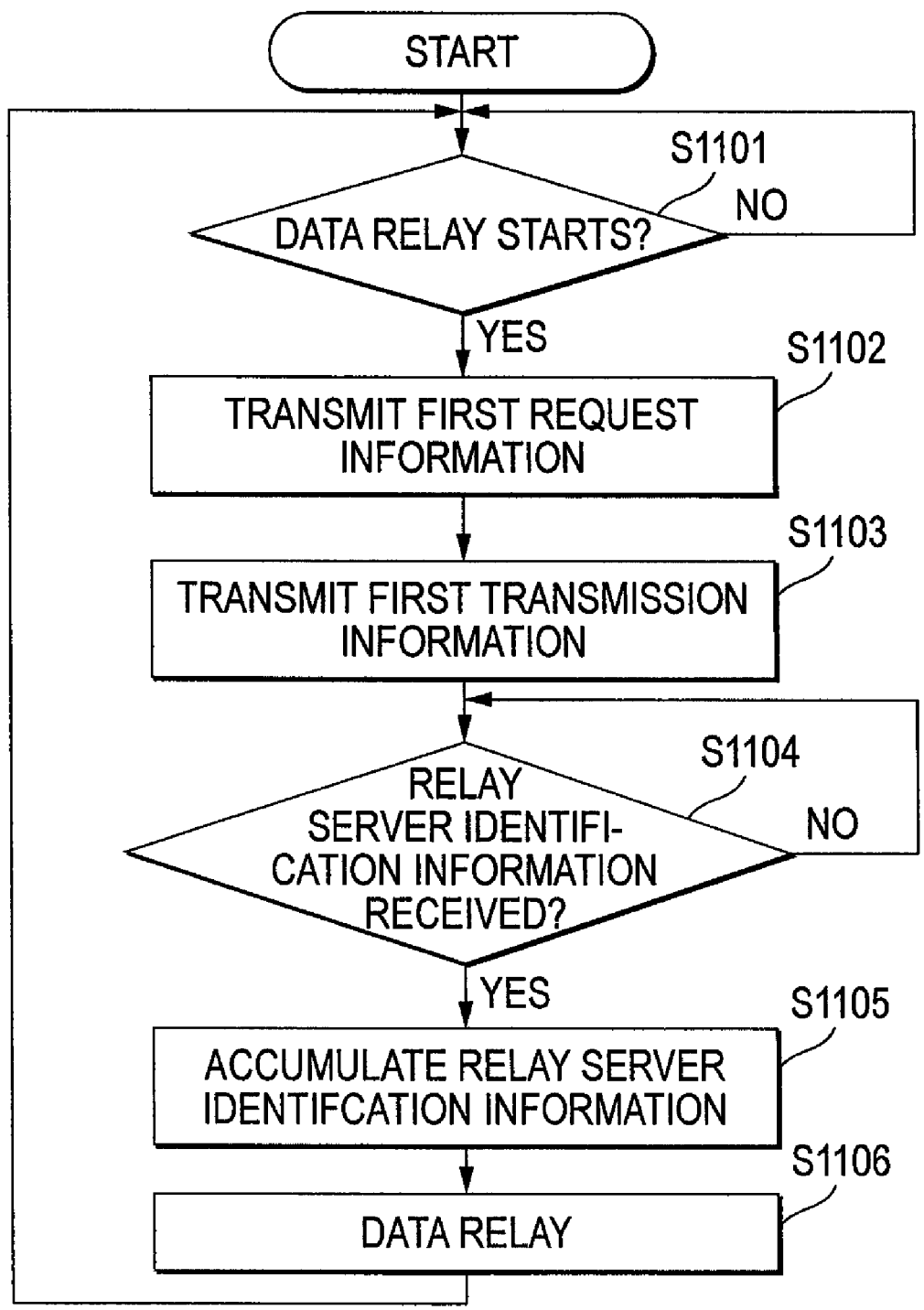
FIG. 36 is a flowchart showing the operation of the first information processing equipment according to the fifth embodiment.

Incidentally, in the flowchart of FIG. 36, although the first transmission is transmitted immediately after the first request information is transmitted, the first transmission information may be transmitted at any timing. For example, the first transmission information may be transmitted before the first request information is transmitted, or may be transmitted after the relay server identification information is received.

Incidentally, in the flowchart of FIG. 36, the processing is ended by turn-off of a power source or interruption of processing completion.

Next, referring to the flowchart of FIG. 37, an explanation will be given of the operation of the second information processing equipment 120.

(Step S1201)

The second transmission information receiving unit 121 determines if or not the second transmission information has been received. If the second transmission information has been received, the processing proceeds to step S1202. If not, the processing of step S1201 is repeated unit the second transmission information is received.

(Step S1202)

The second request transmission information transmitting unit 122 transmits the second request information to the identification information transmitting server 130. Incidentally, the second request information contains the data relay identification information contained in the second transmission information received by the second transmission information receiving unit 121.

(Step S1203)

The identification information receiving unit 123 determines if or not the relay server identification information transmitted from the identification information transmitting server 130 has been received. If the relay server identification information has been received, the processing proceeds to step S1204. If not, the processing of step S1203 is repeated unit the relay server identification information is received. Incidentally, if the relay server identification information cannot be received indefinitely owing to e.g. shut-down of the identification information transmitting server 130, the identification information receiving unit 123 may determine timeout after a predetermined time (e.g. one minute) elapses from when the request information is transmitted, thus completing a series of processing operations.

(Step S1204)

The second accumulating unit 124 accumulates the relay server identification information received by the identification information receiving unit 123.

(Step S1205)

The second data relay communicating unit 125 executes the data relay with the first information processing equipment 110 using the relay server identified from the relay server identification information accumulated by the second accumulating unit 124. The processing of the data relay in step S1205 may include the processing of repeatedly transmitting the repetitive packet for the port-keeping of the communication processing equipment 4 or may not include it. The transmission destination of this repetitive packet is e.g. the relay server identified from the relay server identification information accumulated by the second accumulating unit 124. Upon completion of the data relay, the processing returns to step S1201.

Figure 37:
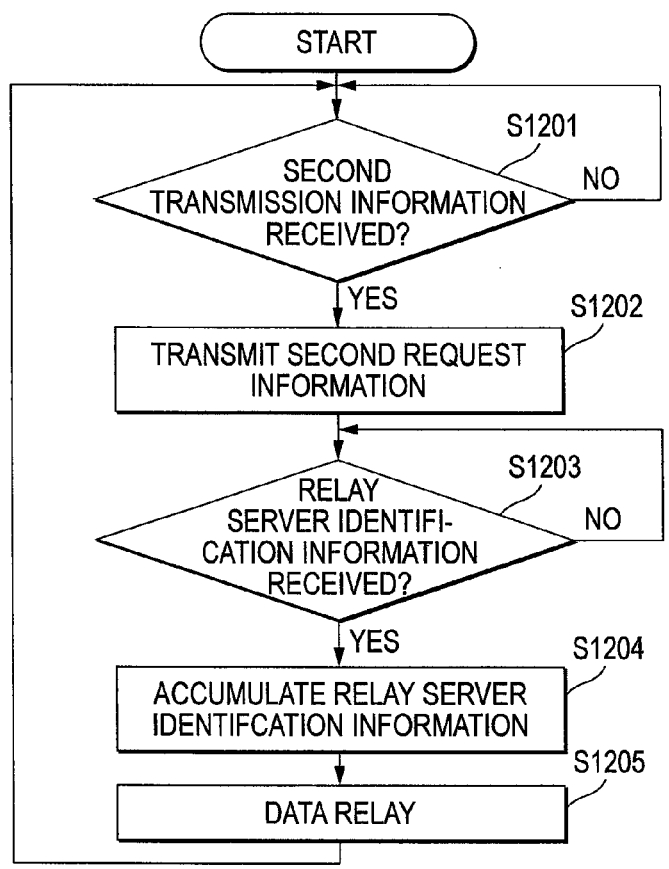
FIG. 37 is a flowchart showing the operation of the second information processing equipment according to the fifth embodiment.

Incidentally, in the flowchart of FIG. 37, the processing is ended by turn-off of a power source or interruption of processing completion.

Next, referring to the flowchart of FIG. 38, an explanation will be given of the operation of the identification information transmitting server 130 according to this embodiment.

(Step S1301)

The request information receiving unit 131 determines if or not the first request information has been received. If the first request information has been received, the processing proceeds to step S1302. If not, the processing proceeds to Step S1305.

(Step S1302)

The first acquisition unit 133 acquires any item from the plurality of items of the relay server identification information stored in the identification information storage unit 132.

(Step S1303)

The first identification information transmitting unit 134 transmits the relay server identification information acquired by the first acquisition unit 133 to the first information processing equipment 110 which is the transmission source of the first request information.

(Step S1304)

The correlation information accumulating unit 135 accumulates the correlation information which correlates the data relay identification information contained in the first request information received by the request information receiving unit 131 and the relay server identification information acquired by the first acquisition unit 133 and transmitted by the first identification information transmitting unit 134. Then, the processing returns to step S1301.
(Step S1305)

The request information receiving unit 131 determines if or not the second request information has been received. If the second request information has been received, the processing proceeds to step S1306. If not, the processing returns to step S1301.
(Step S1306)

The second acquisition unit 136 determines if or not the correlation information, which correlates the data relay identification information contained in the second request information received by the request information receiving unit 131 and the relay server identification information, has been accumulated by the correlation information accumulating unit 135. If the correlation information has been accumulated, the processing proceeds to step S1307. If not, the processing returns to step S1301.
(Step S1307)

The second acquisition unit 136 acquires the relay server identification information correlated with the data relay identification information contained in the second request information received by the request information receiving unit 131 using the correlation information accumulated by the correlation information accumulating unit 135.
(Step S1308)

The second identification information transmitting unit 137 transmits the relay server identification information acquired by the second acquisition unit 136 to the second information processing equipment 120 which is the transmission source of the second request information. Then, the processing returns to step S1301.

Figure 38:
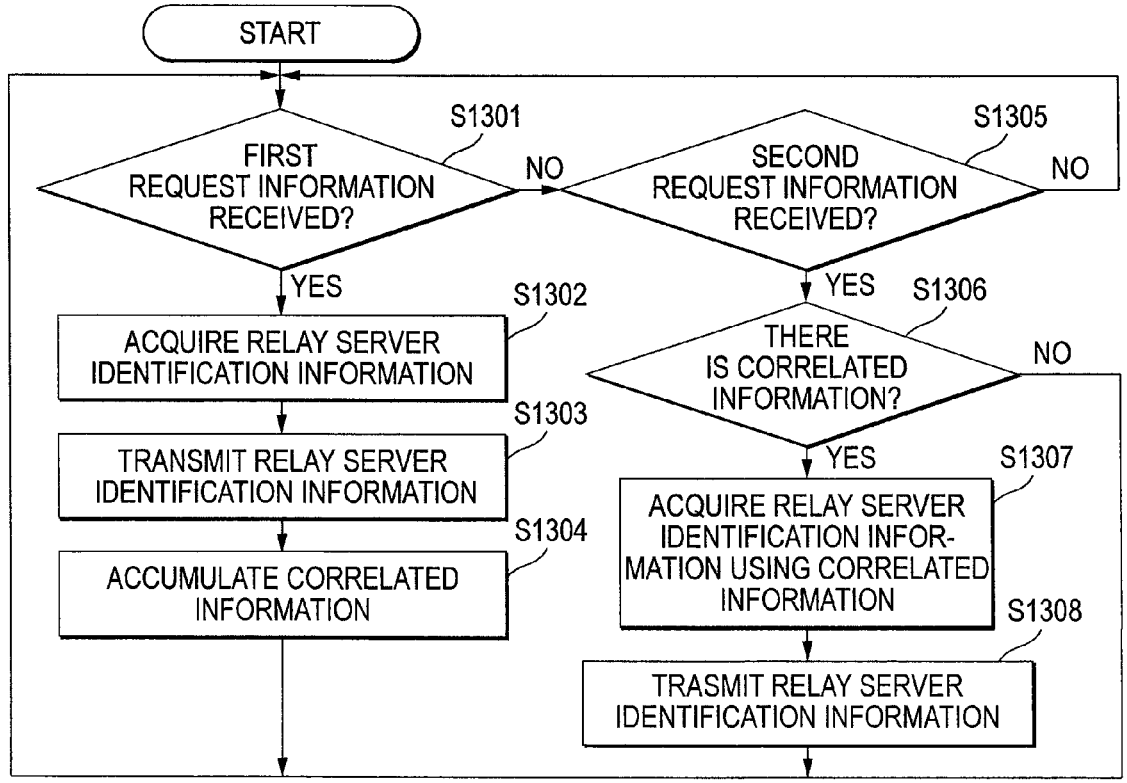
FIG. 38 is a flowchart showing the operation of the identification information transmitting server according to the fifth embodiment.

Incidentally, in the flowchart of FIG. 38, the processing is ended by turn-off of a power source or interruption of processing completion.

Figure 39:
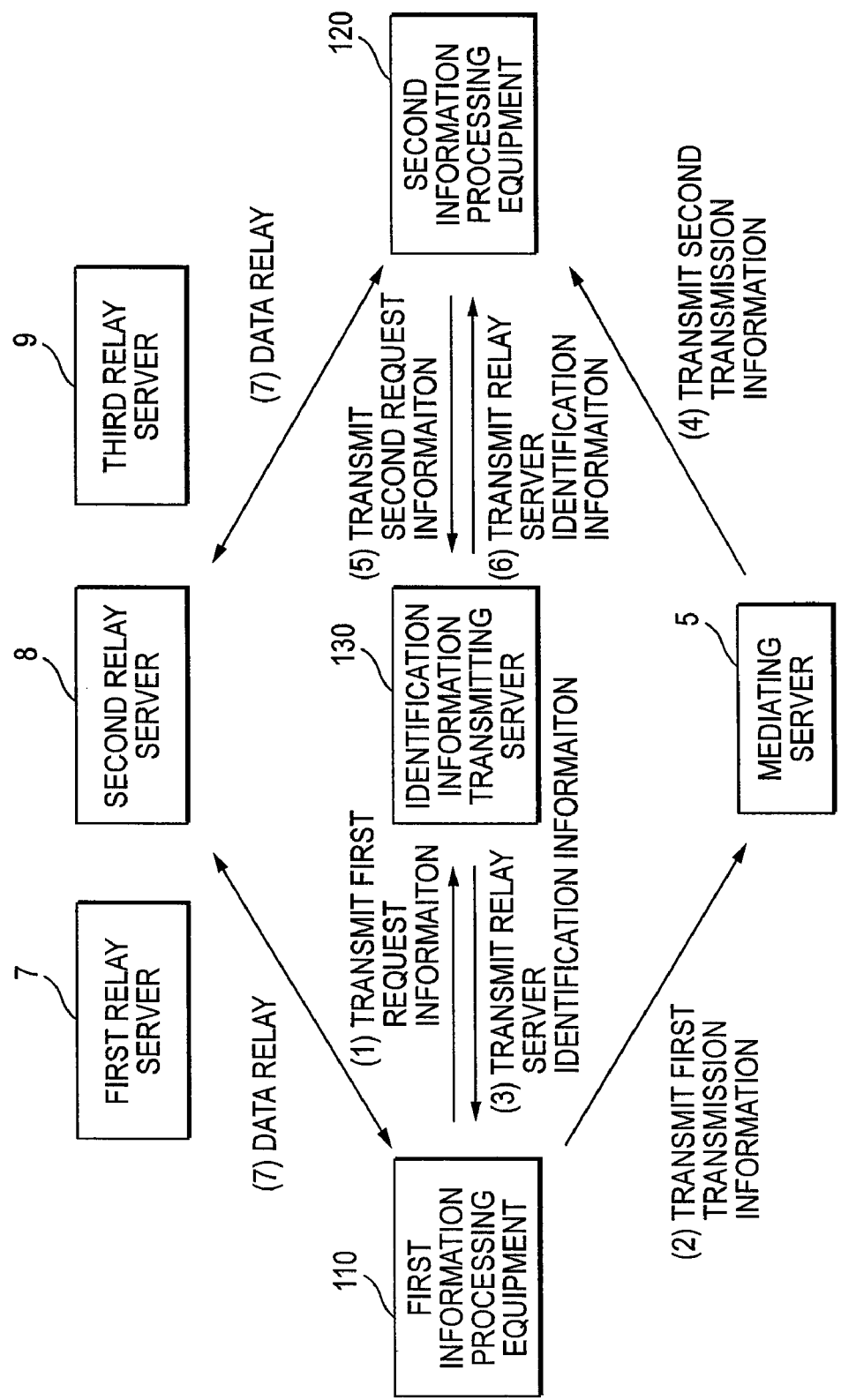
FIG. 39 is a view for explaining the transmission/reception of information between the equipments and servers in the fifth embodiment.
Figure 42:
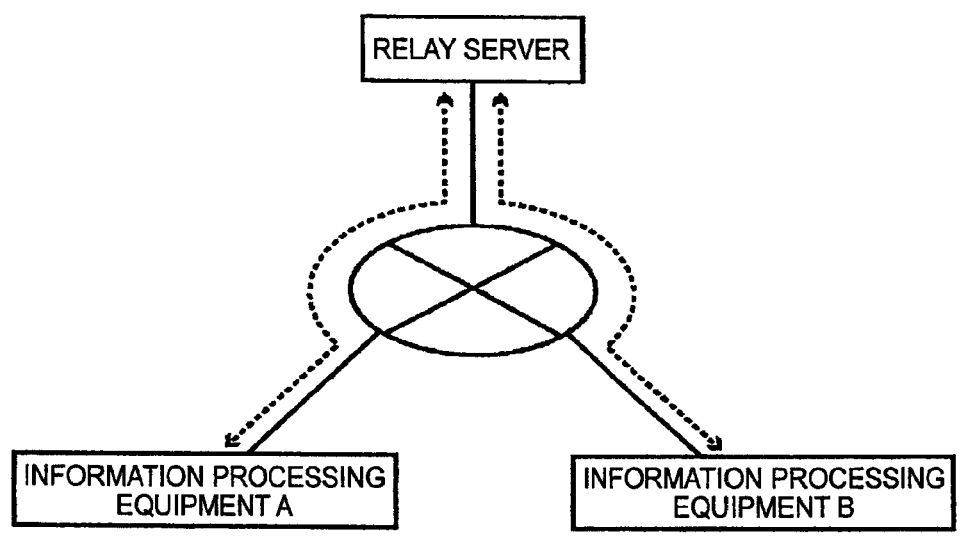
FIG. 42 is a view for explaining a conventional relay server.

Next, using concrete examples, an explanation will be given of the communication system according to this embodiment. In these concrete examples, like the concrete examples of the first embodiment, it is assumed that the mediating server 5 is a server of the SIP. Further, it is assumed that the relay server identification information is an IP address of the relay server. Further, it is assumed that in the first concrete example, the request information contains the domain information, and in the second concrete example, the request information does not contain the domain information. Further it is assumed that the IP addresses of the information processing equipment and servers are the same as in the concrete examples of the first embodiment. FIG. 39 is a view for explaining the transmission/reception of information among the information processing equipments and servers. Referring to FIG. 39, an explanation will be given of the concrete examples. Incidentally, in FIG. 39, although the communication processing equipments 3, 4 are not shown, it should be noted that the first information processing equipment 110 and second information processing equipment 120 execute the communication through the communication processing equipments 3, 4, respectively.

Concrete Example 1

In this concrete example, like the first concrete example of the first embodiment, it is assumed that the identification information storage unit 132 of the identification information transmitting server 130 stores the information shown in FIG. 12. Further, like the first concrete example of the first embodiment, the first acquisition unit 133 executes the processing shown by the flowchart of FIG. 13.

Incidentally, the processing of the first information processing equipment 110 and second information processing equipment 120 of registering the equipment identification information and addresses in the mediating server 5 is the same as in the concrete example of the first embodiment and so its explanation will not be given.

Now, the first data communicating unit 115 of the first information processing equipment 110 determines to start the data relay and sends an instruction to the first information transmitting unit 111 to create the data relay identification information and sends an instruction to the first request information transmitting unit 112 to transmit the first request information (step S1101). Then, in accordance with this instruction, the first transmission information transmitting unit 111 creates a calling ID EF873B46@192.168.0.10. Further, in accordance with the instruction from the first data communicating unit 115, the first request information transmitting unit 112 transmits, to the IP address "202.123.10.10" of the identification information transmitting server 130 which is previously set in the first request information transmitting unit 112, the request information containing the calling ID created by the first transmission information transmitting unit 111 and the request information containing the domain information "www.server.pana.net" which is previously set in the first request information transmitting unit 112 (step S1102).

The first transmission information transmitting unit 111 constructs a calling control message of the SIP (first transmission information) containing the created calling ID and equipment identification information "BBB" of the second information processing equipment 120 and transmits this calling control message to the mediating server 5 (step S1103).

The first request information is received by the request information receiving unit 131 of the identification information transmitting server 130. Like the first concrete example of the first embodiment, the relay server information "155.32.10.11" corresponding to the domain information "www.server.pana.net" is acquired by the first acquisition unit 133. This relay server identification information is transmitted to the first information processing unit 110 (steps S1301 to S1303). Further, the correlation information, which correlates the data relay identification information (calling ID) EF873B46@192.168.0.10 contained in the first request information and the relay server identification information "155.32.10.11" acquired by the first acquisition 133, is accumulated by the correlation information accumulating unit 135 (step S1304). FIG. 40 is a view showing an example of the correlation information accumulated by the correlation information accumulating unit 135. The first record in FIG. 40 is the correlation information which correlates the relay server identification information "155.32.10.11" and the data relay identification information "EF873B46@192.168.0.10"

The relay server identification information "155.32.10.11" transmitted from the identification information transmitting server 130 is received by the identification information receiving unit 113 and accumulated by the first accumulating unit 114 (steps S1104, S1105).

The first transmission information transmitted from the first information processing unit 110 is received by the first transmission information receiving unit 51 of the mediating server 5 (step S301). The second transmission information, which contains, in the its payload, as it is, the calling control message contained in the payload of the packet of the first transmission information, is transmitted to the second information processing equipment 120 corresponding to the equipment identification information "BBB" (step S302).

The second transmission information is received by the second transmission information receiving unit 121 of the second information processing equipment 120 (step S1201). When the second transmission information receiving unit 121 receives the second transmission information, it sends an instruction to the second request information transmitting unit 122 to transmit the data relay identification information (calling ID) "BF873B46@192.168.0.10" contained in the second transmission information and the second request information. Then, the second request information transmitting unit 122 creates the second request information containing the data relay identification information received from the second transmission information receiving unit 121 and transmits the second request information to the identification information transmitting server 130 (step S1201).

The second request information is received by the request information receiving unit 131 of the identification information transmitting server 130. The data relay information contained in the second request information is sent to the second acquisition unit 136 (step S1305). Since the correlation information containing the data relay identification information "BF873B46@192.168.0.10" received from the request information receiving unit 131 is contained in the correlation information accumulated by the correlation information accumulating unit 135 as shown in FIG. 40, the second acquisition 136 acquires the relay server identification information "155.32.10.11" corresponding to the data relay identification information "BF873B46@192.168.0.10" (steps S1306, S1307). The relay server identification information "155.32.10.11" is transmitted to the second information processing equipment 120 by the second identification information transmitting unit 137 (step S1308). Incidentally, after the relay server identification has been acquired using the correlation information, the correlation information (now, the first record in the correlation information shown in FIG. 40) may be deleted. In this concrete example, since the calling ID containing the character string created at random is adopted as the data relay identification information, it is not required that the correlation information is deleted. However, for example, where the equipment identification information is adopted as the data relay identification information, it is desired that the correlation information employed to acquire the relay server identification information is deleted after it has been acquired.

The relay server identification information "155.32.10.11" transmitted from the identification information transmitting server 130 is received by the identification information receiving unit 123 of the second information processing equipment 120 and accumulated by the second accumulating unit 124 (steps S1203, S2304).

Thereafter, the first data communicating unit 115 of the first information processing equipment 110 and the second data communicating unit 125 of the second information processing equipment 120 execute the data relay through the second relay server 8 identified by the relay server identification "155.32.10.11" (steps S1106, S1205).

Concrete Example 2

In this concrete example, it is assumed that the first request information does not contain the domain information. The relay identification information stored in the identification information storage unit 132 of the identification information server 130 is such as shown in FIG. 16. In FIG. 16, only the items of the relay server identification information corresponding to the first to third relay servers 7 to 9 are stored in the identification information storage unit 132. These items of the relay server identification information are correlated with items of load information, respectively. Namely, the identification information transmitting server 130 is dedicated to the first to third relay servers 7 to 9. Incidentally, it is assumed that the load information shown in FIG. 16 and the relay server identification information acquired by the first acquisition unit 133 are acquired in the same manner as the second concrete example of the first embodiment.

If the first data communicating unit 115 of the first information processing equipment 110 determines that the present timing is a timing starting the data relay (step S1101), as in the first concrete example, the data relay identification information is created by the first transmission information transmitting unit 111. The first request information transmitting unit 112 transmits the first request information containing the data relay identification information to the identification information transmitting server 130 (step S1102).

The first request information is received by the request information receiving unit 131 of the identification information transmitting server 130 (step S1301). Referring to the information stored in the identification information storage unit 132 as shown in FIG. 16, the first acquisition unit 133 acquires the relay server identification information "155.32.10.11" corresponding to the load information 20% with the smallest value (step S1302). The relay server identification information is transmitted to the first information processing equipment 110 (step S1303). The subsequent processing, i.e. the accumulating the correlation information, transmitting the first and second transmission information and acquiring the relay server identification information by the second information processing equipment 120, is the same as in the first concrete example, and so its explanation will not be given.

As described above, in the communication system according to this embodiment, even if the first information processing equipment 110 and the second information processing equipment 120 separately transmit the request information to the identification information transmitting server 130, in the identification information transmitting server 130, the relay server identification information and data relay identification information are correlated by the correlation information. Therefore, they can receive the same relay server identification information for the respective items of request information so that the data relay can be executed between the information processing equipments through the relay server identified by the relay server identification information. Accordingly, the same effect as in the first embodiment can be obtained.

Incidentally, in this embodiment, the explanation has been given of the case where the correlation information accumulated in the correlation information accumulating unit 135 of the identification information transmitting server 130, is such as shown in FIG. 40. However, the correlation information accumulated by the correlation information accumulating unit 135 should not be limited to that shown in FIG. 40. For example, as shown in FIG. 41, the correlation information may correlate the relay server identification information stored in the identification information storage unit 132 with the data relay identification information. In FIG. 41, since the data relay identification information and relay server identification information are correlated with each other, the second acquisition unit 136 can acquire the relay server identification information corresponding to the data relay identification information contained in the second request information using the information shown in FIG. 41.

Further, in each of the embodiments described above, the explanation has been given of the case where the first and second information processing equipments execute the communication through the communication processing equipments. However, the first information processing equipment and/or the second information processing equipment may execute the communication not through the communication processing equipments.

Further, in each of the embodiments described above, the explanation has been given of the case where the relay server identification information is the address of the relay server. However, the relay server identification information may be the information other than the address. The relay server identification information may be e.g. the information correlated with the address of the relay server. The information correlated with the address of the relay server may be e.g. the domain information or identification information set independently. Now, the domain information in this case is the information corresponding to the relay server in one-to-one relationship unlike the domain information in the first concrete example of the first embodiment. Namely, it is assumed that when the domain information is specified, the sole relay server can be specified. The domain information may be e.g. the domain information (concretely, e.g. "server.pana.net") indicative of the domain name, or may be FQDN (Fully Qualified Domain Name, concretely e.g. "www.server.pana.net"). Further, the relay server identification information may contain the port number as well as the address. In this case, since the two or more relay servers have the same address, by specifying different port numbers to access to the different relay servers, load dispersion may be made.

Further, in each of the embodiments described above, the explanation has been given of the case where the relay server identification information is not changed while it is transferred among the information processing equipments and servers. However, the relay server identification information may be changed in its indicating method and data format as long as the relay server identified by the information is not changed. For example, where the domain name serving as the relay server identification information of a certain relay server is "www.server001.pana.net" and the IP address serving as the relay server identification information of this relay server is "155.32.10.10", even if the relay server identification is changed from the domain name "www.server001.pana.net to the IP address "155.32.10.10" in the process in which the relay server identification information is transmitted or received, both can be regarded as the same relay server identification information. Further, the IP address "155.32.10.10" in a binary data and "myAKCg" obtained from the ASCII of the binary data by BASE 64 can be regarded as the same relay server identification information.

Further, in each of the embodiments described above, the explanation has been given of the case where the repetitive packet is transmitted to the mediating server so that the first and second information processing equipments can always receive the information from the mediating server. However, where the first and second information equipments execute the communication not through the communication processing equipments with the port keeping time set, it is not necessary to transmit the repetitive packet. Further, where the first and second information processing equipments execute the data relay through the relay server, when the communication is stopped during the time exceeding the port keeping time of the communication processing equipments, the first and second information processing equipments may transmit the repetitive packet to the relay server executing the data relay.

Further, in each of the embodiments described above, the explanation has been given of the case where the communication system includes three relay servers. However, the communication system may include first to N-th relay servers, i.e. N servers (N is a 2 or more integer).

Further, in the concrete examples of the embodiments described above, the explanation has been given of the case where the mediating server executes the processing using the SIP. However, the mediating server may employ the protocol other than the SIP. For example, the protocol may be the protocol of "H.323" or an original protocol for receiving the first transmission information and transmitting the second transmission information and others.

Further, in the concrete examples of the embodiments described above, the explanation was given of the case where the address is the IP address. However, the address may be the address other than the IP address. For example, where the information processing equipment connects to the relay server by dial-up to execute the data relay, the address may be a telephone number. Further, the address may be the other information as long as it is the information capable of designating the destination of information.

Further, the communication protocol employed in the embodiments described above may be e.g. IPv4 (Internet Protocol version 4) or IPv6 (Internet Protocol version 6).

Further, in the embodiments described above, each processing (each function) may be realized through the concentrated processing by a single device (system) or through the dispersed processing by a plurality of devices.

Further, in the embodiments described above, the respective components may be realized in dedicated hardware, or the components which can be realized in software may be realized by execution of a program. For example, the respective components can be realized in such a manner that a program executing unit such as CPU reads and executes the software program recorded on a recording medium such as a hard disk or semiconductor memory. Incidentally, the software for realizing the first information processing equipment in the embodiments described above may be the following program. Specifically, this program is a program for causing a computer to execute the processing in the first information processing equipment which constitutes a communication system including first to N-th relay servers (N is a 2 or more integers) serving as the servers for data relay, a first information processing equipment, a second information processing equipment and a mediating server. This program causes the computer to execute a first transmission information transmitting step of transmitting, to the mediating server, a first transmission information which is the information containing the relay server identification information for identifying the relay server employed in the data relay between the first information processing equipment and the second information processing equipment; and a first data communicating step for executing the data relay with the second information processing equipment through the relay server identified by the relay server identification information.

Further, the software for realizing the first information processing equipment in the embodiments described above may be the following program. Specifically, this program is a program for causing a computer to execute the processing in the first information processing equipment which constitutes a communication system including first to N-th relay servers (N is a 2 or more integers) serving as the servers for data relay, a first information processing equipment, a second information processing equipment and a mediating server. This program causes the computer to execute a first transmission information transmitting step of transmitting, to the mediating server, a first transmission information which is the information containing a transmission request of the relay server identification information for identifying the relay server employed in the data relay between the first information processing equipment and the second information processing equipment; a third transmission information receiving step for receiving the third transmission information containing the relay server identification information transmitted from the mediating server; a first accumulating step for accumulating the relay server information contained in the third transmission information; and a first data communicating step for executing the data relay with the second information processing equipment through the relay server identified by the relay server identification information accumulated in the first accumulating step.

Further, the software for realizing the first information processing equipment in the embodiments described above may be the following program. Specifically, this program is a program for causing a computer to execute the processing in the first information processing equipment which constitutes a communication system including first to N-th relay servers (N is a 2 or more integers) serving as the servers for data relay, a first information processing equipment, a second information processing equipment, a mediating server and an identification information transmitting server. This program causes the computer to execute a first transmission information transmitting step of transmitting, to the mediating server, a first transmission information which is the information containing the data relay identification information for identifying a data relay; a first request information transmitting step for transmitting, to the identification information transmitting server, a first request information which is the information containing the data relay identification information and the information for identifying the relay server employed in the data relay between the first information processing equipment and the second information processing equipment; an identification information receiving step for receiving the relay server identification information transmitted from the identification information transmitting server; a first accumulating step for accumulating the relay server identification information received in the identification information receiving step; and a first data communicating step for executing the data relay with the second information processing equipment through the relay server identified by the relay server identification information accumulated in the first accumulating step.

Further, the software for realizing the second information processing equipment in the embodiments described above may be the following program. Specifically, this program is a program for causing a computer to execute the processing in the second information processing equipment which constitutes a communication system including first to N-th relay servers (N is a 2 or more integer) serving as the servers for data relay, a first information processing equipment, a second information processing equipment and a mediating server. This program causes the computer to execute a second transmission information receiving step for receiving the second transmission information transmitted from the mediating server which is the information containing the relay server identification information for identifying the relay server employed in the data relay between the first information processing equipment and the second information processing equipment; a second accumulating step for accumulating the relay server identification information contained in the second transmission information; and a second data communicating step for executing the data relay with the first information processing equipment through the relay server identified by the relay server identification information accumulated in the second accumulating step.

Further, the software for realizing the second information processing equipment in the embodiments described above may be the following program. Specifically, this program is a program for causing a computer to execute the processing in the second information processing equipment which constitutes a communication system including first to N-th relay servers (N is a 2 or more integer) serving as the servers for data relay, a first information processing equipment, a second information processing equipment, a mediating server and an identification information transmitting server. This program causes the computer to execute a second transmission information receiving step for receiving the second transmission information which is the information containing the data relay identification information for identifying a data relay; a second request information transmitting step for transmitting, to the identification information transmitting server, the second request information which is the information containing the data relay identification information contained in the second transmission information; an identification information receiving step for receiving the relay server identification information transmitted from the identification information transmitting server which is the information containing the relay server identification information for identifying the relay server employed in the data relay between the first information processing equipment and the second information processing equipment; a second accumulating step for accumulating the relay server identification information received in the identification information receiving step; and a second data communicating step for executing the data relay with the first information processing equipment through the relay server identified by the relay server identification information accumulated in the second accumulating step.

Further, the software for realizing the mediating server in the embodiments described above may be the following program. Specifically, this program is a program for causing a computer to execute the processing in the first information processing equipment which constitutes a communication system including first to N-th relay servers (N is a 2 or more integer) serving as the servers for data relay, a first information processing equipment, a second information processing equipment, and a mediating server. This program causes the computer to execute a first transmission information receiving step for receiving the first transmission information which is the information containing a transmission request of the relay server identification information for identifying the relay server employed in the data relay between the first information processing equipment and the second information processing equipment; a second transmission information transmitting step for transmitting if the first transmission information is received in the first transmission information receiving step, to the second information transmitting equipment, the second transmission information which is the information containing the relay server identification for identifying the relay server employed in the data relay between the first information processing equipment and the second information processing equipment; and a third transmission information transmitting step for transmitting if the first transmission information is received in the first transmission information receiving step, to the first information transmitting equipment, the third transmission information which is the information containing the relay server identification for identifying the relay server employed in the data relay between the first information processing equipment and the second information processing equipment.

Further, the software for realizing the identification information transmitting server in the embodiments described above may be the following program. Specifically, this program is a program for causing a computer to execute the processing in an identification information transmitting server which constitutes a communication system including first to N-th relay servers (N is a 2 or more integer) serving as the servers for data relay, a first information processing equipment, a second information processing equipment, a mediating server and the identification information transmitting server. This program causes the computer to execute a request information receiving step for receiving the first request information transmitted from the first information processing equipment which is the information containing the data relay identification information for identifying the data relay and the second request information transmitted from the first information processing equipment which is the information containing the data relay identification information; a first acquisition step for acquiring any relay server identification information of the relay server identification information for identifying the first to N-th relay servers; a first identification information transmitting step for transmitting if the first request information is received in the request information receiving step, the relay server identification information acquired in the first acquisition step to the first information processing equipment; a correlation information accumulating step for accumulating if the first request information is received in the request information receiving step, the correlation information which correlates the data relay identification information contained in the first request information and the relay server identification information transmitted to the first information processing equipment in the first identification information transmitting step; a second acquisition step for acquiring if the second request information is received in the request information receiving step, the relay server identification information corresponding to the data relay identification information contained in the second request information using the correlation information accumulated in the correlation information accumulating step; and a second identification information transmitting step for transmitting the relay server identification information acquired in the second acquisition step to the second information equipment.

Incidentally, in the programs described above, the transmitting step of information transmission and the receiving step of information reception do not include the processing executed by hardware, e.g. the processing executed in a modem or interface card in the transmitting step (executed by only hardware).

Further, these programs may be executed by downloading the program from a server or reading the program recorded in a predetermined recording medium (e.g. an optical disk such as CD-ROM, a magnetic disk or a semiconductor memory).

The computer for executing the program may be singular or plural. Namely, the program may be executed by concentrated processing or dispersed processing.

Further, this invention may be changed in various manners and should not be limited to the embodiments described above.

Industrial Applicability

As understood from the description hitherto made, the communication system and others according to this invention executes the communication through a plurality of relay servers, and so can disperse the processing burden for each relay server as compared with the case of executing the communication using a single relay server. Therefore, the communication system and others according to this invention are useful as the communication system for executing the communication between information processing equipments through the relay servers.

The invention claimed is:

1. A communication system including first to N-th relay servers, N is a 2 or more integer, which are servers for conducting a data relay, a first information processing equipment, a second information processing equipment and a mediating server for communicating relay server identification information obtained by said first information processing equipment to said second information processing equipment, wherein
said first information processing equipment comprises:
a storage unit for storing the relay server identification information that identifies at least one of the first to N-th relay servers as a selected relay server to be employed in the data relay between said first information processing equipment and said second information processing equipment,
a first transmission information transmitting unit for transmitting, to said mediating server, the relay server identification information identifying the selected relay server stored in said storage unit, and
a first data communicating unit for executing the data relay with said second information processing equipment through the selected relay server identified by the relay server identification information stored in said storage unit; and
said mediating server comprises:
a first transmission information receiving unit for receiving said relay server identification information, and
a second transmission information transmitting unit for transmitting the relay identification information received by said first transmission information receiving unit; and
said second information processing equipment comprises:
a second transmission information receiving unit for receiving said relay server identification information transmitted by said second transmission information transmitting unit of said mediating server,
a second accumulating unit for accumulating the relay server identification information transmitted by said mediating server, and
a second data communicating unit for executing the data relay with said first information processing equipment through the selected relay server identified by the relay server identification information accumulated by said second accumulating unit, and
said communication system further comprising an identification information transmitting server, wherein
said first information processing equipment further comprises
a request information transmitting unit for transmitting to said identification information transmitting server, request information requesting transmission of said relay server identification information, said request information corresponds to the relay server identification information for a plurality of relay servers,
an identification information receiving unit for receiving the relay server identification information transmitted from said identification information transmitting server, and
a first accumulating unit for accumulating the relay server identification information received by said identification information receiving unit in said storage unit; and said identification information transmitting server comprises:
a request information receiving unit for receiving said request information,
an identification information storage unit for storing the relay server identification information identifying each of said first to N-th relay servers,
an acquisition unit for acquiring the relay server identification information for each of said first to N-th relay servers stored in said identification information storage unit, and
an identification information transmitting unit for transmitting the relay server identification information acquired by said acquisition unit when the request information is received by said request information receiving unit.

2. The communication system according to claim 1, wherein
said request information comprises domain information corresponding to the relay server information for said first to N-th relay servers;
said identification information storage unit stores the relay server identification information for said first to N-th relay servers correlated with said domain information; and
said acquisition unit acquires a single item of two or more items of the relay server identification information corresponding to the domain information contained in said request information.

3. The communication system according to claim 1, wherein
said first information processing equipment comprises:
a plurality of items of the identification information storage unit for storing the relay server identification information for said first to N-th relay servers,
a storage unit for acquiring any single item of items of the relay server identification information stored in said plurality of items of the identification information storage unit, and
a first accumulating unit for accumulating the relay server identification information acquired by said acquisition unit in said storage unit.

4. The communication system according to any one of claims 1 to 3, wherein said mediating server executes the processing using SIP (Session Initiation Protocol).

5. The communication system according to claim 4, wherein said first transmission information transmitting unit transmits the relay server identification information to a calling ID according to SIP.

6. The communication system according to claim 1, wherein the second data communicating unit of the second information processing equipment repeatedly transmits a repetitive packet to the selected relay server at least once during a port keeping time of the selected relay server to maintain a communication connection between the second information processing equipment and the selected relay server.

7. The communication system according to claim 6, wherein a payload of the repetitive packet lacks information to be relayed between the first and second information processing equipment through the selected relay server.

8. A communication system including first to N-th relay servers, N is a 2 or more integer, which are servers for a data relay, a first information processing equipment, a second information processing equipment and a mediating server for communicating relay server identification information obtained in response to a request by said first information processing equipment to said second information processing equipment, wherein
said first information processing equipment comprises:
a first transmission information transmitting unit for transmitting, to said mediating server, first transmission information comprising a transmission request of the relay server identification information for identifying the relay server to be employed in the data relay between said first information processing equipment and said second information processing equipment,
a third transmission information receiving unit for receiving third transmission information comprising the relay server identification information, transmitted from said mediating server,
a first accumulating unit for accumulating the relay server identification information included in said third transmission information, and
a first data communicating unit for executing the data relay with said second information processing equipment through the relay server identified by the relay server identification information accumulated by said first accumulating unit;
said mediating server comprises:
a first transmission information receiving unit for receiving said first transmission information,
a second transmission information receiving unit for transmitting if the first transmission information is received by said first transmission information receiving unit, to said second information processing equipment, second transmission information comprising the relay server identification information for identifying the relay server to be employed in the data relay between said first information processing equipment and said second information processing equipment, and
a third transmission information receiving unit for transmitting if the first transmission information is received by said first transmission information receiving unit, to said first information processing equipment, third transmission information comprising the relay server identification information for identifying the relay server to be employed in the data relay between said first information processing equipment and said second information processing equipment; and
said second information processing equipment comprises:
a second transmission information receiving unit for receiving said second transmission information,
a second accumulating unit for accumulating the relay server identification information contained in said second transmission information, and
a second data communicating unit for executing the data relay with said first information processing equipment through the relay server identified by the relay server identification information accumulated by said second accumulating unit, and
said communication system further comprising an identification information transmitting server, wherein
said mediating server further comprises:
a request information transmitting unit for transmitting, to said identification information transmitting server, request information comprising said request for transmission by the identification information transmitting server of said relay server identification information,
said request information corresponds to the relay server identification information for a plurality of relay servers, and an identification information receiving unit for receiving the relay server identification information transmitted from said identification information transmitting server; and said identification information transmitting server comprises:

a request information receiving unit for receiving said request information, an identification information storage unit for storing the relay server identification information for identifying each of said first to N-th relay servers, an acquisition unit for acquiring any server identification information for said first to N-th relay servers stored in said identification information storage unit, and an identification information transmitting unit for transmitting the relay server identification information acquired by said acquisition unit when the request information is received by said request information receiving unit; and wherein said second transmission information comprises the relay server identification information received by said identification information receiving unit, and said third transmission information comprises the relay server identification information received by said identification information receiving unit.

9. The communication system according to claim 8, wherein said request information comprises domain information corresponding to the relay server identification information for said first to N-th relay servers;

said identification information storage unit stores the relay server identification information for said first to N-th relay servers so as to be correlated with said domain information; and said acquisition unit acquires a single item of two or more items of the relay server identification information corresponding to the domain information contained in said request information.

10. The communication system according to claim 8, wherein said mediating server further comprises:

a plurality of items of the identification information storage unit for storing the relay server identification information for said first to N-th relay servers, an acquisition unit for acquiring any single item of the relay server identification information stored in said plurality of item of the identification information storage unit, and wherein said second transmission information contains the relay server identification information received by said acquisition unit, and said third transmission information contains the relay server identification information received by said acquisition unit.

11. The communication system according to any one of claims 8 to 10, wherein said mediating server is operable according to SIP (Session Initiation Protocol).

12. An information processing equipment employed in a communication system, wherein said communication system includes first to N-th relay servers, N is a 2 or more integer, which are servers for data relay, another information processing equipment and a mediating server, and wherein said information processing equipment comprises:

a storage unit for storing relay server identification information identifying a selected relay server from among the first to N-th relay servers to be employed in the data relay between said information processing equipment and said another information processing equipment, a first transmission information transmitting unit for transmitting, to said mediating server, first transmission information comprising the relay server identification information stored in said storage unit, and a first data communicating unit for executing the data relay with said another information processing equipment through the selected relay server identified by the relay server identification information stored in said storage unit; and said mediating server comprises:

a first transmission information receiving unit for receiving said first transmission information, and a second transmission information transmitting unit for transmitting to said another information processing equipment second transmission information comprising the relay server identification information included in the first transmission information received by said first transmission information receiving unit; and said another information processing equipment comprises:

a second transmission information receiving unit for receiving said second transmission information, a second accumulating unit for accumulating the relay server identification information included in said second transmission information, and a second data communicating unit for executing the data relay with said information processing equipment through the selected relay server identified by the relay server identification information accumulated by said second accumulating unit, and said communication system further comprising an identification information transmitting server, wherein said information processing equipment further comprises a request information transmitting unit for transmitting, to said identification information transmitting server, request information requesting transmission of said relay server identification information said request information corresponds to the relay server identification information for a plurality of relay servers, an identification information receiving unit for receiving the relay server identification information transmitted from said identification information transmitting server, and a first accumulating unit for accumulating the relay server identification information received by said identification information receiving unit in said storage unit; and said identification information transmitting server comprises:

a request information receiving unit for receiving said request information, an identification information storage unit for storing the relay server identification information identifying each of said first to N-th relay servers, an acquisition unit for acquiring the relay server identification information for each of said first to N-th relay servers stored in said identification information storage unit, and an identification information transmitting unit for transmitting the relay server identification information acquired by said acquisition unit when the request information is received by said request information receiving unit.

13. An information processing equipment employed in a communication system, wherein said communication system includes first to N-th relay servers, N is a 2 or more integer, which are servers for data relay, another information processing equipment and a mediating server, and wherein said another information processing equipment comprises:
a storage unit for storing relay server identification information identifying a selected relay server to be employed in the data relay between said another information processing equipment and said information processing equipment,
a first transmission information transmitting unit for transmitting, to said mediating server, first transmission information comprising the relay server identification information stored in said storage unit, and
a first data communicating unit for executing the data relay with said information processing equipment through the selected relay server identified by the relay server identification information stored in said storage unit; and
said mediating server comprises:
a first transmission information receiving unit for receiving said first transmission information, and
a second transmission information transmitting unit for transmitting to said information processing equipment second transmission information comprising the relay server identification information included in the first transmission information received by said first transmission information receiving unit; and
said information processing equipment comprises:
a second transmission information receiving unit for receiving said second transmission information,
a second accumulating unit for accumulating the relay server identification information included in said second transmission information, and
a second data communicating unit for executing the data relay with said another information processing equipment through the selected relay server identified by the relay server identification information accumulated by said second accumulating unit, and said communication system further comprising an identification information transmitting server, wherein
said mediating server further comprises:
a request information transmitting unit for transmitting, to said identification information transmitting server, request information comprising said request for transmission by the identification information transmitting server of said relay server identification information, said request information corresponds to the relay server identification information for a plurality of relay servers, and
an identification information receiving unit for receiving the relay server identification information transmitted from said identification information transmitting server; and
said identification information transmitting server comprises:
a request information receiving unit for receiving said request information,
an identification information storage unit for storing the relay server identification information for identifying each of said first to N-th relay servers,
an acquisition unit for acquiring any server identification information for said first to N-th relay servers stored in said identification information storage unit, and
an identification information transmitting unit for transmitting the relay server identification information acquired by said acquisition unit when the request information is received by said request information receiving unit; and wherein
said second transmission information comprises the relay server identification information received by said identification information receiving unit, and
third transmission information comprises the relay server identification information received by said identification information receiving unit.

* * * * *